US012446751B2

(12) United States Patent
Yang et al.

(10) Patent No.: US 12,446,751 B2
(45) Date of Patent: Oct. 21, 2025

(54) NOZZLE FOR CLEANER

(71) Applicant: LG ELECTRONICS INC., Seoul (KR)

(72) Inventors: Ingyu Yang, Seoul (KR); Hyeri Kwon, Seoul (KR); Sungjun Kim, Seoul (KR); Youngsoo Kim, Seoul (KR); Jinho Kim, Seoul (KR); Kyoungho Ryou, Seoul (KR); Jungwan Ryu, Seoul (KR); Jinhyouk Shin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/661,160

(22) Filed: May 10, 2024

(65) Prior Publication Data

US 2024/0292997 A1    Sep. 5, 2024

Related U.S. Application Data

(63) Continuation of application No. 17/702,589, filed on Mar. 23, 2022, now Pat. No. 12,035,862, which is a (Continued)

(30) Foreign Application Priority Data

Apr. 30, 2018 (KR) .................... 10-2018-0050059
Apr. 30, 2018 (KR) .................... 10-2018-0050085
Aug. 13, 2018 (KR) .................... 10-2018-0094340

(51) Int. Cl.
*A47L 7/00*    (2006.01)
*A47L 9/02*    (2006.01)
(Continued)

(52) U.S. Cl.
CPC ............. *A47L 13/22* (2013.01); *A47L 7/0009* (2013.01); *A47L 9/02* (2013.01); *A47L 9/0411* (2013.01);
(Continued)

(58) Field of Classification Search
None
See application file for complete search history.

(56) References Cited

U.S. PATENT DOCUMENTS 6,237,188 B1    5/2001   Takemoto et al.
6,289,551 B1    9/2001   Basile
(Continued)

FOREIGN PATENT DOCUMENTS

CN    2397880 Y    9/2000
CN    1315602 A    10/2001
(Continued)

OTHER PUBLICATIONS

Australian Notice of Allowance dated Aug. 17, 2022 for Application No. 2019263346.
(Continued)

*Primary Examiner* — Levon J Shahinian
(74) *Attorney, Agent, or Firm* — Birch, Stewart, Kolasch & Birch, LLP

(57) ABSTRACT

A nozzle for a cleaner includes a nozzle housing including a suction flow path through which air including dust flows and at least a portion of which extends in a front and rear direction. First and second rotation cleaning units are arranged on the lower side of the nozzle housing to be spaced apart from each other in a lateral direction. Each of the first and second rotation cleaning units includes a rotation plate adapted for attachment of a mop. A first driving device including a first driving motor drives the first rotation cleaning unit and a second driving device including
(Continued)

a second driving motor drives the second rotation cleaning unit. A water tank mounted on the nozzle stores water to be supplied to the mop.

20 Claims, 37 Drawing Sheets

Related U.S. Application Data continuation of application No. 17/161,085, filed on Jan. 28, 2021, now Pat. No. 11,659,973, which is a continuation of application No. 16/397,320, filed on Apr. 29, 2019, now Pat. No. 11,191,415.

(51) Int. Cl.
| | | |
|---|---|---|
| *A47L 9/04* | (2006.01) | |
| *A47L 9/06* | (2006.01) | |
| *A47L 11/20* | (2006.01) | |
| *A47L 11/202* | (2006.01) | |
| *A47L 11/206* | (2006.01) | |
| *A47L 11/282* | (2006.01) | |
| *A47L 11/40* | (2006.01) | |
| *A47L 13/20* | (2006.01) | |
| *A47L 13/22* | (2006.01) | |

(52) U.S. Cl.
CPC .......... *A47L 9/0433* (2013.01); *A47L 9/0472* (2013.01); *A47L 9/0686* (2013.01); *A47L 11/201* (2013.01); *A47L 11/2025* (2013.01); *A47L 11/206* (2013.01); *A47L 11/282* (2013.01); *A47L 11/4038* (2013.01); *A47L 11/4069* (2013.01); *A47L 11/408* (2013.01); *A47L 11/4083* (2013.01); *A47L 11/4088* (2013.01); *A47L 11/4094* (2013.01)

(56) References Cited

U.S. PATENT DOCUMENTS

| | | | |
|---|---|---|---|
| 6,792,648 | B2 | 9/2004 | Lee |
| 6,823,558 | B2 | 11/2004 | Lee |
| 6,842,941 | B2 | 1/2005 | Lee |
| 7,159,276 | B2 | 1/2007 | Omoto et al. |
| 7,331,082 | B2 | 2/2008 | Hertrick et al. |
| 7,334,291 | B2 | 2/2008 | Song et al. |
| 7,412,750 | B2 | 8/2008 | Oh |
| 7,640,626 | B2 | 1/2010 | Oh |
| 7,743,462 | B2 | 6/2010 | Yoo |
| 8,032,985 | B2 | 10/2011 | Seo |
| 8,567,003 | B2 | 10/2013 | McLeod et al. |
| 8,677,552 | B2 | 3/2014 | Krebs |
| 8,904,595 | B2 | 12/2014 | Davidshofer et al. |
| 9,265,396 | B1 | 2/2016 | Lu et al. |
| 9,554,680 | B2 | 1/2017 | Elsdon et al. |
| 10,123,673 | B2 | 11/2018 | Kim et al. |
| 10,362,920 | B2 | 7/2019 | Moser et al. |
| 10,575,692 | B2 | 3/2020 | Lim et al. |
| 10,582,826 | B2 | 3/2020 | Hwang et al. |
| 10,602,902 | B2 | 3/2020 | Ding et al. |
| 10,638,901 | B2 | 5/2020 | Yang et al. |
| 10,682,035 | B2 | 6/2020 | Ji et al. |
| 10,820,764 | B2 | 11/2020 | Krebs |
| 10,898,045 | B2 | 1/2021 | Woo et al. |
| 10,952,582 | B2 | 3/2021 | Kim et al. |
| 10,993,598 | B2 | 5/2021 | Park et al. |
| 11,006,802 | B2 | 5/2021 | Watanabe et al. |
| 11,058,278 | B2 | 7/2021 | Shin et al. |
| 11,096,536 | B2 | 8/2021 | Yang et al. |
| 11,154,172 | B2 | 10/2021 | Kim et al. |
| 11,191,415 | B2 | 12/2021 | Yang et al. |
| 11,730,335 | B1 | 8/2023 | Resch et al. |
| 11,786,093 | B2 | 10/2023 | Yang et al. |
| 2001/0027586 | A1 | 10/2001 | Lee |
| 2003/0037409 | A1 | 2/2003 | Lee |
| 2003/0221281 | A1 | 12/2003 | Oh |
| 2004/0163199 | A1 | 8/2004 | Hsu |
| 2005/0223522 | A1 | 10/2005 | Song et al. |
| 2007/0067945 | A1 | 3/2007 | Kasper et al. |
| 2007/0074370 | A1 | 4/2007 | Oh |
| 2007/0157422 | A1 | 7/2007 | Oh et al. |
| 2008/0282490 | A1 | 11/2008 | Oh |
| 2009/0064447 | A1 | 3/2009 | Oh et al. |
| 2009/0229069 | A1 | 9/2009 | Lenkiewicz et al. |
| 2010/0287716 | A1 | 11/2010 | Kasper et al. |
| 2012/0110775 | A1 | 5/2012 | Krebs |
| 2013/0121880 | A1 | 5/2013 | Yamazaki |
| 2015/0113757 | A1 | 4/2015 | Franke et al. |
| 2015/0128996 | A1 | 5/2015 | Dooley et al. |
| 2015/0272412 | A1 | 10/2015 | Liscio |
| 2017/0251897 | A1 | 9/2017 | McDowell et al. |
| 2018/0055313 | A1 | 3/2018 | Yang et al. |
| 2018/0192846 | A1 | 7/2018 | Ji et al. |
| 2019/0038106 | A1 | 2/2019 | Jang et al. |
| 2019/0223681 | A1 | 7/2019 | Jang et al. |
| 2019/0328193 | A1 | 10/2019 | Yang et al. |
| 2019/0328194 | A1 | 10/2019 | Kim et al. |
| 2019/0328196 | A1 | 10/2019 | Kim et al. |
| 2019/0328201 | A1 | 10/2019 | Shin et al. |
| 2020/0029762 | A1 | 1/2020 | Lee et al. |
| 2021/0045598 | A1 | 2/2021 | Krebs |
| 2021/0076894 | A1 | 3/2021 | Wiltshire |

FOREIGN PATENT DOCUMENTS

| | | |
|---|---|---|
| CN | 1320409 A | 11/2001 |
| CN | 2660984 Y | 12/2004 |
| CN | 101108086 A | 1/2008 |
| CN | 101120867 A | 2/2008 |
| CN | 101305893 A | 11/2008 |
| CN | 201162194 Y | 12/2008 |
| CN | 101524259 A | 9/2009 |
| CN | 101589933 A | 12/2009 |
| CN | 102085081 A | 6/2011 |
| CN | 102188199 A | 9/2011 |
| CN | 101268923 B | 12/2011 |
| CN | 102312413 A | 1/2012 |
| CN | 102448628 A | 5/2012 |
| CN | 102525338 A | 7/2012 |
| CN | 102776853 A | 11/2012 |
| CN | 103860105 A | 6/2014 |
| CN | 203866748 U | 10/2014 |
| CN | 104739344 A | 7/2015 |
| CN | 104968247 A | 10/2015 |
| CN | 105361802 A | 3/2016 |
| CN | 205268043 U | 6/2016 |
| CN | 205597859 U | 9/2016 |
| CN | 106793900 A | 5/2017 |
| CN | 106955064 A | 7/2017 |
| CN | 107348894 A | 11/2017 |
| CN | 107625493 A | 1/2018 |
| CN | 211573011 U | 9/2020 |
| CN | 211674011 U | 10/2020 |
| DE | 101 57 017 A1 | 3/2003 |
| DE | 10 2016 208 895 A1 | 11/2017 |
| EP | 1 582 131 A1 | 10/2005 |
| EP | 2 016 882 A2 | 1/2009 |
| EP | 2 033 559 A2 | 3/2009 |
| EP | 2 329 755 A2 | 6/2011 |
| EP | 2 449 937 A2 | 5/2012 |
| EP | 3 459 412 A1 | 3/2019 |
| JP | 10-57289 A | 3/1998 |
| JP | 11-4790 A | 1/1999 |
| JP | 2006-325761 A | 12/2006 |
| JP | 2008-161260 A | 7/2008 |
| KR | 97-20795 U | 6/1997 |
| KR | 97-53478 U | 10/1997 |
| KR | 20-0148059 Y1 | 6/1999 |
| KR | 20-0195057 Y1 | 9/2000 |
| KR | 10-2001-0093648 A | 10/2001 |
| KR | 10-2003-0016520 A | 3/2003 |
| KR | 2003-0041569 A | 5/2003 |

(56) References Cited

FOREIGN PATENT DOCUMENTS

| | | |
|---|---|---|
| KR | 10-0400515 B1 | 10/2003 |
| KR | 10-0405244 B1 | 11/2003 |
| KR | 10-2003-0093625 A | 12/2003 |
| KR | 10-2005-0014652 A | 2/2005 |
| KR | 20-0402551 Y1 | 12/2005 |
| KR | 10-2006-0032063 A | 4/2006 |
| KR | 10-0582285 B1 | 5/2006 |
| KR | 10-2006-0064769 A | 6/2006 |
| KR | 10-0667875 B1 | 1/2007 |
| KR | 10-2008-0020304 A | 3/2008 |
| KR | 10-0814507 B1 | 3/2008 |
| KR | 10-0822785 B1 | 4/2008 |
| KR | 10-0848568 B1 | 7/2008 |
| KR | 10-2009-0000937 A | 1/2009 |
| KR | 10-2009-0026031 A | 3/2009 |
| KR | 10-2009-0071509 A | 7/2009 |
| KR | 10-2010-0016787 A | 2/2010 |
| KR | 10-2010-0037469 A | 4/2010 |
| KR | 10-0956737 B1 | 5/2010 |
| KR | 10-2011-0087251 A | 8/2011 |
| KR | 10-2012-0110271 A | 10/2012 |
| KR | 10-2013-0129059 A | 11/2013 |
| KR | 20-2013-0007030 U | 12/2013 |
| KR | 10-1408733 B1 | 6/2014 |
| KR | 10-1578887 B1 | 12/2015 |
| KR | 10-1595727 B1 | 2/2016 |
| KR | 10-2016-0024735 A | 3/2016 |
| KR | 10-1623871 B1 | 5/2016 |
| KR | 10-2016-0065611 A | 6/2016 |
| KR | 10-2016-0088549 A | 7/2016 |
| KR | 10-2016-0090571 A | 8/2016 |
| KR | 10-2016-0098932 A | 8/2016 |
| KR | 10-1655684 B1 | 9/2016 |
| KR | 10-1664686 B1 | 10/2016 |
| KR | 10-2016-0150433 A | 12/2016 |
| KR | 10-2017-0028758 A | 3/2017 |
| KR | 10-2017-0028765 A | 3/2017 |
| KR | 10-2017-0085313 A | 7/2017 |
| KR | 10-2017-0086401 A | 7/2017 |
| KR | 10-2017-0136856 A | 12/2017 |
| KR | 10-1805135 B1 | 12/2017 |
| KR | 10-2018-0008248 A | 1/2018 |
| KR | 10-2018-0023401 A | 3/2018 |
| KR | 10-2018-0098530 A | 9/2018 |
| TW | 123375 A | 11/1989 |
| TW | 201002262 A1 | 1/2010 |
| TW | M469865 U | 1/2014 |
| TW | I483856 B | 5/2015 |
| TW | 201607490 A | 3/2016 |
| TW | I568402 B | 2/2017 |
| TW | 201707632 A | 3/2017 |
| TW | 201707640 A | 3/2017 |
| TW | 201720359 A | 6/2017 |
| TW | 201731443 A | 9/2017 |
| TW | 201740856 A | 12/2017 |
| TW | 201740857 A | 12/2017 |
| TW | 201740861 A | 12/2017 |
| TW | 201740868 A | 12/2017 |
| TW | I618519-8 | 3/2018 |
| TW | 201838576 A | 11/2018 |
| WO | WO 01/07719 A1 | 2/2001 |
| WO | WO 2005/011461 A1 | 2/2005 |
| WO | WO 2010/016660 A1 | 2/2010 |
| WO | WO 2011/005027 A2 | 1/2011 |
| WO | WO 2012/014620 A1 | 2/2012 |
| WO | WO 2013/090143 A1 | 6/2013 |
| WO | WO 2014/080181 A1 | 5/2014 |
| WO | WO 2016/021419 A1 | 2/2016 |
| WO | WO 2016/031704 A1 | 3/2016 |
| WO | WO 2016/107634 A1 | 7/2016 |
| WO | WO 2016/190565 A1 | 12/2016 |
| WO | WO 2017/007152 A1 | 1/2017 |
| WO | 201707639 A | 3/2017 |
| WO | 2018/012912 A1 | 1/2018 |
| WO | WO 2019/129362 A1 | 7/2019 |

OTHER PUBLICATIONS

Korean Office Action dated Jun. 21, 2022 for Application No. 10-2022-0012767.

Zhao et al., "Structural Analyses of Web Cleaner Based on Computational Fluid Dynamics," Cotton Textile Technology, Dec. 2017, pp. 23-27, with an English abstract.

NOZZLE FOR CLEANER

CROSS-REFERENCE TO RELATED APPLICATIONS

This application is a Continuation of U.S. application Ser. No. 17/702,589, filed on Mar. 23, 2022, which is a Continuation of U.S. application Ser. No. 17/161,085, filed on Jan. 28, 2021 (now U.S. Pat. No. 11,659,973, issued on May 30, 2023), which is a Continuation of U.S. application Ser. No. 16/397,320, filed on Apr. 29, 2019 (now U.S. Pat. No. 11,191,415, issued on Dec. 7, 2021), which claims priority under 35 U.S.C. § 119 to Korean Patent Application No. 10-2018-0050085, filed in Korea on Apr. 30, 2018, Korean Patent Application No. 10-2018-0050059, filed in Korea on Apr. 30, 2018, and Korean Patent Application No. 10-2018-0094340, filed in Korea on Aug. 13, 2018, the contents of all of which are hereby incorporated by reference in their entireties.

BACKGROUND

The present specification relates to a nozzle for a cleaner.

The cleaner is a device which suctions or wipes dust or foreign matter in a region to be cleaned to perform a cleaning.

Such a cleaner can be classified into a manual cleaner for performing cleaning while a user directly moves the cleaner and an automatic cleaner for performing cleaning while traveling itself.

The manual cleaner can be classified into a canister-type cleaner, an upright-type cleaner, a handy-type cleaner, and a stick-type cleaner, according to the type of the cleaner.

These cleaners can clean a floor using nozzles. In general, nozzles can be used so as to suction air and dust. According to the type of the nozzle, the nozzle may be attached with a mop to clean the floor with the mop.

Korean Patent Registration No. 10-0405244, which is a related art 1, discloses a suction port assembly for a vacuum cleaner.

The suction port assembly of the related art 1 includes a suction port main body provided with a suction port.

The suction port main body includes a first suction path in the front, a second suction path in the rear, and a guide path formed between the first suction path and the second suction path.

A mop is rotatably installed on the lower end of the suction port main body, and a rotation driving unit for driving the mop is provided in the suction port main body.

The rotation driving unit includes one rotation motor and gears for transmitting the power of one rotation motor to a plurality of rotating bodies to which mops are attached.

Meanwhile, according to the related art 1, since a pair of rotating bodies disposed on both sides of the rotation driving unit are rotated using one rotating motor, if the rotating motor fails or malfunctions, there is a problem that all of the pair of rotating bodies cannot be rotated.

In addition, so as to rotate the pair of rotating bodies using the one rotation motor, since the rotation motor is positioned at the center of the suction port main body, it is necessary to design a suction path for preventing interference with the rotation motor, and thus there are disadvantages that the length of the suction path is lengthened and the structure for forming a suction path is complicated.

In addition, since the related art 1 does not have a structure for supplying water to a mop, in a case where cleaning is desired to be performed using a mop with water, there is a disadvantage that a user has to directly supply water to a mop.

In addition, in a case of the related art 1, since the rotation motor is positioned at the central portion of the suction port main body, it is difficult to form the suction path in the central portion of the suction port main body and if the suction path is formed in the central portion of the suction port main body, there is a disadvantage that the height of the suction port main body is increased.

In a case where the height of the suction port main body is increased, there are disadvantages that the suction port main body does not easily enter under the furniture or narrow space and thereby the cleanable area is reduced, and the size of the suction port main body is enlarged as a whole, and thus there is a disadvantage that it inconveniences the user during operation.

For example, in a case where the user intends to straighten the suction port main body but the suction port main body is moved eccentrically, there is a disadvantage that the amount of eccentricity is further increased due to the weight of the suction port main body and thus it is difficult for the user to overcome the eccentricity and move the suction port main body back to the original straight path.

On the other hand, Korean Patent Laid-Open Publication No. 10-2017-0028765, which is the related art 2, discloses a cleaner.

The cleaner disclosed in the related art 2 includes a cleaner main body in which a mop is rotatably installed on a lower portion thereof, a water bottle which is mounted to a handle which is connected to the cleaner main body or the cleaner main body, a water spray nozzle which is installed so as to spray water to the front of the cleaner main body, and a water supply unit for supplying the water in the water tank to the water spray nozzle.

In a case of the related art 2, since the water spray nozzle is sprayed forward from a front surface of the cleaner main body, there is a possibility that the sprayed water may wet other nearby structures, not a mop.

The water spray nozzle is disposed at the center of the cleaner main body, while the mop is arranged in the lateral direction, there is a problem that the mop cannot sufficiently absorb the water sprayed forward of the cleaner main body.

In addition, in a case of the related art 2, since there is no flow path for suctioning air, there is a disadvantage that only the floor can be wiped, and foreign matters present on the floor have to be manually cleaned again by the user.

SUMMARY

The present embodiment provides a nozzle for a cleaner which can suction foreign matters on the floor while making the overall size of the nozzle small and slim, clean the floor by rotating a mop and supply water to the mop.

The present embodiment provides a nozzle for a cleaner in which the length of an air flow path for air to flow is prevented from being increased, thereby reducing the flow path loss, even when a structure capable of wiping the floor using the mop is applied.

The present embodiment provides a nozzle for a cleaner in which the weight of a plurality of driving devices is uniformly distributed to left and right.

The present embodiment provides a nozzle for a cleaner in which directional change is facilitated in a process of cleaning using a nozzle.

The present embodiment provides a nozzle for a cleaner in which the power transmission path for transmitting the power of the driving motor to the rotation plate is reduced, and the vibration generated in a power transmission process is reduced.

The present embodiment provides a nozzle for a cleaner in which the vibration generated during the rotation of the rotation cleaning unit by the driving device is minimized.

The nozzle for a cleaner according to one aspect of the present invention includes a nozzle housing including a suction flow path through which air including dust flows and at least a portion of which extends in a front and rear direction; a first rotation cleaning unit and a second rotation cleaning unit which are arranged on the lower side of the nozzle housing so as to be spaced apart from each other in a lateral direction, each of the first rotation cleaning unit and the second rotation cleaning unit including a rotation plate to which a mop is capable of being attached; a first driving device which is disposed at one side of a centerline of the suction flow path in the front and rear direction and includes a first driving motor configured to drive the first rotation cleaning unit; a second driving device which is disposed on the other side of the centerline of the suction flow path in the front and rear direction and includes a second driving motor configured to drive the second rotation cleaning unit; and a water tank which is mounted on the nozzle housing and stores water to be supplied to the mop.

Each of the first and second driving motors may be disposed to overlap with each of the rotation plates in a vertical direction, and at least a portion of each of the first and second driving motors may be positioned in an area corresponding to a region between a rotation center and an outer circumferential surface of each of the rotation plates.

All of the driving motors may be positioned at the area corresponding to the region between the rotation center and the outer circumferential surface of each of the rotation plates.

An axis of each of the first and second driving motors may extend in a horizontal direction.

An axis of each of the first and second driving motors may extend in the front and rear direction.

An axis of each of the first and second driving motors may be positioned at a region between the rotation center of each of the rotation plates and the centerline of the suction flow path in the front and rear direction.

An imaginary line which may connect a first rotation center of a first rotation plate of the first rotation cleaning unit and a second rotation center of a second rotation plate of the second rotation cleaning unit to each other and each of the first and second driving motors may be disposed to overlap in the vertical direction.

An imaginary line which connects axis of each the first and second driving motors may pass through the suction flow path.

The suction flow path may include a first flow path which extends at a front end portion of the nozzle housing in the lateral direction, and a second flow path which extends at a central portion of the first flow path in the front and rear direction.

The centerline of the suction flow path in the front and rear direction may be the centerline of the second flow path, and each of the first and second driving devices may further include a driving gear which is connected to a shaft of each of the first and second driving motors and is rotated.

Each of the driving gears may be disposed between the first flow path and each of the first and second driving motors.

An axis of each of the first and second driving motors may be positioned higher than at least a portion of a bottom wall of the water tank in a state where the water tank is mounted to the nozzle housing.

Each of the first and second driving devices may further include a plurality of transmission gears configured to transmit the power of each of the first and second driving motors to the first and second rotation cleaning units.

One gear of the plurality of transmission gears may be positioned in a region corresponding to a region between a front end portion and a rear end portion of each of the first and second driving motors.

At least a portion of the one gear may be disposed so as to overlap with each of the first and second driving motors in the vertical direction.

The axis of each of the first and second driving motors may be positioned higher than a rotational locus of the gears of a portion or all of the plurality of transmission gears.

The present invention may further include a transmission shaft which is connected to the one gear of the plurality of transmission gears. The rotation plate is connected to the transmission shaft.

The nozzle housing may include a nozzle base on which the driving device is mounted; and a nozzle cover which is coupled to an upper side of the nozzle base and covers each of the first and second driving devices.

Each of the first and second driving devices may include: a motor housing which houses each of the first and second driving motors; a power transmission portion which is provided in the motor housing; and a transmission shaft which is connected to an output end of the power transmission portion. The transmission shaft passes through the nozzle base and is connected to the rotation plate.

The motor housing may include: a shaft hole through which the transmission shaft passes; and a sleeve which protrudes downwardly at the periphery of the shaft hole and is disposed to surround the transmission shaft passing through the motor housing.

The nozzle base has a seating groove on which the sleeve is seated, and a shaft through-hole through which the transmission shaft passes is formed in the seating groove.

The present invention may further includes: a first substrate which is installed on the nozzle base in a state of being horizontal, and a second substrate which is connected to each of the first and second driving motors in a state of intersecting the first substrate with the nozzle base.

The second substrate may be disposed at a position which is upwardly spaced apart from the nozzle base.

The second substrate may be provided with a pair of resistors which are connected to each of a (+) terminal and a (−) terminal of each of first and second driving motors.

A flow path forming portion configured to define the suction path extending in the front and rear direction may be coupled to the nozzle base. The flow path forming portion, the motor housing, and the nozzle base may be fastened by a single fastening member.

DETAILED DESCRIPTION OF THE EMBODIMENTS

Figure 1:
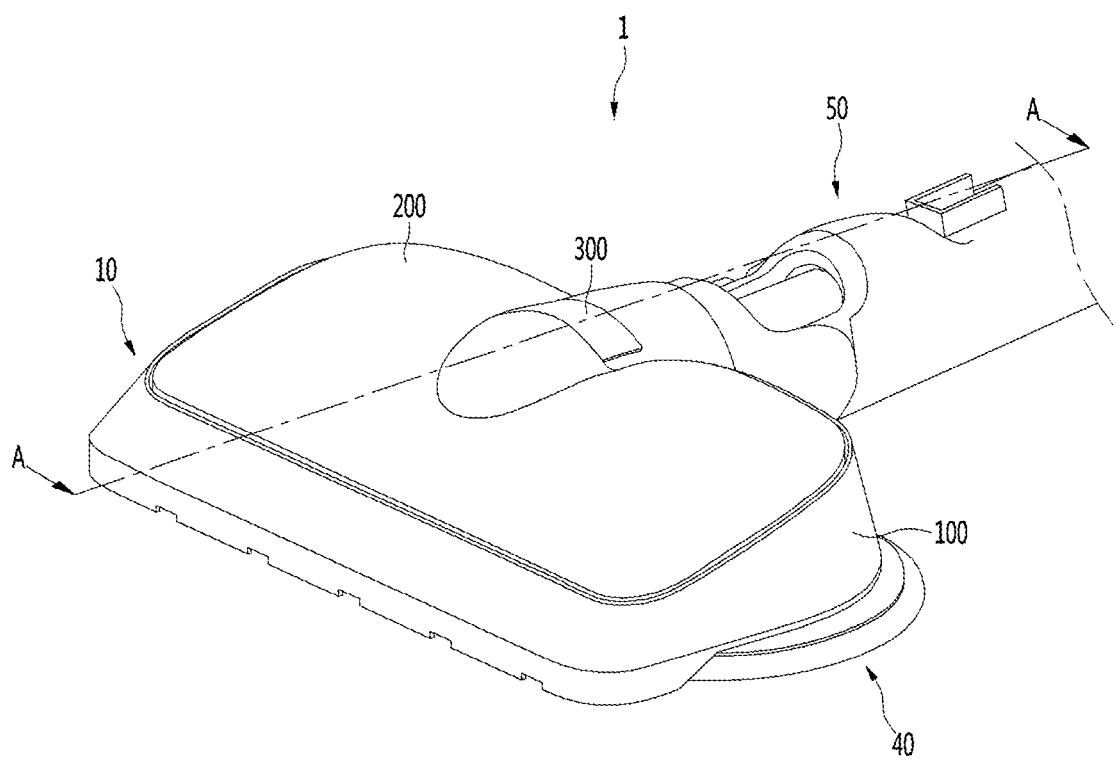
FIG. 1 and FIG. 2 are perspective views illustrating a nozzle for a cleaner according to an embodiment of the present invention.
Figure 2:
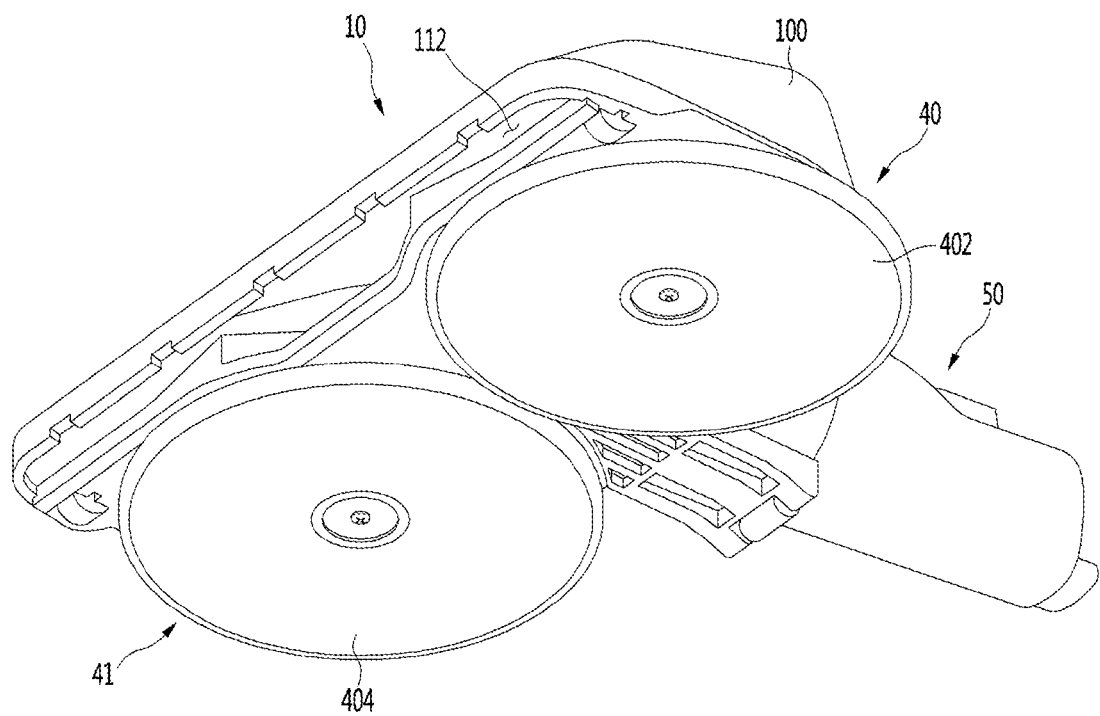
Figure 3:
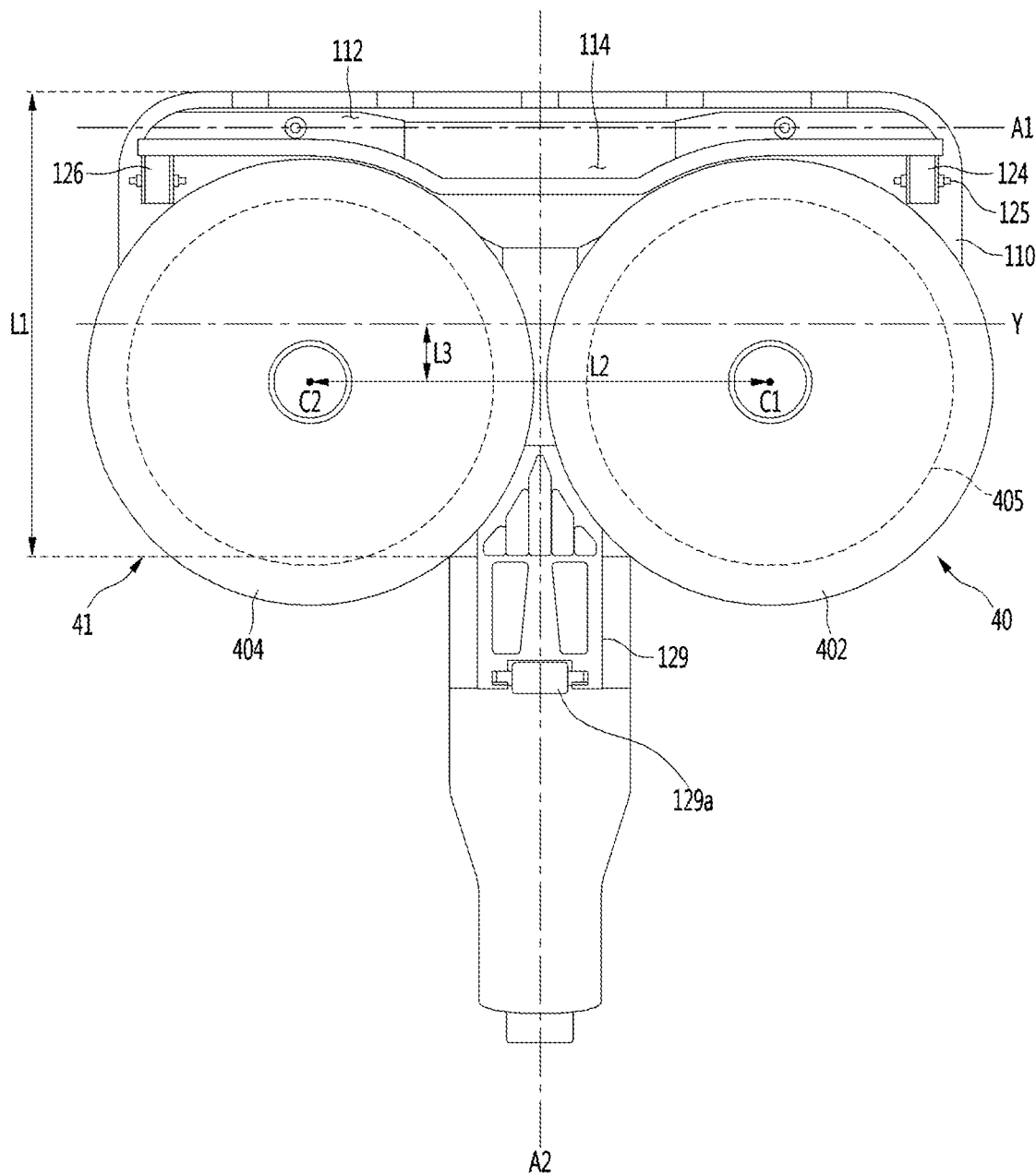
FIG. 3 is a bottom view illustrating a nozzle for a cleaner according to an embodiment of the present invention.
Figure 4:
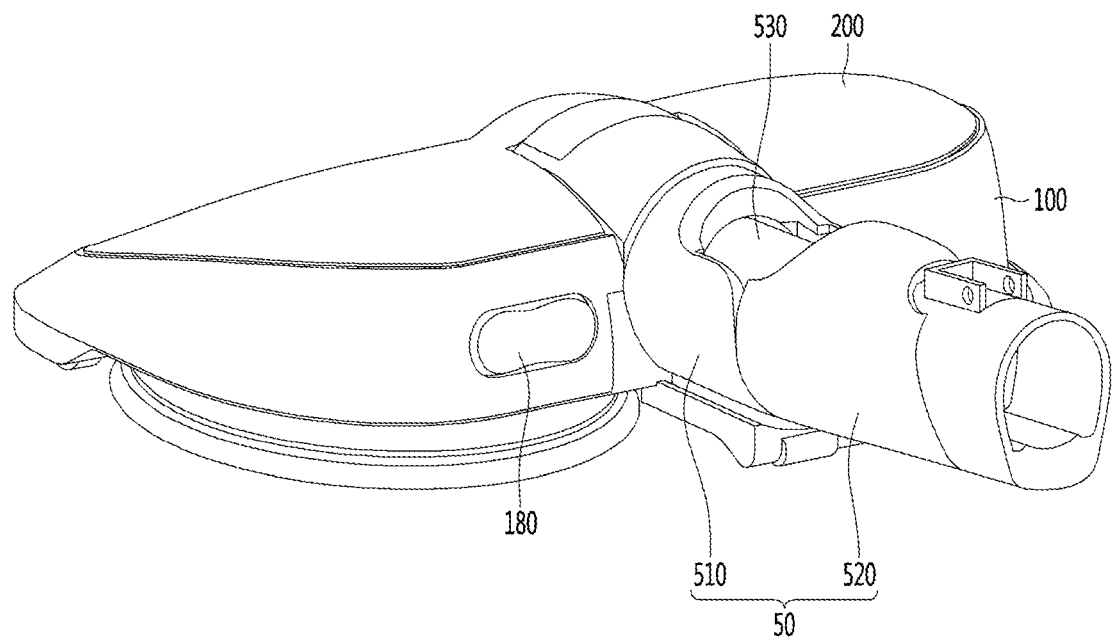
FIG. 4 is a perspective view illustrating the nozzle for the cleaner of FIG. 1 viewed from the rear side.
Figure 5:
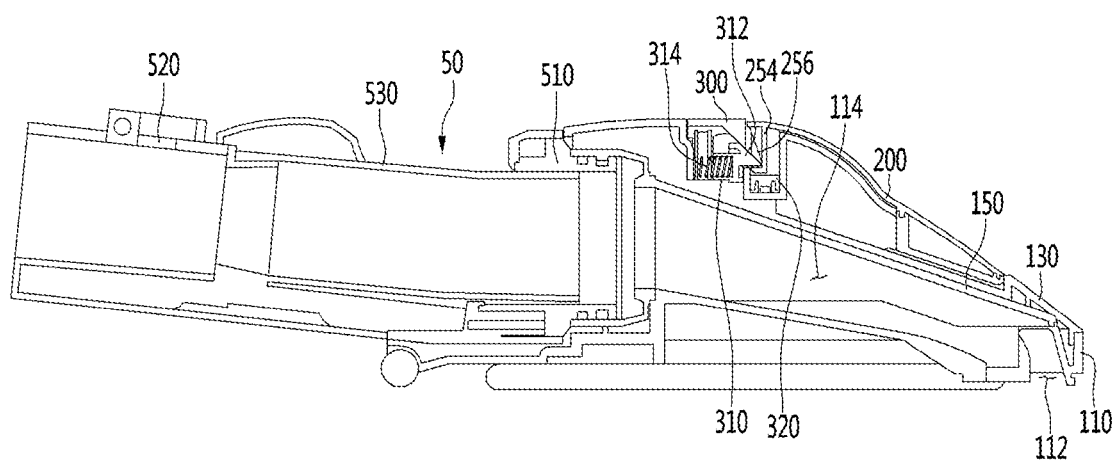
FIG. 5 is a sectional view taken along line A-A of FIG. 1.

FIG. 1 and FIG. 2 are perspective views illustrating a nozzle for a cleaner according to an embodiment of the present invention, FIG. 3 is a bottom view illustrating a nozzle for a cleaner according to an embodiment of the present invention, FIG. 4 is a perspective view illustrating the nozzle for the cleaner of FIG. 1 viewed from the rear side, and FIG. 5 is a sectional view taken along line A-A of FIG. 1.

Referring to FIG. 1 to FIG. 5, a nozzle 1 of a cleaner (hereinafter referred to as "nozzle") according to an embodiment of the present invention includes a nozzle main body 10, and a connection tube 50 which is connected to the nozzle main body 10 so as to be capable of moving.

The nozzle 1 of the present embodiment can be used, for example, in a state of being connected to a handy type cleaner or connected to a canister type cleaner.

In other words, the nozzle 1 may be detachably connected to a cleaner or an extension tube of a cleaner. Accordingly, the user can clean the floor using the nozzle 1 as the nozzle is connected to the cleaner or the extension tube of the cleaner.

The nozzle 1 itself has a battery to supply power to the power consumption unit therein, or can be operated by receiving power from the cleaner.

Since the cleaner to which the nozzle 1 is connected includes a suction motor, a suction force generated by the suction motor applies to the nozzle 1 to be capable of suctioning foreign matter and air on the floor at the nozzle 1. At this time, the cleaner to which the nozzle 1 is connected can separate the dust in the air by a multi-cyclone method.

Accordingly, in the present embodiment, the nozzle 1 can perform a function of suctioning foreign matter and air on the bottom surface and guiding the foreign matter and air to the cleaner.

Although not limited thereto, the connection tube 50 is connected to the rear central portion of the nozzle main body 10 to guide the suctioned air to the cleaner.

In the present embodiment, a portion of the nozzle 1 to which the connection tube 50 is connected is the rear side of the nozzle 1 and a portion of the opposite side of the connection tube 50 is the front side of the nozzle 1.

Alternatively, with respect to FIG. 3, an upper portion is a front side of the nozzle 1 and a lower portion thereof is a rear portion of the nozzle 1.

The nozzle 1 may further include rotation cleaning units 40 and 41 rotatably disposed below the nozzle main body 10.

For example, a pair of rotation cleaning units 40 and 41 may be arranged in the lateral direction. The pair of rotation cleaning units 40 and 41 can be independently rotated. For example, the nozzle 1 may include a first rotation cleaning unit 40 and a second rotation cleaning unit 41.

Each of the rotation cleaning units 40 and 41 may include mops 402 and 404. The mops 402 and 404 may be formed in a disc shape, for example. The mops 402 and 402 may include a first mop 402 and a second mop 404.

The nozzle main body 10 may include a nozzle housing 100 forming an outer shape. The nozzle housing 100 may include a suction flow path 112 and 114 for suctioning air.

The suction flow path 112 and 114 includes a first flow path 112 extending in the lateral direction in the nozzle housing 100 and a second flow path 114 communicating with the first flow path 112 and extending in the front and rear direction.

The first flow path 112 may be formed at a front end portion of the lower surface of the nozzle housing 100, as an example.

The second flow path 114 may extend rearward from the first flow path 112. For example, the second flow path 114 may extend rearward from the central portion of the first flow path 112 toward the connection tube 50.

Accordingly, a centerline A1 of the first flow path 112 can extend in the lateral horizontal direction. A centerline A2 of the second flow path 114 can extend in the front and rear direction and can intersect the centerline A1 of the first flow path 112. However, the centerline A2 of the second flow path 114 is not horizontal but may be inclined in the front and rear direction.

In this embodiment, the centerline A2 of the second flow path 114 may be referred to as centerline of the suction flow path in the front-rear direction.

The centerline A2 of the second flow path 114 may be positioned at a position where the nozzle main body 10 is bisected right and left, as an example.

A portion of the mops 402 and 404 is protruded to the outside of the nozzle 1 in a state where the rotation cleaning units 40 and 41 are connected to the lower side of the nozzle main body 10 and thus the rotation cleaning units 40 and 41 can clean not only a floor positioned directly below the nozzle but also the floor positioned outside the nozzle 1.

For example, the mops 402 and 404 may protrude not only to both sides of the nozzle 1 but also to the rear of the nozzle 1.

The rotation cleaning units 40 and 41 may be positioned on the rear side of the first flow path 112 from below the nozzle main body 10, for example.

Therefore, when the nozzle 1 is advanced and cleaned, the floor can be cleaned by the mops 402, 404 after foreign substances and air on the floor are suctioned by the first flow path 112.

In the present embodiment, the first rotation center C1 of the first rotation cleaning unit 40 (for example, rotation center of rotation plate 420) and the second rotation center C2 of the second rotation cleaning unit 41 (for example, rotation center of rotation plate 440) are disposed in a state of being spaced apart from each other in the lateral direction.

The centerline A2 of the second flow path 114 may be positioned in a region between the first rotation center C1 and the second rotation center C2.

The central axis Y bisecting the front and rear length L1 of the nozzle main body 10 (except for extension portion) can be positioned forward of the rotational centers C1 and C2 of the respective rotation cleaning units 40 and 41.

The rotation centers C1 and C2 of the respective rotation cleaning units 40 and 41 may be positioned farther from the front end portion of the nozzle main body 10 than the central axis Y bisecting the front and rear length L1 of the nozzle main body 10. This is to prevent the rotation cleaning units 40, 41 from blocking the first flow path 112.

Accordingly, the front and rear horizontal distance L3 between the central axis Y and the rotation centers C1 and C2 of the respective rotation cleaners 40 and 41 may be set to a value greater than zero.

In addition, the distance L2 between the rotation centers C1 and C2 of the rotation cleaning units 40 and 41 may be formed to be larger than the diameter of each of the mops 402 and 404. This is to prevent the mops 402 and 404 from interfering with each other during the rotation and to prevent the area which can be cleaned by the interfered portion from being reduced.

The diameter of the mops 402 and 404 is preferably 0.6 times or more than half the width of the nozzle main body 10, although not limited thereto. In this case, the cleaning area of the floor facing the nozzle main body 10 by the mops 402 and 404 is increased, and the area for cleaning the floor not facing the nozzle main body 10 is also increased. In addition, the cleaning area by the mops 402 and 404 can be secured even with a small amount of movement when the nozzle 1 is used for cleaning.

In addition, the mops 402, 404 may be provided with a sewing line 405. The sewing lines 405 may be positioned in a state of being spaced apart inwardly in the center direction at the edge portion of the mops 402 and 404. The mops 402 and 404 may be formed by combining a plurality of fiber materials, and the fiber materials may be joined by the sewing line 405.

At this time, the diameters of the rotation plates 420 and 440, which will be described later, may be larger than the diameter to a portion of the sewing line 405 with respect to the centers of the mops 402 and 404. The diameters of the rotation plates 420 and 440 may be smaller than the outer diameters of the mops 402 and 404.

In this case, the rotation plates 420 and 440 can support a portion of the mops 402 and 404 positioned outside the sewing line 405, thereby reducing the distance between the mops 402 and 404, and it is possible to prevent mutual friction between the mops 402 and 404 or vertical overlapping between the mops 402 and 404 due to the deformation of the mops 402 and 404 by pressing the edge portions.

The nozzle housing 100 may include a nozzle base 110 and a nozzle cover 130 coupled to the upper side of the nozzle base 110.

The nozzle base 110 may form the first flow path 112. The nozzle housing 100 may further include a flow path forming portion 150 forming the second flow path 114 together with the nozzle base 110.

The flow path forming portion 150 may be coupled to the upper central portion of the nozzle base 110 and the end portion of the flow path forming portion 150 may be connected to the connection tube 50.

Accordingly, since the second flow path 114 can extend substantially in a straight line shape in the front and rear direction by the disposition of the flow path forming portion 150, the length of the second flow path 114 can be minimized, and thus the flow path loss in the nozzle 1 can be minimized.

The front portion of the flow path forming portion 150 may cover the upper side of the first flow path 112. The flow path forming portion 150 may be disposed to be inclined upward from the front end portion toward the rear side.

Therefore, the height of the front portion of the flow path forming portion 150 may be lower than that of the rear portion of the flow path forming portion 150.

According to the present embodiment, since the height of the front portion of the flow path forming portion 150 is low, there is an advantage that the height of the front portion of the entire height of the nozzle 1 can be reduced. The lower the height of the nozzle 1, the more likely it is that the nozzle 1 can be drawn into a narrow space on the lower side of furniture or a chair to be cleaned.

The nozzle base 110 may include an extension portion 129 for supporting the connection tube 50. The extension portion 129 may extend rearward from the rear end of the nozzle base 110.

The connection tube 50 may include a first connection tube 510 connected to an end of the flow path forming portion 150, a second connection tube 520 rotatably connected to the first connection tube 510, and a guide tube 530 for communicating the first connection tube 510 with the second connection tube 520.

The first connection tube 510 may be seated on the extension portion 129 and the second connection tube 520 may be connected to an extension tube or hose of the cleaner.

A plurality of rollers for smooth movement of the nozzle 1 may be provided on the lower side of the nozzle base 110.

For example, the first roller 124 and the second roller 126 may be positioned behind the first flow path 112 on the nozzle base 110. The first roller 124 and the second roller 126 may be spaced apart from each other in the lateral direction.

According to the present embodiment, the first roller 124 and the second roller 126 are disposed behind the first flow path 112 so that the first flow path 112 can be positioned as close as possible to the front end portion of the nozzle base 110 and thus the area which can be cleaned by using the nozzle 1 can be increased.

As the distance from the front end portion of the nozzle base 110 to the first flow path 112 increases, the area in which the suction force does not apply in front of the first flow path 112 during the cleaning process increases, and thus the area where the cleaning is not performed is increased.

On the other hand, according to the present embodiment, the distance from the front end portion of the nozzle base 110 to the first flow path 112 can be minimized, and thus the cleanable area can be increased.

In addition, by disposing the first roller 124 and the second roller 126 behind the first flow path 112, the length of the first flow path 112 in the lateral direction can be maximized.

In other words, the distance between both end portions of the first flow path 112 and both end portions of the nozzle base 110 can be minimized.

In the present embodiment, the first roller 124 may be positioned in a space between the first flow path 112 and the first mop 402. The second roller 126 may be positioned in a space between the first flow path 112 and the second mop 404.

The first roller 124 and the second roller 126 may be rotatably connected to a shaft 125, respectively. The shaft 125 may be fixed to the lower side of the nozzle base 110 in a state of being disposed so as to extend in the lateral direction.

The distance between the shaft 125 and the front end portion of the nozzle base 110 is longer than the distance between the front end portion of the nozzle base 110 and each of the mops 402 and 404 (or a rotation plate described later).

At least a portion of each of the rotation cleaning units 40 and 41 (mop and/or rotation plate) can be positioned between the shaft 125 of the first roller 124 and the shaft 125 of the second roller 126.

According to this disposition, the rotation cleaning units 40 and 41 can be positioned as close as possible to the first flow path 112, and the area to be cleaned by the rotation cleaning units 40 and 41 of the floor on which the nozzles 1 are positioned can be increased, and thus the floor cleaning performance can be improved.

The plurality of rollers are not limited, but the nozzle 1 can be supported at three points. In other words, the plurality of rollers may further include a third roller 129a provided on the extension portion 129 of the nozzle base 110.

The third roller 129a may be positioned behind the mop 402, 404 to prevent interference with the mop 402, 404.

In a state where the mops 402 and 404 are placed on the floor, the mops 402 and 404 are pressed against the floor and is in close contact with the floor, so that the friction force between the mops 402 and 404 and the bottom surface 404 is increased. In the present embodiment, since the plurality of rollers are coupled to the lower side of the nozzle base 110, the mobility of the nozzle 1 can be improved by the plurality of rollers.

Meanwhile, the nozzle main body 10 may further include a water tank 200 to supply water to the mops 402 and 404.

The water tank 200 may be detachably connected to the nozzle housing 100. The water in the water tank 200 can be supplied to each of the mops 402 and 404 in a state where the water tank 200 is mounted on the nozzle housing 100.

The water tank 200 can form an outer appearance of the nozzle 1 in a state of being mounted on the nozzle housing 100.

The entire upper side wall of the water tank 200 substantially forms an outer appearance of an upper surface of the nozzle 1. Therefore, the user can easily recognize that the water tank 200 is mounted or the water tank 200 is separated from the nozzle housing 100.

The nozzle main body 10 may further include an operating unit 300 that operates to separate the water tank 200 in a state where the water tank 200 is mounted on the nozzle housing 100.

The operating unit 300 may be provided in the nozzle housing 100 as an example. The nozzle housing 100 may be provided with a first coupling unit 310 for coupling with the water tank 200 and the water tank 200a may be provided with a second coupling unit 254 for coupling with the first coupling unit 310.

The operating unit 300 may be disposed so as to be capable of vertically moving in the nozzle housing 100. The first coupling unit 310 can be moved under the operation force of the operating unit 300 at the lower side of the operating unit 300.

For example, the first coupling unit 310 may move in the front and rear direction. For this purpose, the operating unit 300 and the first coupling unit 310 may include inclined surfaces contacting each other.

When the operating unit 300 is lowered by the inclined surfaces, the first coupling unit 310 can move horizontally (for example, movement in the front and rear direction).

The first coupling unit 310 includes a hook 312 for engaging with the second coupling unit 254 and the second coupling unit 254 includes a groove 256 for inserting the hook 312.

The first coupling unit 310 may be resiliently supported by the second elastic member 314 so as to maintain a state where the first coupling unit 310 is coupled to the second coupling unit 254.

Therefore, when the hook 312 is in a state of being inserted into the groove 256 by the second elastic member 314 and the operating unit 300 is pressed downward, the hook 312 is separated from the groove 256. The water tank 200 can be separated from the nozzle housing 100 in a state where the hook 312 is removed from the groove 256.

The nozzle 1 may further include a support body 320 for lifting the second coupling unit 254 of the water tank 200 in a state where the hook 312 is withdrawn from the groove 256. The operation of the support body 320 to raise the second coupling unit 254 will be described later with reference to the drawings.

In the present embodiment, the operating unit 300 may be positioned directly above the second flow path 114, for example. For example, the operating unit 300 may be disposed to overlap the centerline A2 of the second flow path 114 in the vertical direction.

Accordingly, since the operation unit 300 is positioned at the central portion of the nozzle 1, there is an advantage that the user can easily recognize the operation unit 300 and operate the operation unit 300.

Meanwhile, the nozzle main body 10 may further include an adjusting unit 180 for adjusting the amount of water discharged from the water tank 200. For example, the adjusting unit 180 may be positioned on the rear side of the nozzle housing 100.

The adjusting unit 180 can be operated by a user and the adjusting unit 180 can prevent the water from being discharged from the water tank 200 or the water from being discharged.

Alternatively, the amount of water discharged from the water tank 200 can be adjusted by the adjusting unit 180. For example, when the adjusting unit 180 is operated, water is discharged from the water tank 200 by a first amount per unit time, or water is discharged by a second amount greater than the first amount per unit time.

The adjusting unit 180 may be pivotally mounted to the nozzle housing 100 in a lateral direction or may be pivoted in a vertical direction.

For example, in a state where the adjusting unit 180 is in the neutral position as shown in FIG. 4, the amount of water discharged is 0, and when the left side of the adjusting unit 180 is pushed to pivot the adjusting unit 180 to the left, water may be discharged from the water tank 200 by a first amount per unit time.

When the adjustment unit 180 is pushed to the right by pushing the right side of the adjustment unit 180, the second amount of water may be discharged from the water tank 200 per unit time. The configuration for detecting the operation of the adjusting unit 180 will be described later with reference to the drawings.

Figure 6:
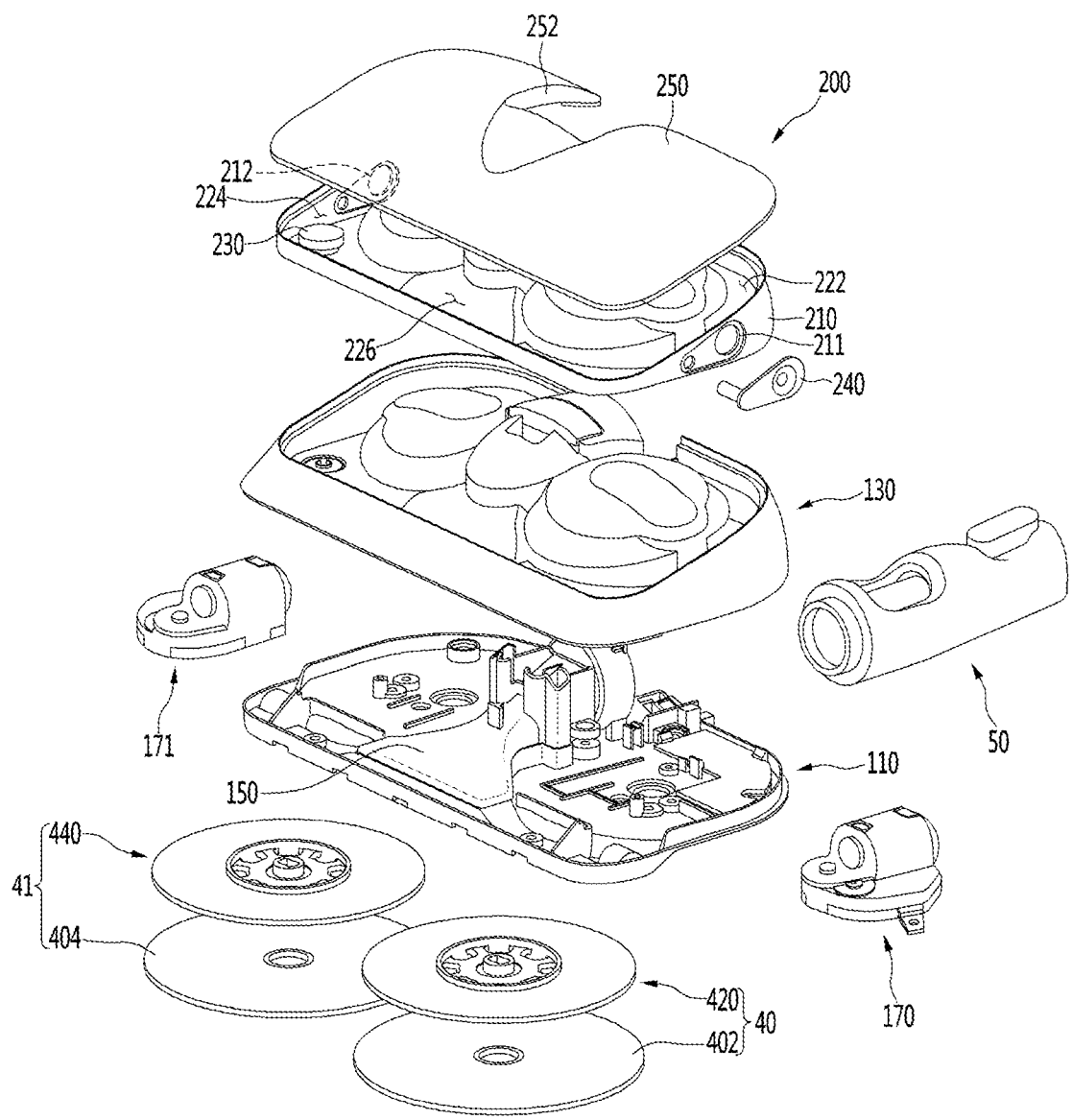
FIG. 6 and FIG. 7 are exploded perspective views illustrating a nozzle according to an embodiment of the present invention.
Figure 7:
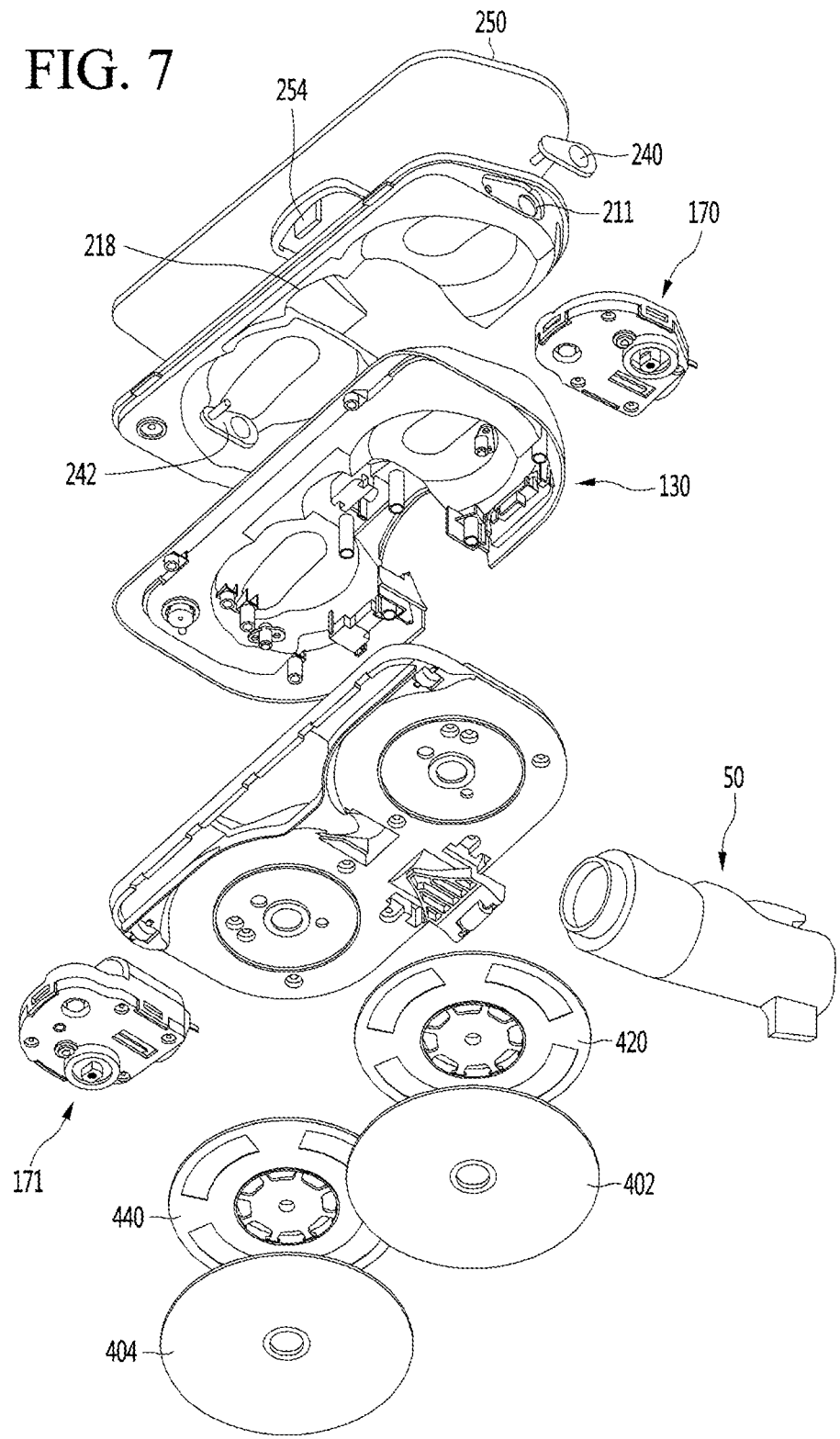
Figure 8:
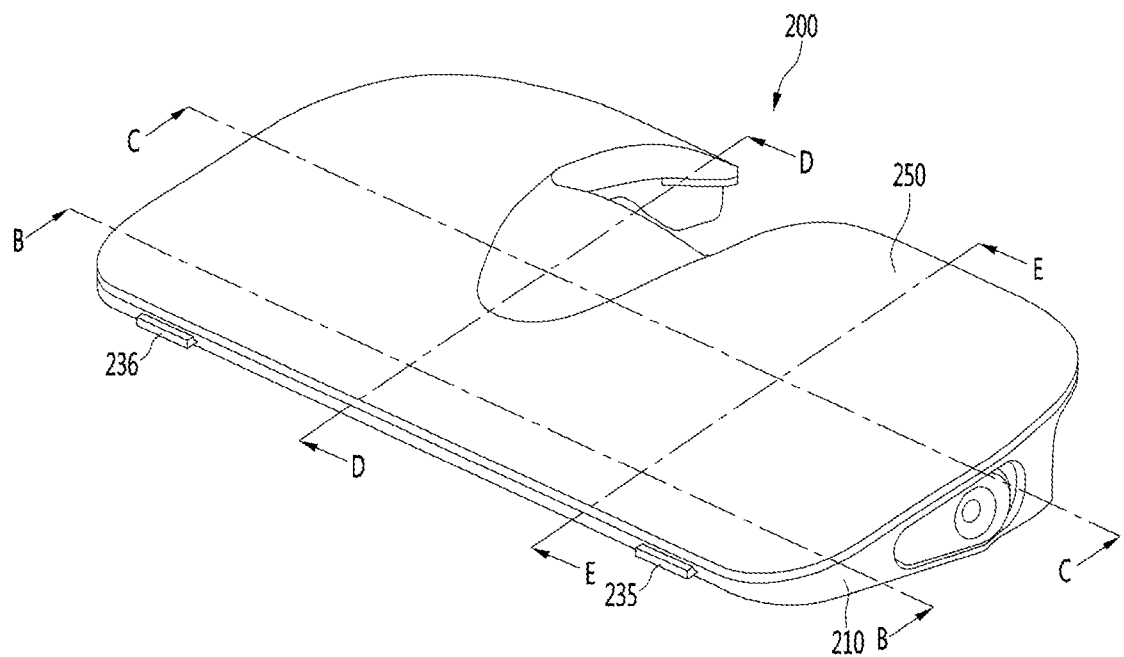
FIG. 8 and FIG. 9 are perspective views illustrating a water tank according to an embodiment of the present invention.
Figure 9:
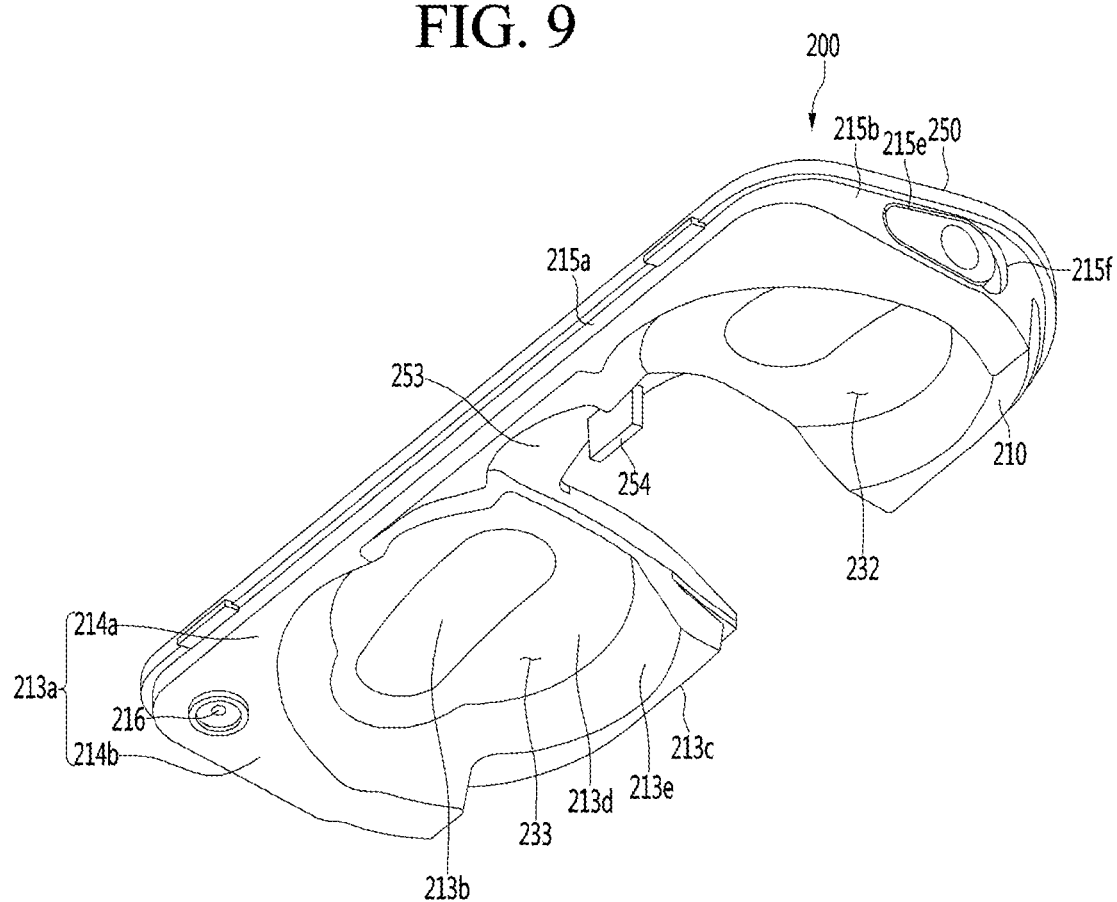

FIG. 6 and FIG. 7 are exploded perspective views of a nozzle according to an embodiment of the present invention, and FIG. 8 and FIG. 9 are perspective views of a water tank according to an embodiment of the present invention.

FIG. 3 and FIG. 6 to FIG. 9, the nozzle main body 10 may further include a plurality of driving devices 170 and 171 for individually driving the respective rotation cleaning units 40 and 41.

The plurality of driving devices 170 and 171 may include a first driving device 170 for driving the first rotation cleaning unit 40 and a second driving device 171 for driving the second rotation cleaning unit 41.

Since each of the driving devices 170 and 171 operates individually, even if some of the driving devices 170 and 171 fail, there is an advantage that some of the rotation cleaning devices can be rotated by another driving device.

The first driving device 170 and the second driving device 171 may be spaced apart from each other in the lateral direction in the nozzle main body 10.

The driving devices 170 and 171 may be positioned behind the first flow path 112.

For example, at least a portion of the second flow path 114 may be positioned between the first driving device 170 and the second driving device 171. At this time, the first driving device 170 and the second driving device 171 may be disposed symmetrically with respect to the centerline A2 of the second flow path 114.

Therefore, even if the plurality of driving devices 170 and 171 are provided, the second flow path 114 is not affected, and thus the length of the second flow path 114 can be minimized.

According to the present embodiment, since the first driving device 170 and the second driving device 171 are disposed on both sides of the second flow pathway 114, the weight of the nozzle 1 can be uniformly distributed to the left and right so that it is possible to prevent the center of gravity of the nozzle 1 from being biased toward any one of the nozzles 1.

The plurality of driving devices 170 and 171 may be disposed in the nozzle main body 10. For example, the plurality of driving devices 170 and 171 may be seated on the upper side of the nozzle base 110 and covered with the nozzle cover 130. In other words, the plurality of driving devices 170 and 171 may be positioned between the nozzle base 110 and the nozzle cover 130.

Each of the rotation cleaning units 40 and 41 may further include rotation plates 420 and 440 which are rotated by receiving power from each of the driving devices 170 and 171.

The rotation plates 420 and 440 may include a first rotation plate 420 which is connected to the first driving device 170 and to which the first mop 402 is attached and a second rotation plate 420 which is connected to the second driving device 171 and a second rotation plate 440 to which the second mop 404 is attached.

The rotation plates 420 and 440 may be formed in a disc shape, and the mops 402 and 404 may be attached to the bottom surface of the rotation plates 420 and 440.

The rotation plates 420 and 440 may be connected to each of the driving devices 170 and 171 on the lower side of the nozzle base 110. In other words, the rotation plates 420 and 440 may be connected to the driving devices 170 and 171 at the outside of the nozzle housing 100.

<Water Tank>

Figure 10:
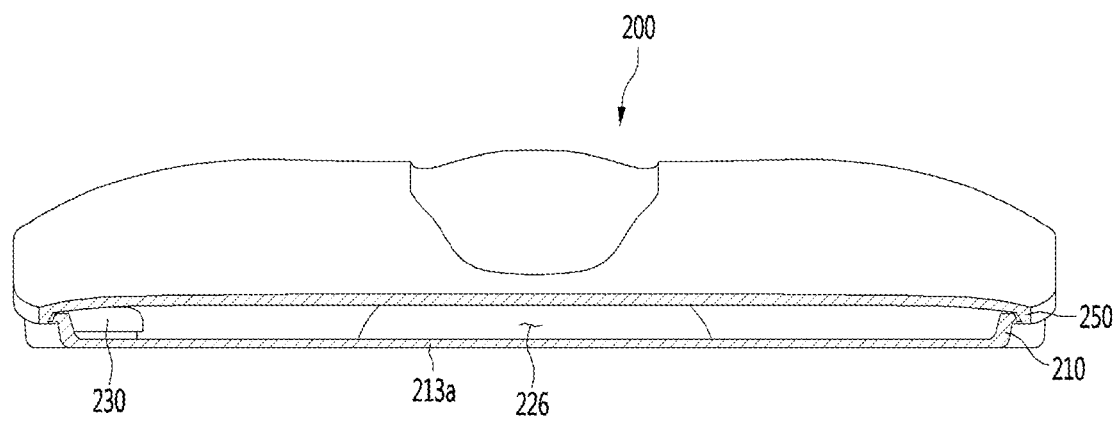
FIG. 10 is a sectional view taken along line B-B in FIG. 8.
Figure 11:
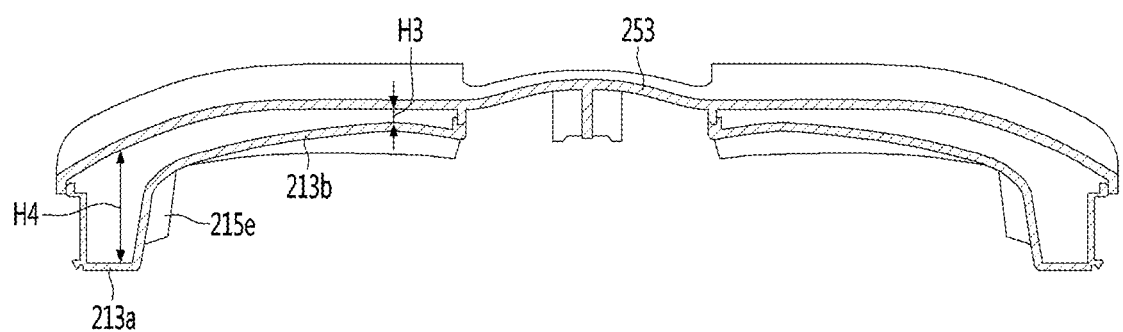
FIG. 11 is a sectional view taken along the line C-C of FIG. 8.
Figure 12:
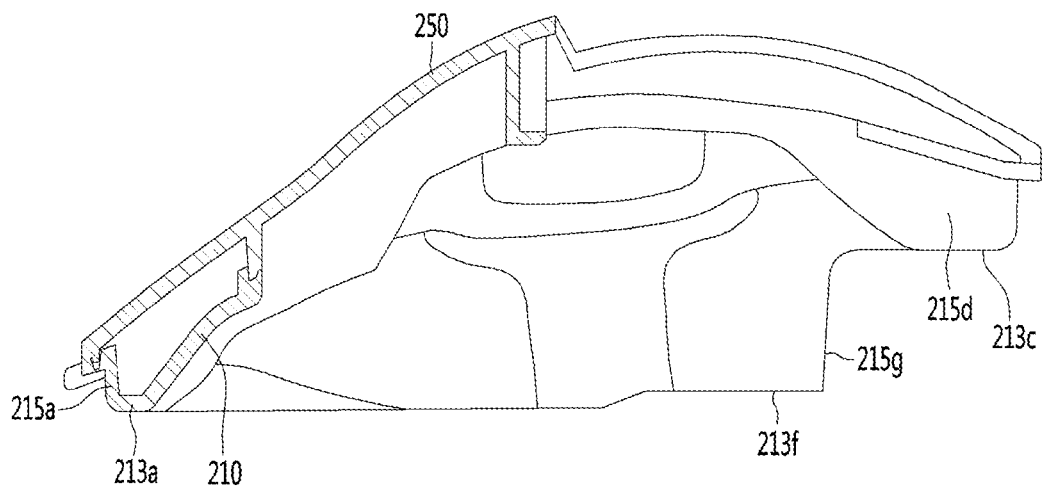
FIG. 12 is a sectional view taken along line D-D in FIG. 8.
Figure 13:
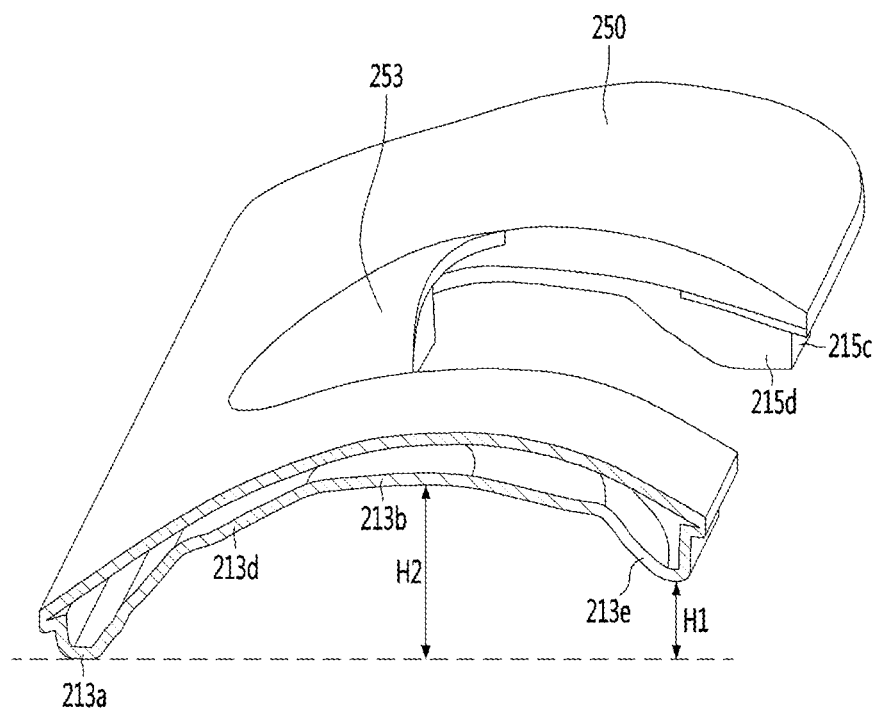
FIG. 13 is a sectional view taken along line E-E of FIG. 8.

FIG. 10 is a sectional view taken along line B-B in FIG. 8, FIG. 11 is a sectional view taken along the line C-C of FIG. 8, FIG. 12 is a sectional view taken along line D-D in FIG. 8, and FIG. 13 is a sectional view taken along line E-E of FIG. 8.

Referring to FIG. 8 to FIG. 13, the water tank 200 may be mounted on the upper side of the nozzle housing 100. For example, the water tank 200 may be seated on the nozzle cover 130. The upper side wall of the water tank 200 can form a portion of an outer appearance of the upper surface of the nozzle main body 10 in a state where the water tank 200 is seated on the upper side of the nozzle cover 130. For example, the water tank 200 may protrude upward from the nozzle cover 130.

The water tank 200 may include a first body 210, and a second body 250 coupled to the first body 210 and defining a chamber in which water is stored together with the first body 210. The second body 250 may be coupled to the upper side of the first body 210.

The second body 250 may substantially protrude upward from the nozzle cover 130 to form an outer appearance of an upper surface of the nozzle 1. Though not limited thereto, the entire upper surface wall of the second body 250 may form an outer appearance of the upper surface of the nozzle 1.

The chamber may include a first chamber 222 positioned above the first driving device 170, a second chamber 224 positioned above the second driving device 171, and a connection chamber 226 communicating the first chamber 222 with the second chamber 224.

The first body 210 may define a bottom wall and a side wall of the chamber, and the second body 250 may define an upper wall of the chamber. Of course, a portion of the second body 250 may also define an upper wall of the chamber.

In the present embodiment, the volume of the connection chamber 226 may be formed to be smaller than the volume of the first chamber 222 and the second chamber 24 so that the amount of water to be stored is increased while minimizing the height of the nozzle 1 by the water tank 200.

The water tank 200 may be formed so that the front height is low and the rear height is high. The upper surface of the water tank 200 may be inclined upward or rounded from the front side to the back side.

For example, the connection chamber 226 may connect the first chamber 222 and the second chamber 224 disposed on both sides in the front portion of the water tank 200. In other words, the connection chamber 226 may be positioned in the front portion of the water tank 200.

The water tank 200 may include a first bottom wall 213a. For example, the first body 210 may include the first bottom wall 213a.

The first bottom wall 213a is a wall which is positioned at the lowest position in the water tank 200.

The first bottom wall 213a is a horizontal wall and can be seated on the bottom wall 131a of the nozzle cover 130 described later.

The first bottom wall 213a may be a bottom wall positioned at the foremost end portion of the water tank 200.

The first bottom wall 213a may include a first wall portion 214a extending to be long in the left and right direction and a pair of second wall portions 214b extending in the front and rear direction at both ends of the wall portion 214a. The left and right lengths of the wall portion 214a may be substantially the same as the left and right lengths of the first body 210.

The width of each of the second wall portion 214b in the lateral direction is formed to be larger than the width of the first wall portion 214a in the front and rear direction.

At this time, the lateral width of the second wall portion 214b is the largest in the portion adjacent to the first wall portion 214a and may be reduced in the portion far away from the first wall portion 214a.

A discharge port 216 for discharging water from the water tank 200 may be formed in any one of the pair of the first wall portions 214b.

Alternatively, the discharge port 216 may be formed at a boundary between one of the pair of second wall portions 214b and the first wall portion 214a.

The discharge port 216 may be opened or closed by a valve 230 The valve 230 may be disposed in the water tank 200 The valve 230 can be operated by an external force, and the valve 230 keeps the discharge port 216 closed unless an external force is applied thereto.

Therefore, water can be prevented from being discharged from the water tank 200 through the discharge port 216 in a state where the water tank 200 is separated from the nozzle main body 10.

In this embodiment, the water tank 200 may include a single discharge port 216. The reason why the water tank 200 is provided with the single discharge port 216 is to reduce the number of components that can cause water leakage.

In other words, in the nozzle 1, there is a component (control board, driving motor, or the like) that operates upon receiving power, and such a component must be completely cut off from contact with water. So as to block the contact between the component and the water, leakage in the portion through which water is discharged from the water tank 200 is basically minimized.

As the number of the discharge port 216 in the water tank 200 is increased since a structure for preventing water leakage is additionally required, the structure is complicated, and even if there is a structure for preventing water leakage, there is a possibility that water leakage cannot be completely prevented.

Also, as the number of the discharge ports 216 in the water tank 200 is increased, the number of the valves 230 for opening and closing the discharge port 216 is also increased. This means that not only the number of components is increased but also the volume of the chamber for water storage in the water tank 200 is reduced by the valve 230.

Since the height of the rear side of the water tank 200 is higher than that of the front side of the water tank 200, so as to smoothly discharge water in the water tank 200, the discharge port 216 is formed on the first bottom wall 213a which is positioned at the lowest position of the first body 210.

The first body 210 may further include a second bottom wall 213b positioned at a different height from the first bottom wall 213a.

The second bottom wall 213b is a wall positioned behind the first bottom wall 213a and positioned higher than the first bottom wall 213a. In other words, the first bottom wall 213b and the second bottom wall 213b have a height difference by H2.

The second bottom wall 213b may be a horizontal wall or a curved wall that is rounded upward.

The second bottom wall 213b may be positioned directly above the driving device 170 and 171. The second bottom wall 213b is positioned higher than the first bottom wall 213a so that the second bottom wall 213b does not interfere with the driving devices 170 and 171.

In addition, since the second bottom wall 213b is positioned higher than the first bottom wall 213a and there is a water level difference between the second bottom wall 213b and the first bottom wall 213a, the water on a side of the bottom wall 213b can smoothly flow toward a side of the first bottom wall 213a.

In this embodiment, a portion or all of the second bottom wall 213b has the highest height among the bottom walls.

The second bottom wall 213b may be formed to have a larger left and right width than a front and rear width.

The first body 210 may further include a third bottom wall 213c positioned at a different height from the first bottom wall 213a and the second bottom wall 213b.

The third bottom wall 213c is positioned higher than the first bottom wall 213a and is positioned lower than the second bottom wall 213b.

Therefore, the height of the third bottom wall 213c and the first bottom wall 213a is different by H1 smaller than H2.

The third bottom wall 213c may be positioned behind the second bottom wall 213a.

A portion of the third bottom wall 213c is positioned at the rearmost end of the first body 210.

In this embodiment, as the third bottom wall 213c is positioned lower than the second bottom wall 213b, the water storage capacity in the water tank 200 can be increased without interference with the surrounding structure.

The first body 210 may further include a fourth bottom wall 213d extending downward from an edge of the second bottom wall 213b so as to be inclined. The fourth bottom wall 213d may surround the second bottom wall 213b.

The fourth bottom wall 213d may, for example, extend downwardly while being rounded.

The first body 210 may further include a fifth bottom wall 213e which extends so as to be inclined downwardly from the periphery of the fourth bottom wall 213d.

In other words, the height decreases from the second bottom wall 213b toward the fourth bottom wall 213d and the fifth bottom wall 213e.

The fifth bottom wall 213e may connect the fourth bottom wall 213d and the second bottom wall 213e.

In addition, the fifth bottom wall 213e may connect the fourth bottom wall 213d and the first bottom wall 213a.

A portion of the bottom walls of the first body 210 can forms a receiving space 232 and 233 having a recessed shape by the second bottom wall 213b, the fourth bottom wall 213d, and the fifth bottom wall 213e. The driving devices 170 and 171 may be positioned in the receiving spaces 232 and 233.

Accordingly, a portion of the bottom wall of the first body 210 may surround the periphery of each of the driving devices.

The first body 210 may further include a sixth bottom wall 213f which is positioned on the rear side of each of the second wall portions 214b and positioned higher than each of the second wall portions 214b. The sixth bottom wall 213f may be positioned lower than the third bottom wall 213c.

The third bottom wall 213c may be connected to the sixth bottom wall 213f by a connection wall 215g.

Therefore, even if the third bottom wall 213c is positioned on the rear side of the second bottom wall 213c while being lower than the second bottom wall 213c, the water on the second bottom wall 213c can flow to the sixth bottom wall 213f by the connection wall 215g. The water of the sixth bottom wall 213f can flow to the first bottom wall 213a.

The first wall portion 214a of the first bottom wall 213a and the second body 250 may define a connection flow path 226.

Since the first bottom wall 213a positioned at the lowest position forms the connection flow path 226 as described above, water in the first chamber 222 and the second chamber 224 can uniformly flow to the discharge port 216.

The first body 210 may further include a first sidewall 215a extending upward from the first wall portion 214a of the first bottom wall 213a. The first side wall 215a may be the front wall of the first body 210.

The first side wall 215a may extend vertically upward from the front end of the first wall portion 214a.

The first body 210 may further include a second side wall 215b extending upward from the second wall portions 214b of the first bottom wall 213a.

In other words, the pair of second sidewalls 215b extend rearward from both sides of the first sidewall 215a, and the height of the second sidewall 215b increases as the distance from the first sidewall 215a increases.

The pair of second side walls 215b may include a left side wall and a right side wall. At this time, the left side wall may form the first chamber 222, and the right side wall may form the second chamber 224.

An inlet for introducing water into one or more of the pair of second sidewalls 215b may be formed.

FIG. 6 illustrates a state where an inlet is formed in each of the pair of second sidewalls 215b.

For example, the left side wall may have a first inlet 211 for introducing water into the first chamber 222 and the right side wall may have a second inlet 212 for introducing water into the second chamber 224.

At this time, each of the second sidewalls 215b may include a recessed portion 215e recessed inward, and the recessed portion 215e may be provided with each of the inlets 211 and 212.

The first inlet 211 may be covered by a first inlet cover 240 and the second inlet 212 may be covered by a second inlet cover 242.

For example, each inlet cover 240 and 242 may be formed of a rubber material.

The inlet covers 240 and 242 can cover the inlets 211 and 212 in a state of being received in the recessed portion 215e. At this time, the size of the inlet cover 240, 242 is formed to be smaller than the size of the recessed portion 215e.

Therefore, a portion of the recessed portion 215e is covered by the inlet cover 240, 242, the other portion thereof is not covered by the inlet cover 240, 242, and thus a space 215f in which a user's finger can be inserted can be formed.

Accordingly, after inserting the finger into the space 215f, the inlet cover 240, 242 may be pulled so that the inlet cover 240, 242 opens the inlet 211, 212.

According to the present embodiment, the water tank 200 is provided with each of the inlets 211 and 212 on both sides of the water tank 200, so that it is possible to easily introduce water into the water tank 200 by opening any one of the two inlets.

The inlet cover 240, 242 may be positioned between the space 215f and the first sidewall 215a such that the size of the space 215f is secured.

The first body 210 may further include a third side wall 215c extending upward from a rear end of the third bottom wall 213c.

In addition, the first body 210 may further include a front and rear extending wall 215d which extends forward from an end portion of the third side wall 215c and is connected to a third bottom wall 213c, a fourth bottom wall 213d, and a fifth bottom wall 213e.

In the first body 210, the pair of front and rear extending walls 215d are disposed and spaced apart from each other in the lateral direction.

A pair of front and rear extending walls 215d are disposed to face each other. When the water tank 200 is seated on the nozzle housing 100, the connection tube 50 can be positioned between the pair of front and rear extending walls 215d.

The pair of front and rear extending walls 215d are positioned higher than the first bottom wall 213a.

In this embodiment, the chamber is formed by the first body 210 and the second body 250, and the second bottom wall 213b and the second body 250 are separated from each other to receive water, and the second bottom wall 213b and the second body 250 has the difference in height by H3.

The first bottom wall 213a and the second body 250 has the difference in height by H4. At this time, H4 is larger than H3. According to this structure, there is an advantage that the water storage capacity can be increased while reducing the height (or total thickness) of the water tank 200.

The first body 210 may include a first slot 218 for preventing interference with the operating unit 300 and the coupling units 310 and 254. The first slot 218 may be formed such that the center rear end portion of the first body 210 is recessed forward. At this time, the pair of front and rear extending walls 215d may form a portion of the first slot 218.

In addition, the second body 250 may include a second slot 252 for preventing interference with the operating unit 300. The second slot 252 may be formed such that the center rear end portion of the second body 230 is depressed forward.

The second body 250 may further include a slot cover 253 covering a portion of the first slot 218 of the first body 210 in a state of being coupled to the first body 210. In other words, the front and rear length of the second slot 252 is shorter than the front and rear length of the first slot 218.

The second coupling unit 254 may extend downward from the slot cover 253. Accordingly, the second coupling unit 254 may be positioned within the space formed by the first slot 218.

Accordingly, when the overall shape of the water tank 200 is viewed, the length of the water tank 200 in the lateral direction is longer than that of the water tank 200 in the front and rear direction. The front and rear lengths of the central portion of the water tank 200 where the slots 218 and 252 are positioned are shorter than the front and rear lengths of both sides.

The water tank 200 has a symmetrical shape with respect to the slots 218 and 252.

The water tank 200 may further include a coupling rib 235 and 236 for coupling with the nozzle cover 130 before the second coupling unit 254 of the water tank 200 is coupled with the first coupling unit 310.

The coupling ribs 235 and 236 also performs a role which guides the coupling position of the water tank 200 in the nozzle cover 130 before the second coupling unit 254 of the water tank 200 is coupled with the first coupling unit 310. For example, a plurality of coupling ribs 235 and 236 protrude from the first body 110 and may be disposed so as to be spaced apart in the left and rear horizontal direction.

Though not limited, the plurality of coupling ribs 235 and 236 may protrude forward from the first sidewall 215a of the first body 210 and may be spaced apart from each other in the lateral direction.

Each of the driving devices 170 and 171 is provided in the nozzle main body 10 so that a portion of the nozzle main body 10 protrudes upward at both sides of the second flow path 114 by each of the driving devices 170 and 171.

According to the present embodiment, the portion protruding from the nozzle body 10 is positioned in the pair of receiving spaces 232 and 233 of the water tank 200. The pair of receiving spaces 232 and 233 may be divided into right and left by the first slot 218.

<Nozzle Cover>

Figure 14:
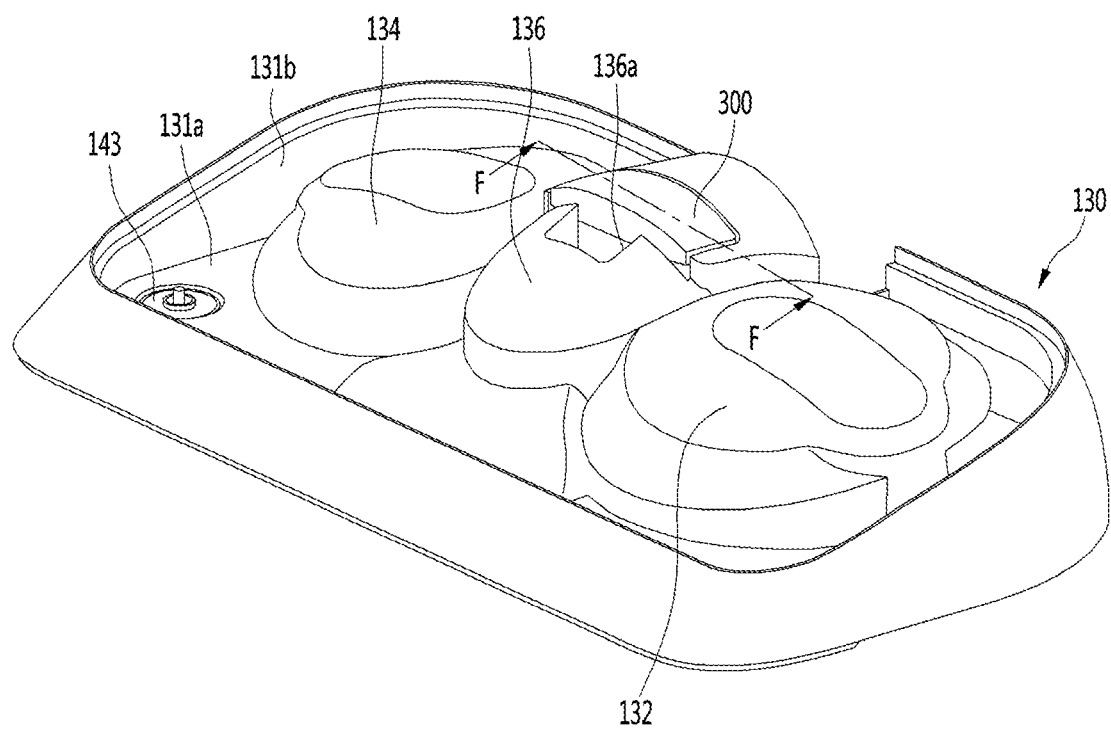
FIG. 14 is a perspective view illustrating a nozzle cover according to an embodiment of the present invention as viewed from above.
Figure 15:
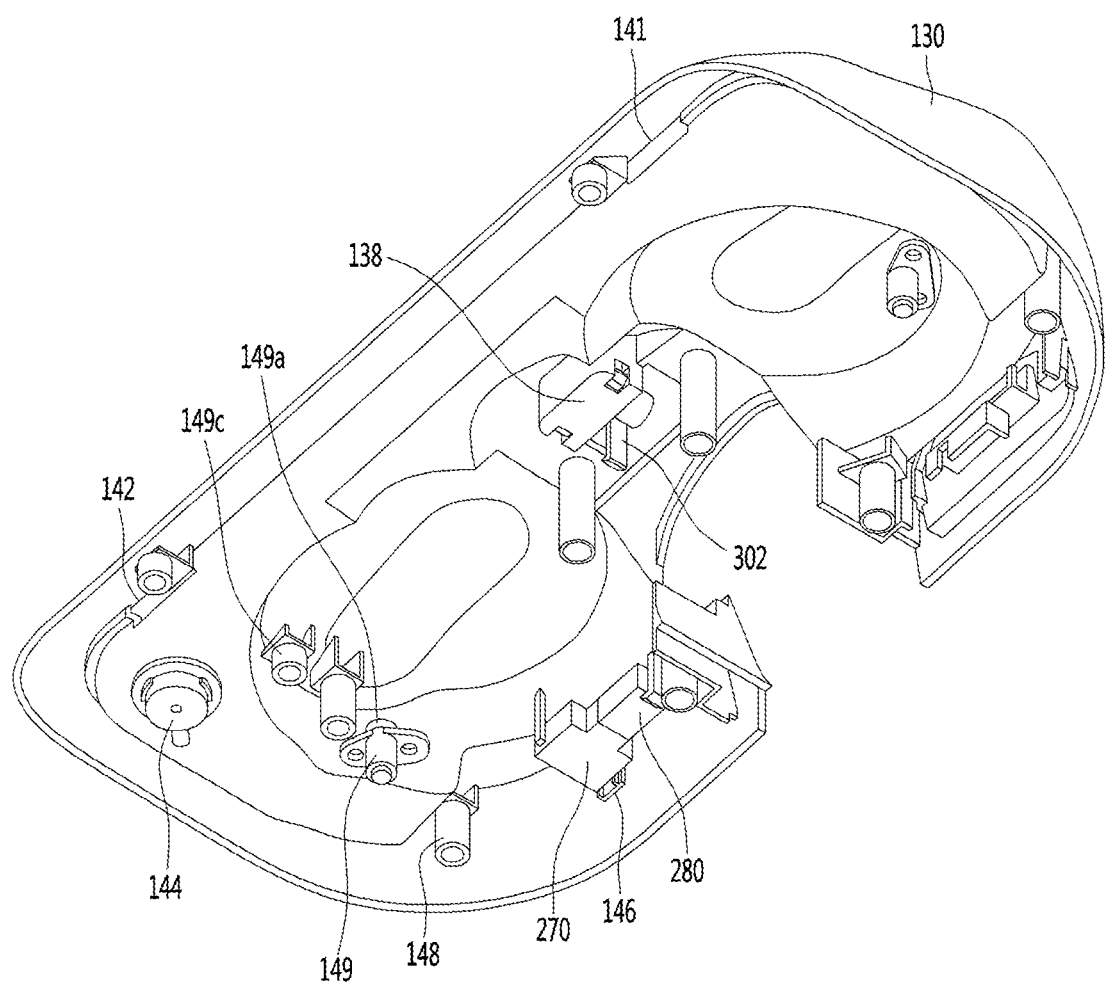
FIG. 15 is a perspective view illustrating a nozzle cover according to an embodiment of the present invention as viewed from below.

FIG. 14 is a perspective view illustrating a nozzle cover according to an embodiment of the present invention as viewed from above, and FIG. 15 is a perspective view illustrating a nozzle cover according to an embodiment of the present invention as viewed from below.

Referring to FIG. 6, FIG. 14, and FIG. 15, the nozzle cover 130 may include a bottom wall 131a and a peripheral wall 131b extending upward at the edge of the bottom wall 131a.

The nozzle cover 130 may include driving unit covers 132 and 134 that cover the upper side of each of the driving units 170 and 171.

Each of the driving unit covers 132 and 134 is a portion which protrudes upward from the bottom wall 131a of the nozzle cover 130. The driving unit covers 132 and 134 may be separated from the peripheral wall 131b. Therefore, a space may be formed between the driving unit covers 132 and 134 and the peripheral wall 131b, and the water tank 200 may be positioned in the space.

Accordingly, the increase in the height of the nozzle 1 by the water tank 200 can be prevented in a state where the water tank 200 is seated on the nozzle cover 130 while the storage capacity of the water tank 200 can be increased.

Each of the driving unit covers 132 and 134 is a portion which protrudes upward from the nozzle cover 130. Each of the driving unit covers 132 and 134 can surround the upper side of the driving devices 170 and 171 without interfering with each of the driving devices 170 and 171 installed in the nozzle base 110. In other words, the driving unit covers 132 and 134 are spaced apart from each other in the lateral direction in the nozzle cover 130.

When the water tank 200 is seated on the nozzle cover 130, each of the driving unit cover 132 and 134 is received in each of the receiving spaces 232 and 233 of the water tank 200, and thus interference between the components is prevented.

In addition, in the water tank 200, the first chamber 222 and the second chamber 224 may be disposed so as to surround the periphery of each of the respective driving unit covers 132 and 134.

Thus, according to the present embodiment, the volumes of the first chamber 222 and the second chamber 224 can be increased.

The first body 210 of the water tank 200 may be seated at a lower portion of the nozzle cover 130 than the driving unit cover 132 and 134.

At least a portion of the bottom wall of the water tank 200 may be positioned lower than the axis of the driving motor (see A3 and A4 in FIG. 21) to be described later so that the height increase by the water tank 200 is minimized.

For example, the first bottom wall 213a of the water tank 200 may be positioned lower than the axis of the driving motor (A3 and A4), which will be described later.

The nozzle cover 130 may further include a flow path cover 136 covering the flow path forming portion 150. The flow path cover 136 may be positioned between the driving unit covers 132 and 134 and may be disposed at a position corresponding to the first slot 218 of the water tank 200.

The nozzle cover 136 may also protrude upward from the bottom wall 131a of the nozzle cover 130.

In the present embodiment, so as to increase the water storage capacity of the water tank 200, a portion of the water tank 200 may be positioned on both sides of the flow path cover 136. Therefore, the water storage capacity of the water tank 200 can be increased while preventing the water tank 200 from interfering with the second flow path 114.

In addition, so as to prevent the water tank 200 from colliding with structures around the nozzle 1 during the movement of the nozzle 1, the entire water tank 200 can be disposed to overlap with the nozzle housing 100 in the vertical direction. In other words, the water tank 200 may not protrude in the lateral and the front and rear directions of the nozzle housing 100.

The first bottom wall 213a of the water tank 200 may be seated on the bottom wall 131a of the nozzle cover 130. In this state, the slot cover 253 of the water tank 200 may be positioned directly above the flow path cover 136. The slot cover 253 may be in contact with the flow path cover 136 or may be spaced apart from the flow path cover 136.

When the water tank 200 is mounted on the nozzle cover 130, the slot cover 253 is positioned in front of the operation unit 300.

When the water tank 200 is seated on the nozzle cover 130, the first body 210 may be surrounded by the peripheral wall 132b of the nozzle cover 130. Accordingly, when the water tank 200 is seated on the nozzle cover 130, the inlet cover on both sides of the water tank 200 is covered by the peripheral wall 132b of the nozzle cover 130 and is not exposed to the outside.

The nozzle cover 130 may further include rib insertion holes 141 and 142 into which the coupling ribs 235 and 236 provided in the water tank 200 are inserted. The rib insertion holes 141 and 142 may be spaced apart from the nozzle cover 130 in the lateral horizontal direction.

Accordingly, the center or rear portion of the water tank 200 is moved downward in a state where the coupling ribs 235 and 236 are inserted into the rib insertion holes 141 and 142, and thus the second coupling unit 254 may be coupled to the first coupling unit 310.

The nozzle cover 130 may be provided with a valve operating unit 144 for operating the valve 230 in the water tank 200. The valve operating unit 144 may be coupled to the nozzle cover 130.

The water discharged from the water tank 200 can flow through the valve operating unit 144.

The valve operating unit 144 may be coupled to the lower side of the nozzle cover 130, and a portion of the valve operating unit 144 may protrude upward through the nozzle cover 130.

The valve operating unit 144 protruding upward is introduced in the water tank 200 through the discharge port 216 of the water tank 200 when the water tank 200 is seated on the nozzle cover 130. In other words, the valve operating unit 144 may be disposed at a position facing the discharge port 216 of the water tank 200.

The valve operating unit 144 will be described later with reference to the drawings.

The nozzle cover 130 may be provided with a sealer 143 for preventing water discharged from the water tank 200 from leaking from the vicinity of the valve operating unit 144. The sealer 143 may be formed of rubber material, for example, and may be coupled to the nozzle cover 130 from above the nozzle cover 130.

The nozzle cover 130 may be provided with a water pump 270 for controlling water discharge from the water tank 200. The water pump 270 may be connected to a pump motor 280.

A pump installation rib 146 for installing the water pump 270 may be provided on the lower side of the nozzle cover 130. The water pump 270 and the pump motor 280 are installed in the nozzle cover 130 so that the pump motor 280 is prevented from contacting the water even if the water drops into the nozzle base 110.

The water pump 270 is a pump that operates so as to communicate the inlet and the outlet by expanding or contracting the valve body therein while being operated, and the pump can be realized by a well-known structure, and thus a detailed description thereof will be omitted.

The valve body in the water pump 270 can be driven by the pump motor 280. Therefore, according to the present embodiment, water in the water tank 200 can be continuously and stably supplied to the rotation cleaning units 40 and 41 while the pump motor 280 is operating.

The operation of the pump motor 280 can be adjusted by operating the above-described adjusting unit 180. For example, the adjusting unit 180 may select the on/off state of the pump motor 280.

Alternatively, the output (or rotational speed) of the pump motor 280 may be adjusted by the adjusting unit 180.

The nozzle cover 130 may further include at least one fastening boss 148 to be coupled with the nozzle base 110.

In addition, the nozzle cover 130 may be provided with a spray nozzle 149 for spraying water to the rotation cleaning units 40 and 41 to be described later. For example, a pair of spray nozzles 149 may be installed on the nozzle cover 130 in a state where the spray nozzles 149 are spaced apart from each other in the lateral direction.

The nozzle cover 130 may be provided with a nozzle installation boss 149c for mounting the spray nozzle 149. For example, the spray nozzle 149 may be fastened to the nozzle installation boss 149c by a screw.

The spray nozzle 149 may include a connection unit 149a for connecting a branch tube to be described later.

<Description of Structure and Operation of Operating Unit, First Coupling Unit, and Supporting Body>

Figure 16:
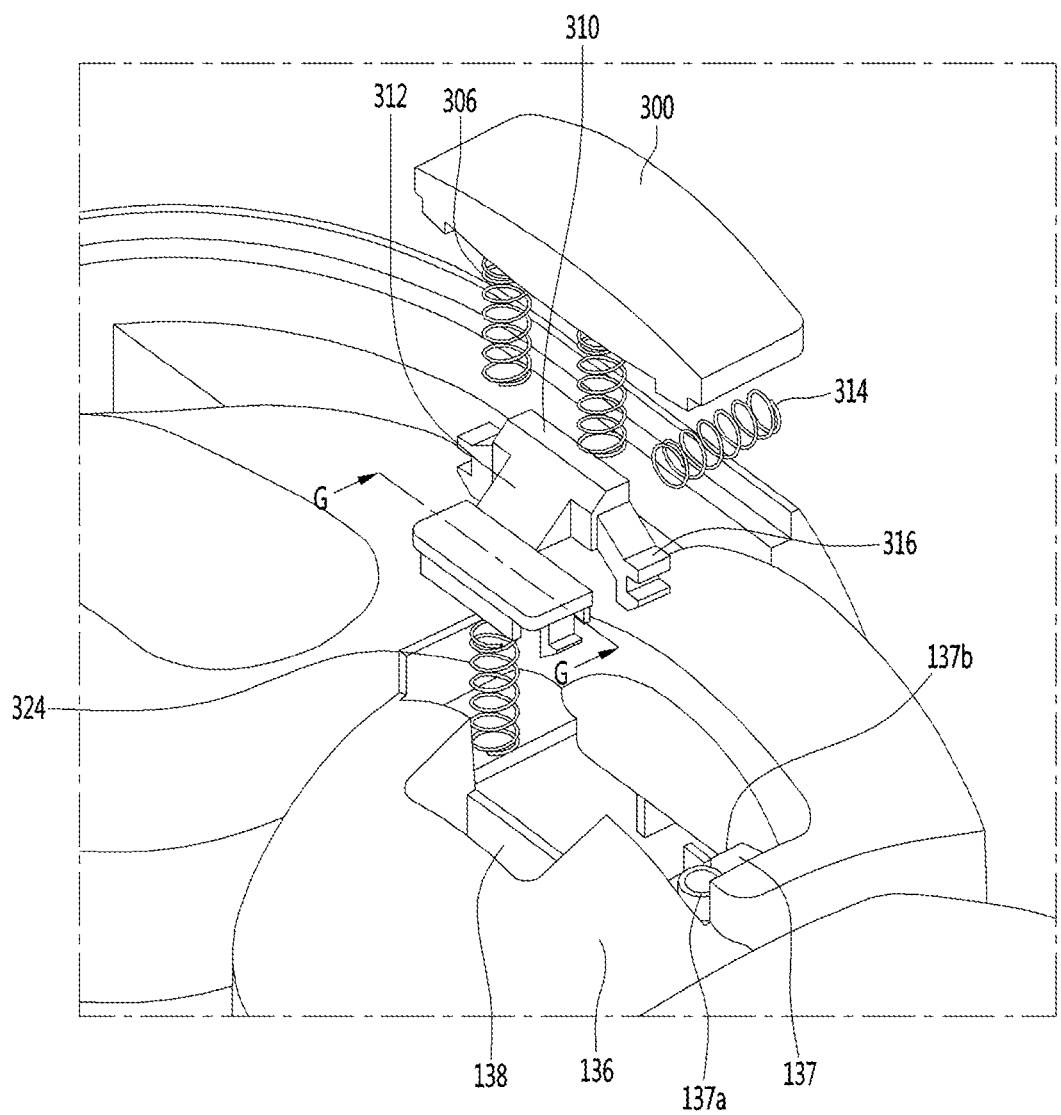
FIG. 16 is a perspective view illustrating a state where the operating unit, the first coupling unit, and the supporting body are separated from each other in the nozzle cover.
Figure 17:
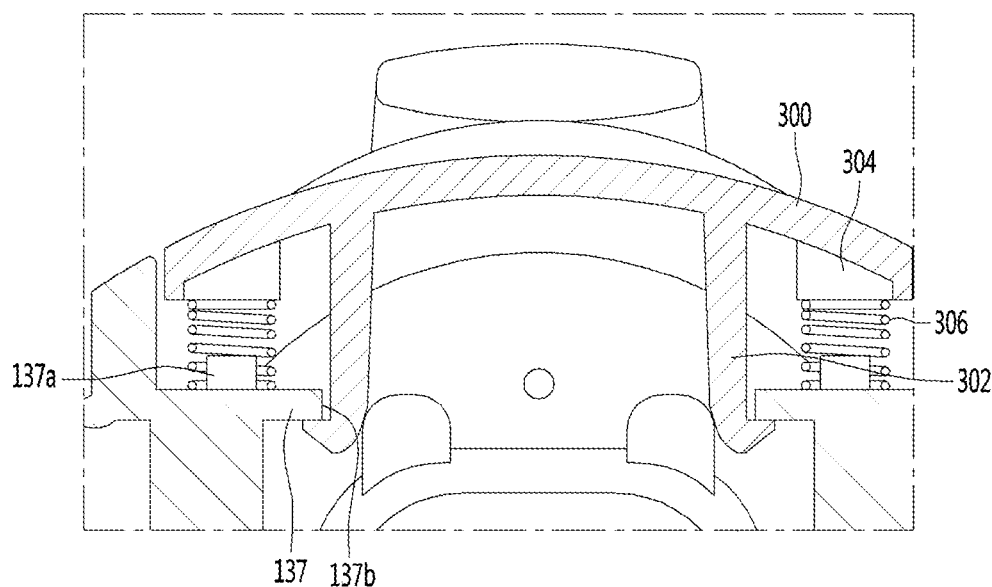
FIG. 17 is a sectional view taken along line F-F of FIG. 14.

FIG. 16 is a perspective view illustrating a state where the operating unit, the first coupling unit, and the supporting body are separated from each other in the nozzle cover, and FIG. 17 is a sectional view taken along line F-F of FIG. 14.

Figure 18:
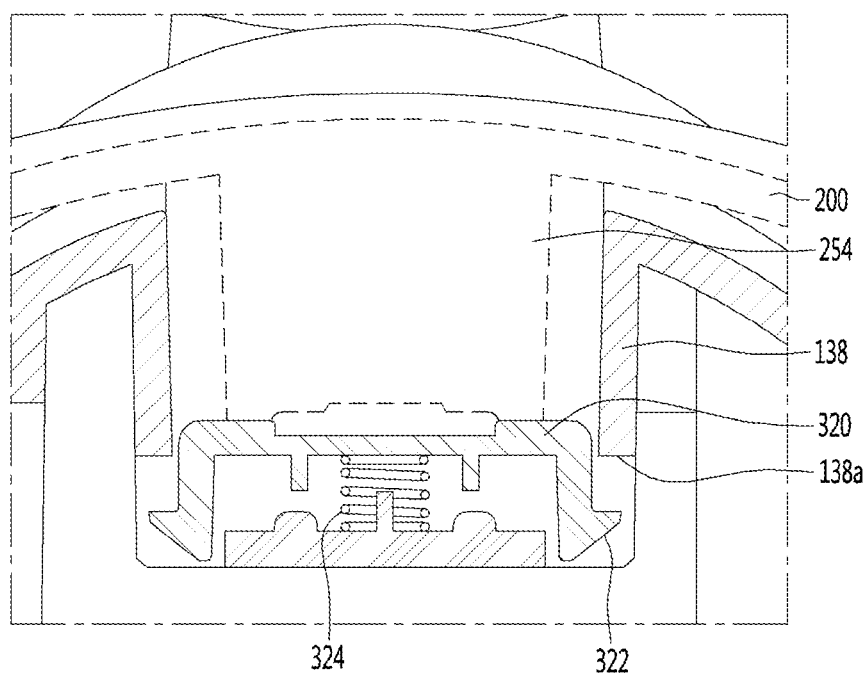
FIG. 18 is a sectional view taken along the line G-G in FIG. 17 in a state where the first coupling unit is coupled with the nozzle cover.
Figure 19:
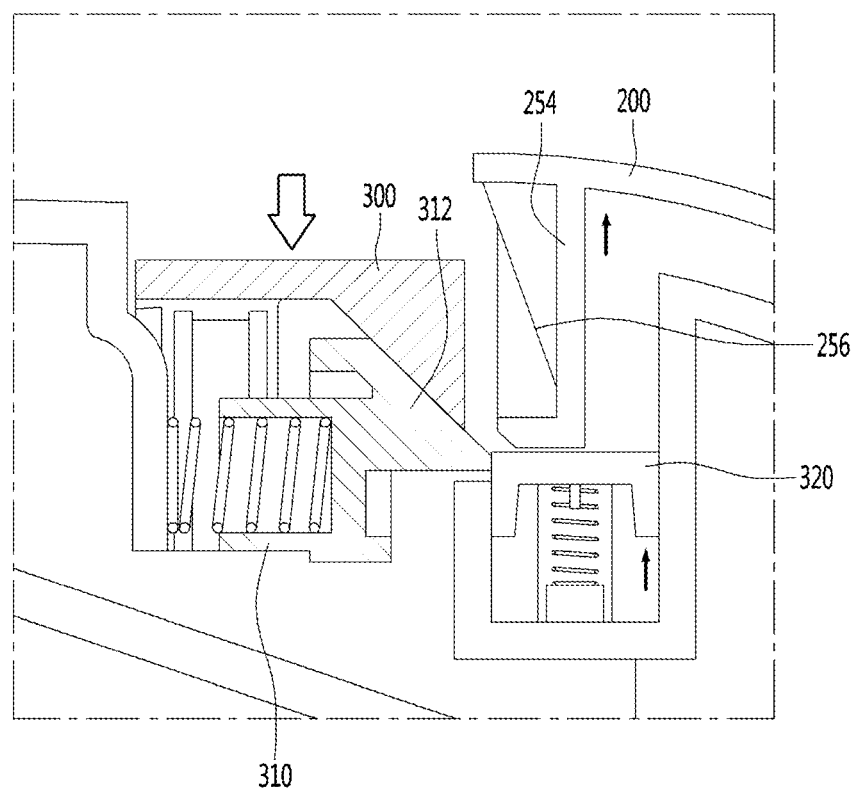
FIG. 19 is a sectional view illustrating a state where the first coupling unit and the second coupling unit are released by pressing the operation unit.

FIG. 18 is a sectional view taken along the line G-G in FIG. 17 in a state where the first coupling unit is coupled with the nozzle cover, and FIG. 19 is a sectional view illustrating a state where the first coupling unit and the second coupling unit are released by pressing the operation unit.

Referring to FIG. 16 to FIG. 19, the operating unit 300 may be supported by the flow path cover 136. The flow path cover 136 may include an operating unit receiving portion 137 having a recessed shape for supporting and receiving the operating unit 300.

On both sides of the operating unit 300, a coupling hook 302 for coupling the operating unit 300 to the flow path cover 136 may be provided.

The operating unit 300 can be received in the operating unit receiving portion 137 from above the operating unit receiving portion 137.

The bottom wall of the operating unit receiving portion 137 is provided with a slot 137b penetrating in the vertical direction and the coupling hook 302 penetrates the slot 137b to be hooked on the lower surface of the bottom wall of the operating unit receiving portion 137.

When the coupling hook 302 is hooked on the bottom wall of the operating unit receiving portion 137, the operating unit 300 can be prevented from being displaced upward of the flow path cover 136.

The operating unit 300 may be elastically supported by the first elastic member 306. A plurality of first elastic members 306 can support the operating unit 300 so that the operating unit 300 is not moved to one side when the operation unit 300 is operated.

The plurality of first elastic members 306 may be disposed to be spaced apart from each other in the lateral direction, although not limited thereto.

The operating unit 300 may include a first coupling protruding portion 304 for coupling each of the first elastic members 306. The first coupling protruding portion 304 may protrude downward from a lower surface of the operating unit 300. The protruding length of the first coupling protruding portion 304 may be shorter than the protruding length of the coupling hook 302.

The first elastic member 306 may be, for example, a coil spring, and the upper side of the first elastic member 306 may be received in the first coupling protruding portion 304. For this, the first coupling protruding portion 304 may be a cylindrical rib that forms a space therein.

The bottom wall of the operating unit receiving portion 137 may include a second coupling protruding portion 137a to which the first elastic member 306 is coupled.

The second coupling protruding portion 137a may protrude upward from the bottom wall of the operating unit receiving portion 137. In a state where the first elastic member 306 is wrapped around the second coupling protruding portion 137a, the first elastic member 306 can be seated on the bottom wall of the operating unit receiving portion 137. In other words, the second coupling protruding portion 137a may be received in the space formed by the first elastic member 306.

The outer diameter of the second coupling protruding portion 137a may be smaller than the inner diameter of the first coupling protruding portion 304. Therefore, the second coupling protruding portion 137a and the first coupling protruding portion 324 can be prevented from colliding with each other during the descent of the operating unit 300.

The first coupling unit 310 is positioned on the slot 137b of the operating unit receiving portion 137 and both side end portions thereof can be coupled with the bottom wall of the operating unit receiving portion 137.

The first coupling unit 310 may include a hook 312 and may include coupling rails 316 on both sides of which the bottom wall of the operating unit receiving portion 137 is coupled.

A portion of the coupling rail 316 can be seated on the upper surface of the bottom wall of the operating unit receiving portion 137 and another portion of the coupling rail 316 can contact the lower surface of the bottom portion of the receiving portion 137.

Therefore, the first coupling unit 310 can be stably moved in the horizontal direction in a state of being coupled to the bottom wall of the operation unit receiving portion 137 by the coupling rail 316.

As described above, the first coupling unit 310 may be elastically supported by the second elastic member 314 and the second elastic member 314 may elastically support the first coupling unit 310 on the opposite side of the hook 312.

The flow path cover 136 may further include a coupling unit receiving portion 136a in which the second coupling unit 254 is received. The coupling unit receiving portion 136a may be positioned in front of the operation unit receiving portion 137.

The flow path cover 136 may further include a body receiving portion 138 positioned below the coupling unit receiving portion 136a and receiving the supporting body 320.

Accordingly, the second coupling unit 254 may be positioned directly above the supporting body 320 in a state where the second coupling unit 254 is received in the coupling unit receiving portion 136a.

The supporting body 320 may include a pair of coupling hooks 322 for coupling to the body receiving portion 138. The body receiving portion 138 may be provided with a hook coupling slot 138a to which the coupling hooks 322 are coupled.

The supporting body 320 can be moved vertically in a state where the coupling hook 322 of the supporting body 320 is coupled to the hook coupling slot 138a. Therefore, the hook coupling slot 138a may extend in the vertical direction.

The supporting body 320 may be resiliently supported by the third elastic member 324.

In a state in which the coupling of the first coupling unit 310 and the second coupling unit 254 is released, the third elastic member 324 supporting the supporting body 320 may provide an elastic force for moving the second coupling unit 254 upward to the second coupling unit.

In a state where the first coupling unit 310 is coupled with the second coupling unit 254, the second coupling unit 254 presses the supporting body 320 and the third elastic member 324 is contracted to accumulate elastic force.

In this state, so as to separate the water tank 200, when the operating unit 300 is pressed downward, the downward movement force of the operating unit 300 is transmitted to the first coupling unit 310 so that the first coupling unit 310 is moved in the horizontal direction.

At this time, the first coupling unit 310 is moved in a direction away from the second coupling unit 254 so that the hook 312 of the first coupling unit 310 is missed from the groove 256 of the second coupling unit 254 and thus the coupling of the first coupling unit 310 and the second coupling unit 254 is released.

The force pressing the third elastic member 324 is removed and the elastic restoring force of the third elastic member 324 is transmitted to the supporting body 320 so that the support body 320 lifts the second coupling unit 254 placed on the supporting body 320.

Then, the portion of the second coupling unit 254 in the water tank 200 is lifted above the nozzle cover 130. Therefore, there is a gap between the water tank 200 and the nozzle cover 130, so that the user can easily grasp the water tank 200.

When the force for pressing the operating unit 300 is removed in a state where the second coupling unit 254 is lifted to a predetermined height, the first coupling unit 310 is returned to the original position thereof by the second elastic member 314.

The hook of the first coupling unit 310 protrudes into the coupling unit receiving portion 136a and is positioned on the upper side of the supporting body 320. The lower end of the second coupling unit 254 is positioned on the hook 312 of the first coupling unit 310.

Figure 20:
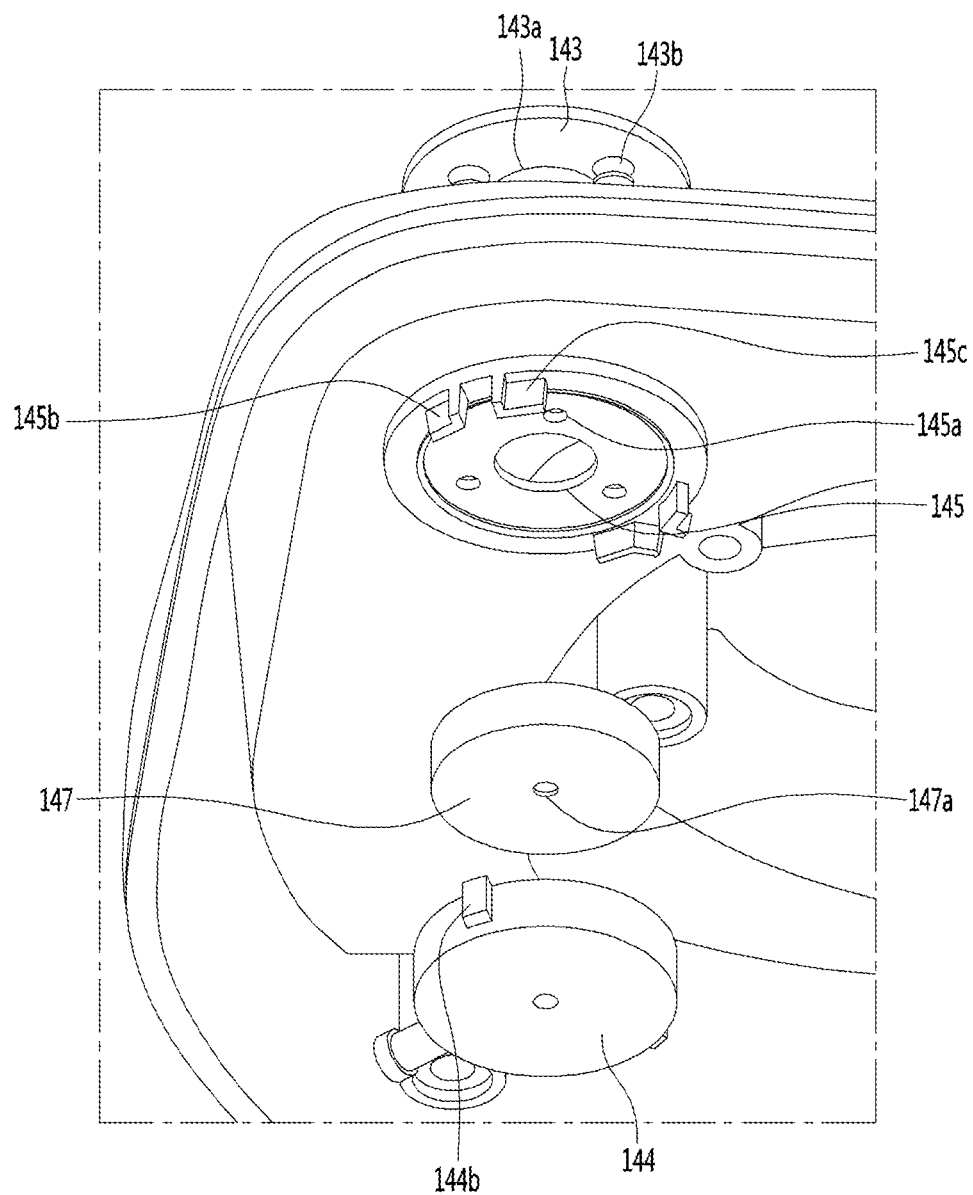
FIG. 20 is a view illustrating a state where a valve operating unit and a sealer are separated from each other in a nozzle cover according to an embodiment of the present invention.

FIG. 20 is a view illustrating a state where a valve operating unit and a sealer are separated from each other in a nozzle cover according to an embodiment of the present invention.

Referring to FIG. 20, the nozzle cover 130 may include a water passage opening 145 formed at a position corresponding to the discharge port 216 of the water tank 200.

A sealer 143 is coupled to the bottom wall 131a at an upper side of the bottom wall 131a of the nozzle cover 130 and the valve operating unit 144 is coupled to the bottom wall 131a, 131a at a lower side of the bottom wall 131a.

The sealer 143 may include a hole 143a formed at a position corresponding to the water passage opening 145. The water can pass through the water passage opening 145 after passing through the hole 143a.

The sealer 143 may further include a coupling protrusion 143b formed around the hole 143a and coupled to the bottom wall 131a of the nozzle cover 130. The bottom wall 131a of the nozzle cover 130 may have a protrusion hole 145a for coupling with the coupling protrusion 143b.

A guide protrusion 144b for guiding the coupling position of the valve operating unit 144 may be provided around the valve operating unit 144. A pair of guide ribs 145b and 145c spaced apart from each other in the horizontal direction may be provided on the bottom surface of the bottom wall 131a of the nozzle cover 130 so that the guide protrusion 144b may be positioned.

An absorption member 147 capable of absorbing water discharged from the water tank 200 may be coupled to the valve operating unit 144. When water is discharged from the water tank 200, the absorption member 147 primarily absorbs water and when the amount of water discharged from the water tank 200 increases, the water absorbed by the absorption member 147 can be supplied to the mops 402 and 404 through the water supply flow path to be described later.

The absorption member 147 may be formed in a cylindrical shape, for example, and may include a pressing portion hole 147a through which the pressing portion 144a to be described later penetrates.

The valve operating unit 144 may be coupled to the nozzle cover 130 in a state where the absorbing member 147 is coupled to the valve operating unit 144.

The valve operating unit 144 may be coupled to the nozzle cover 130 by a fusion bonding method or may be coupled to the nozzle cover 130 by an adhesive, although not limited thereto.

The absorption member 147 may also act to filter foreign matters contained in the water discharged from the water tank 200.

<Nozzle Base>

Figure 21:
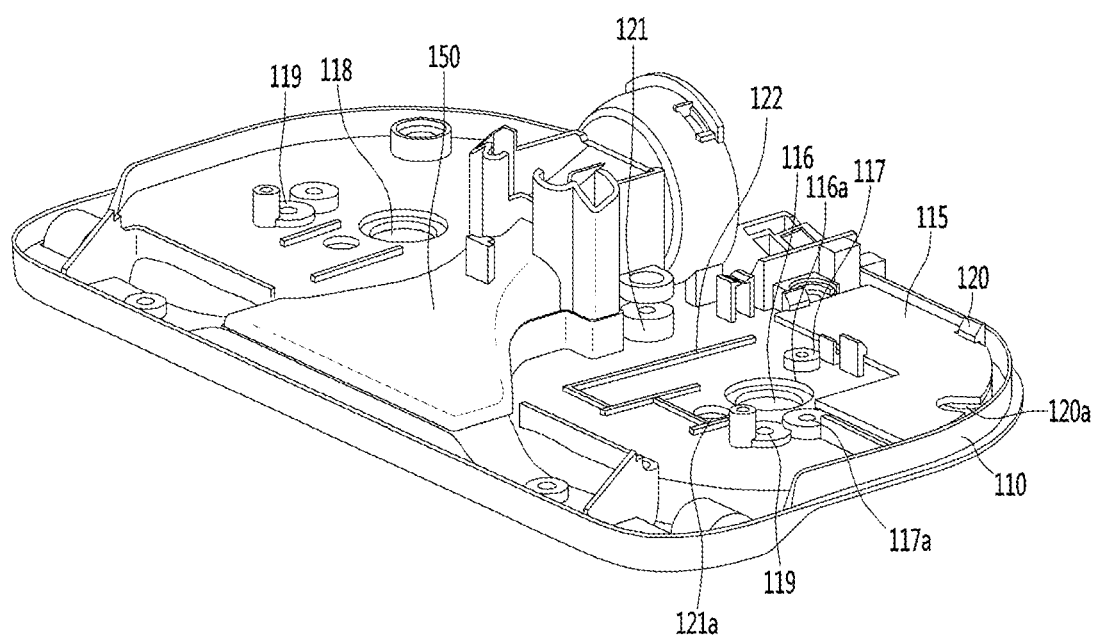
FIG. 21 is a view illustrating a state where a flow path forming portion is coupled to a nozzle base according to an embodiment of the present invention.
Figure 22:
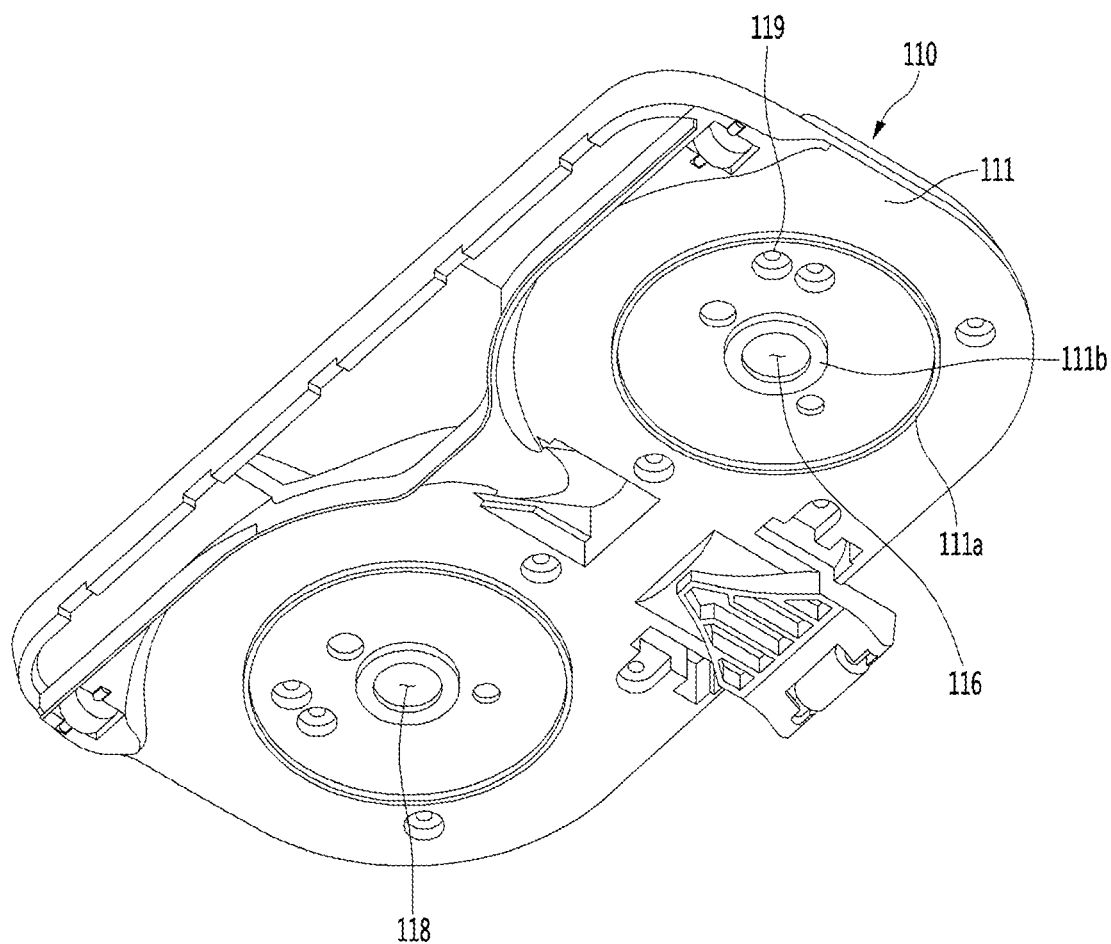
FIG. 22 is a view illustrating a nozzle base according to an embodiment of the present invention as viewed from below.

FIG. 21 is a view illustrating a state where a flow path forming portion is coupled to a nozzle base according to an embodiment of the present invention, and FIG. 22 is a view illustrating a nozzle base according to an embodiment of the present invention as viewed from below.

Referring to FIG. 6, FIG. 21, and FIG. 22, the nozzle base 110 may include a pair of shaft through-holes 116 and 118 through which a transmission shaft (to be described later) that is connected to each of the rotation plates 420 and 440 in each of the driving devices 170 and 171 passes.

The nozzle base 110 is provided with a seating groove 116a for seating a sleeve (see 174 in FIG. 24) provided in each of the driving devices 170 and 171, and the shaft through-holes 116 and 118 may be formed in the seating groove 116a.

The seating groove 116a may be formed in a circular shape, as an example and may be recessed downward from the nozzle base 110. The shaft through-holes 116 and 118 may be formed in the bottom of the seating groove 116a.

In the process of moving the nozzle 1 or the operation of the driving devices 170 and 171 as the sleeves (see 174 in FIG. 24) provided in the driving devices 170 and 171 are seated in the seating grooves 116a, the horizontal movement of the driving devices 170 and 171 can be restricted.

A protruding sleeve 111b protruding downward is provided on a lower surface of the nozzle base 110 at a position corresponding to the seating groove 116a. The protruding sleeve 111b is a portion which is formed as the lower surface of the nozzle base 110 protrudes downward substantially as the seating groove 111b is recessed downward.

Each of the shaft through-holes 116 and 118 may be disposed on both sides of the flow path forming portion 150 in a state where the flow path forming portion 150 is coupled to the nozzle base 110.

The nozzle base 110 may be provided with a board installation portion 120 for installing a control board 115 (or first board) for controlling each of the driving devices 170 and 171. For example, the board installation portion 120 may be formed as a hook shape extending upward from the nozzle base 110.

The hooks of the board installation portion 120 are hooked on the upper surface of the control board 115 to restrict upward movement of the control board 115.

The control board 115 may be installed in a horizontal state. The control board 115 may be installed so as to be spaced apart from the bottom of the nozzle base 110.

Therefore, even if water falls to the bottom of the nozzle base 110, water can be prevented from contacting the control board 115.

The nozzle base 110 may be provided with a support protrusion 120a for supporting the control board 115 away from the bottom.

The board installation portion 120 may be positioned at one side of the flow path forming portion 150 in the nozzle base 110, although not limited thereto. For example, the control board 115 may be disposed at a position adjacent to the adjusting unit 180.

Therefore, a switch (to be described later) installed on the control board 115 can sense the operation of the adjusting unit 180.

In the present embodiment, the control board 115 may be positioned on the opposite side of the valve operating unit 144 with respect to the second flow path 114. Therefore, even if leakage occurs in the valve operating unit 144, water can be prevented from flowing to a side of the control board 115.

The nozzle base 110 may further include supporting ribs 122 for supporting the lower sides of each of the driving devices 170 and 171 and fastening bosses 117 and 117a for fastening each of the driving devices 170 and 171.

The supporting ribs 122 protrude from the nozzle base 110 and are bent at least once to separate each of the driving devices 170 and 171 from the bottom of the nozzle base 110. Alternatively, a plurality of spaced apart supporting ribs 122 may protrude from the nozzle base 110 to separate each of the driving devices 170 and 171 from the bottom of the nozzle base 110.

Even if water falls to the bottom of the nozzle base 110, the driving devices 170 and 171 are spaced apart from the bottom of the nozzle base 110 by the supporting ribs 122 so that it is possible to minimize the flow of water to the side of the driving device 170, 171.

Figure 24:
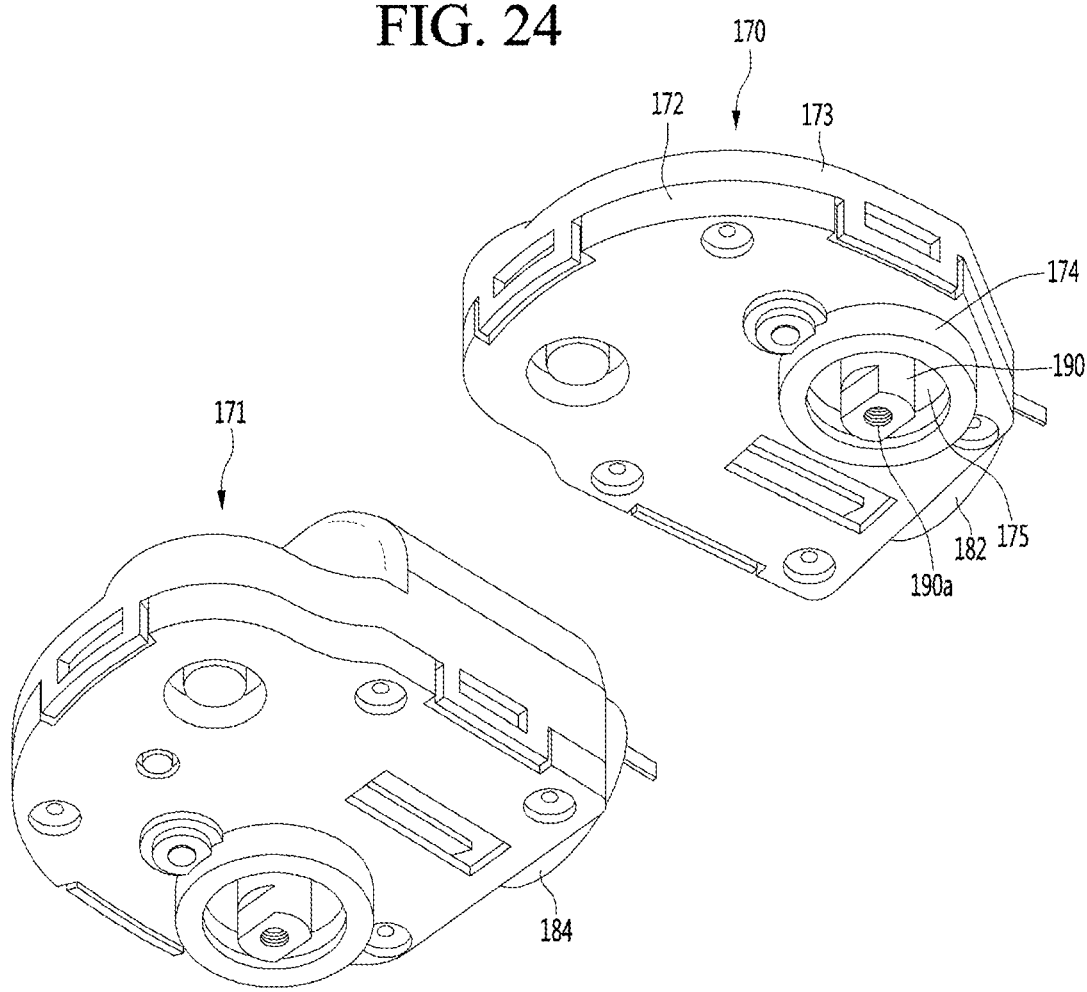
FIG. 24 is a view illustrating the first and second driving devices according to one embodiment of the present invention as viewed from below.

In addition, since the sleeves (see 174 in FIG. 24) of the driving devices 170 and 171 are seated in the seating grooves 116a, even if water falls to the bottom of the nozzle base 110, it can be prevented water from being drawn into the driving device 170, 171 by the sleeve (see 174 in FIG. 24).

In addition, the nozzle base 110 may further include a nozzle hole 119 through which each of the spray nozzles 149 passes.

A portion of the spray nozzle 149 coupled to the nozzle cover 130 may pass through the nozzle hole 119 when the nozzle cover 130 is coupled to the nozzle base 110.

In addition, the nozzle base 110 may further include an avoidance hole 121a for preventing interference with the structures of each of the driving devices 170 and 171, and a fastening boss 121 for fastening the flow path forming portion 150.

At this time, a fastening member passing through the flow path forming portion 150 can be fastened to a fastening boss 121 after passing through a portion of the driving devices 170 and 171.

A portion of each of the driving devices 170 and 171 may be positioned in the avoidance hole 121a so that the supporting rib 122 may be positioned at the periphery of the avoidance hole 121a so as to minimize the flow of water to the avoidance hole 121a.

For example, the supporting rib 122 may be positioned in the avoidance hole 121a in the formed region.

A plate receiving portion 111 which is recessed upward can be provided on the lower surface of the nozzle base 110 so that the first flow path 112 is as close as possible to the floor on which the nozzle 1 is placed in a state where the rotation cleaning units 40 and 41 is coupled to the lower side of the nozzle base 110.

The increase in the height of the nozzle 1 can be minimized in a state where the rotation cleaning units 40 and 41 are coupled by the plate receiving portion 111.

The rotation cleaning units 40 and 41 may be coupled with the driving devices 170 and 171 in a state where the rotation cleaning units 40 and 41 are positioned in the plate receiving portion 111.

The nozzle base 110 may be provided with a bottom rib 111a disposed to surround the shaft through holes 116 and 118. The bottom rib 11a may protrude downward from the lower surface of the plate receiving portion 111 and may be formed in a circular ring shape, as an example.

The shaft through holes 116 and 118, the nozzle holes 119, and an avoidance holes 121a can be positioned in the region formed by the bottom rib 111a.

<Installation Position of a Plurality of Switches>

Figure 23:
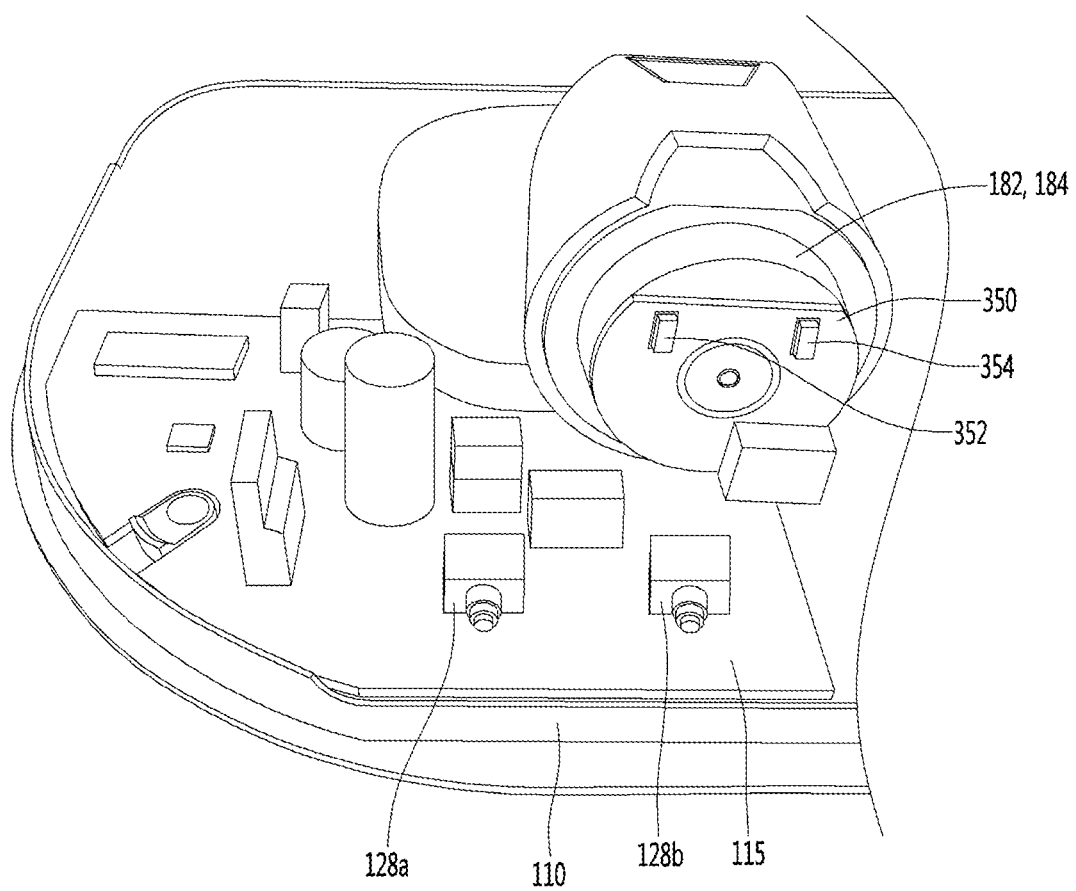
FIG. 23 is a view illustrating a plurality of switches provided on a control board according to an embodiment of the present invention.

FIG. 23 is a view illustrating a plurality of switches provided on a control board according to an embodiment of the present invention.

Referring to FIG. 4 and FIG. 23, the nozzle base 110 is provided with a control board 115 as described above. A plurality of switches 128a and 128b may be provided on the upper surface of the control board 115 to sense the operation of the adjusting unit 180.

The plurality of switches 128a and 128b may be installed in a state of being spaced apart in the lateral direction.

The plurality of switches 128a and 128b may include a first switch 128a for sensing a first position of the adjusting unit 180 and a second switch 128b for sensing a second position of the adjusting unit 180.

For example, when the adjusting unit 180 is pivoted to the left and moves to the first position, the adjusting unit 180 presses the contact of the first switch 128a to turn on the first switch 128a. In this case, the pump motor 280 operates as a first output, and water can be discharged by the first amount per unit time in the water tank 200.

When the adjusting unit 180 pivots to the right and moves to the second position, the adjusting unit 180 presses the contact of the second switch 128b so that the second switch 128b is turned on.

In this case, the pump motor 280 operates as a second output, which is larger than the first output, so that the water can be discharged by the second amount per unit time in the water tank 200.

The pump motor 280 may be controlled by a controller installed on the control board 115. The controller can control the duty of the pump motor 280.

For example, the controller may control the pump motor 280 to be off for M seconds after N seconds of on. The pump motor 280 may be repeatedly turned on and off for discharging water from the water tank 200.

At this time, the off time may be varied in a state where the on time of the pump motor 280 is maintained by the operation of the controller 180 so that the amount of water discharged from the water tank 200 may vary.

For example, so as to increase the water discharge amount in the water tank 200, the controller can control so as to turn on the pump motor 280 for N seconds and then turn off the pump motor 280 for P seconds smaller than M. In either case, the off time of the pump motor 280 may be controlled to be longer than the on time thereof.

When the adjusting unit 180 is positioned at a neutral position between the first position and the second position, the adjusting unit 180 does not press the contacts of the first switch 128a and the second switch 128b and the pump motor 280 is stopped.

<Driving Device>

Figure 25:
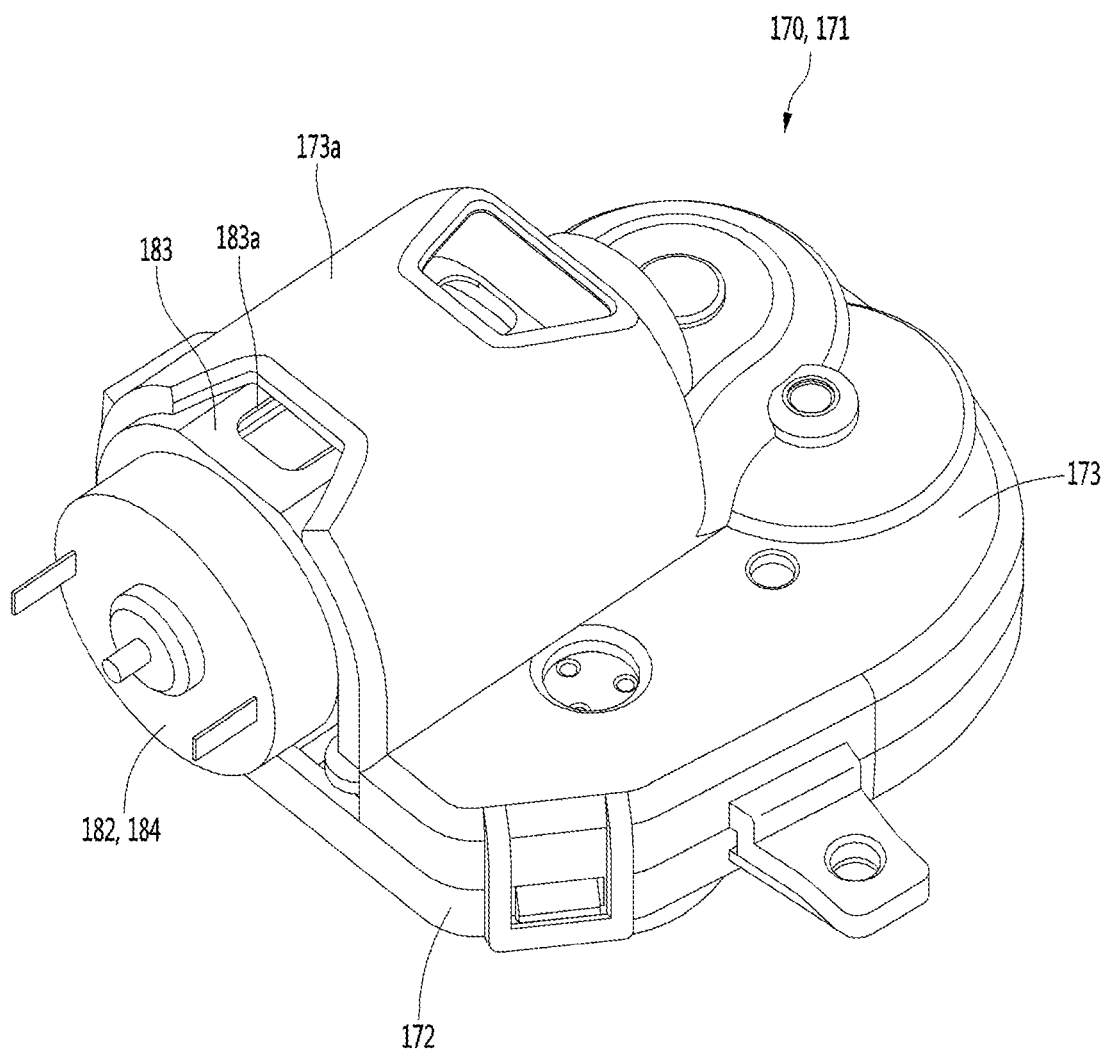
FIG. 25 is a view illustrating the first and second driving devices according to the embodiment of the present invention as viewed from above.
Figure 26:
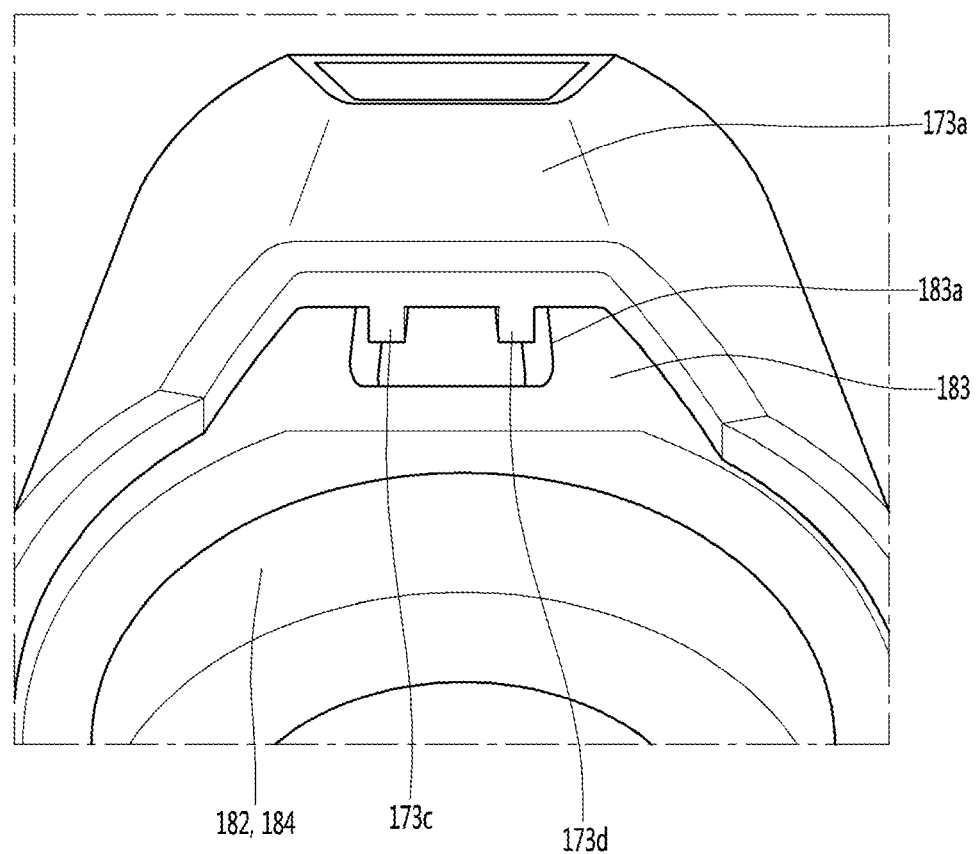
FIG. 26 is a view illustrating a structure for preventing rotation of the motor housing and the driving motor.
Figure 27:
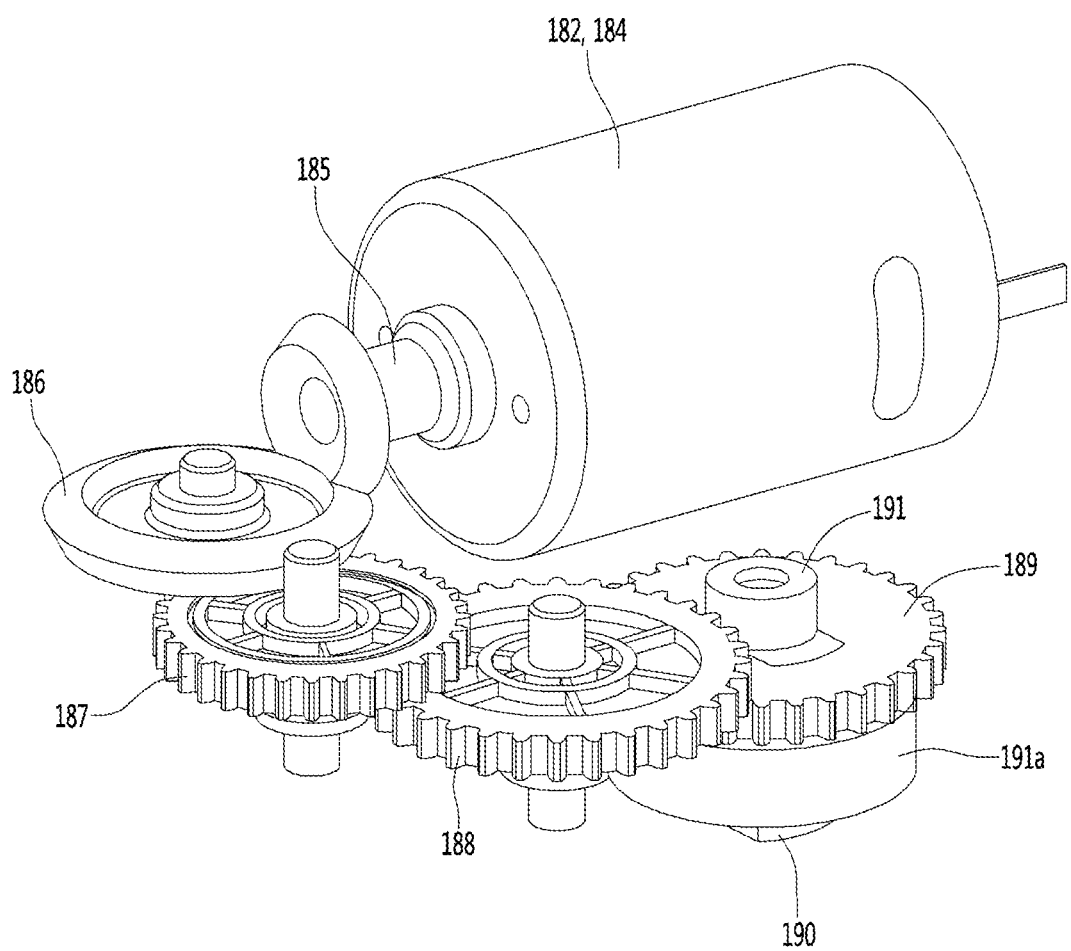
FIG. 27 is a view illustrating a state where a power transmission unit is coupled to a driving motor according to an embodiment of the present invention.

FIG. 24 is a view illustrating the first and second driving devices according to one embodiment of the present invention as viewed from below, FIG. 25 is a view illustrating the first and second driving devices according to the embodiment of the present invention as viewed from above, FIG. 26 is a view illustrating a structure for preventing rotation of the motor housing and the driving motor, and FIG. 27 is a view illustrating a state where a power transmission unit is coupled to a driving motor according to an embodiment of the present invention.

Referring to FIG. 23 to FIG. 27, the first driving device 170 and the second driving device 171 may be formed and disposed symmetrically in the lateral direction.

The first driving device 170 may include a first driving motor 182 and the second driving device 171 may include a second driving motor 184.

A motor PCB 350 (or second board) for driving each of the driving motors may be connected to the driving motors 182 and 184. The motor PCB 350 may be connected to the control board 115 to receive a control signal. The motor PCB 350 may be connected to the driving motors 182 and 184 in a standing state and may be spaced apart from the nozzle base 110.

The controller can sense the current of each of the driving motors 182 and 184. Since the frictional force between the mop 402 and the floor acts as a load on the driving motors 182 and 184 in a state where the nozzle 1 is placed on the floor, the current of the driving motors 182 and 184 may be equal to or greater than the first reference value.

Meanwhile, when the nozzle 1 is lifted from the floor since there is no frictional force between the mops 402 and 402 and the floor, the current of each of the driving motors 182 and 184 may be less than the first reference value.

Accordingly, when the current of each of the driving motors 182 and 184 sensed is less than the first reference value and the time sensed as being less than the first reference value is equal to or longer than the reference time, the controller operates the pump motor 280 can stop. Alternatively, the controller may stop the operation of the pump motor 280 when the current of each of the driving motors 182 and 184 sensed is less than the first reference value.

In addition, when the current of each of the driving motors 182 and 184 sensed is less than the first reference value and the time sensed as being less than the first reference value is equal to or longer than the reference time, the controller can stop the operation of each of the driving motors 182 and 184. Alternatively, the controller may stop the operation of each of the driving motors 182 and 184 if the current of each of the driving motors 182 and 184 sensed is less than the first reference value.

The controller can simultaneously or sequentially operate the pump motor 280 and each of the driving motors 182 and 184 when the currents of the driving motors 184 and 184 sensed become equal to or greater than the first reference value.

A terminal for supplying power to the nozzle 1 in the nozzle 1 of the present embodiment may be positioned in the connection tube 50.

The nozzle 1 may include the rotation cleaning units 40 and 41 and driving devices 170 and 171 and a pump motor 280 for driving the rotation cleaning units 40 and 41, as described above. Therefore, only when the power is supplied to the connection tube 50, the driving devices 170 and 171 and the pump motor 280 operate to rotate the rotation cleaning units 40 and 41 to clean the floor, and water may be supplied from the water tank 200 to the rotation cleaning units 40 and 41.

Therefore, when the nozzle 1 of the present embodiment is connected to the cleaner used by the existing user, the floor can be cleaned using the nozzle 1, so that the present nozzle 1 can be used with an additional accessory of the existing cleaner.

The motor PCB 350 may include a plurality of resistors 352 and 354 for improving Electro Magnetic Interference (EMI) performance of the driving motor.

For example, a pair of resistors 352 and 354 may be provided in the motor PCB 350.

One resistor of the pair of resistors 352 and 354 may be connected to the (+) terminal of the driving motor and the other resistor may be connected to the (−) terminal of the driving motor. Such a pair of resistors 352 and 354 can reduce the fluctuation of the output of the driving motor.

The pair of resistors 352 and 354 may be spaced laterally from the motor PCB 350, for example.

Each of the driving devices 170 and 171 may further include a motor housing. The driving motors 182 and 184 and a power transmission unit for transmitting power can be received in the motor housing.

The motor housing may include, for example, a first housing 172, and a second housing 173 coupled to the upper side of the first housing 172.

The axis of each of the driving motors 182 and 184 may substantially extend in the horizontal direction in a state where each of the driving motors 182 and 184 is installed in the motor housing.

If the driving devices are installed in the motor housing so that the axis of each of the driving motors 182 and 184 extends in the horizontal direction, the driving devices 170 and 171 can be compact. In other words, the height of the driving devices 170 and 171 can be reduced.

The first housing 172 may have a shaft hole 175 through which the transmission shaft 190 for coupling with the rotation plates 420 and 440 of the power transmission unit passes. For example, a portion of the transmission shaft 190 may protrude downward through the lower side of the motor housing.

The horizontal section of the transmission shaft 190 may be formed in a non-circular shape such that relative rotation of the transmission shaft 190 is prevented in a state where the transmission shaft 190 is coupled with the rotation plates 420 and 440.

A sleeve 174 may be provided around the shaft hole 175 in the first housing 172. The sleeve 174 may protrude from the lower surfaces of the first housing 172.

The sleeve 174 may be formed in a ring shape, for example. Therefore, the sleeve 174 can be seated in the seating groove 116*a* in a circular shape.

The driving motors 182 and 184 may be seated on the first housing 172 and fixed to the first housing 172 by the motor fixing unit 183 in this state.

The driving motors 182 and 184 may be formed in an approximately cylindrical shape and the driving motors 182 and 184 may be seated in the first housing 172 in a state where the axes of the driving motors 182 and 184 are substantially horizontal (in a state where driving motors 182 and 184 are lying down).

The motor fixing unit 183 may be formed in an approximately semicircular shape in cross section and may cover the upper portion of the driving motors 182 and 184 seated on the first housing 172. The motor fixing unit 183 may be fixed to the first housing 172 by a fastening member such as a screw, as an example.

The second housing 173 may include a motor cover 173*a* covering a portion of the driving motors 182 and 184.

The motor cover 173*a* may be rounded so as to surround the motor fixing unit 183 from the outside of the motor fixing unit 183, for example.

For example, the motor cover 173*a* may be formed in a round shape such that a portion of the second housing 173 protrudes upward.

Rotation preventing ribs 173*c* and 173*d* are formed on the surface facing the motor fixing unit 183 from the motor cover 173*a* so as to prevent relative rotation between the motor cover 173*a* and the motor fixing unit 183 during the operation of the driving motors 182 and 184, and a rib receiving slot 183*a* in which the rotation preventing ribs 173*c* and 173*d* are received can be formed in the motor fixing unit 183.

Though not limited, the width of the rotation preventing ribs 173*c* and 173*d* and the width of the rib receiving slot 183*a* may be the same.

Alternatively, a plurality of rotation preventing ribs 173*c* and 173*d* may be spaced apart from the motor cover 173*a* in the circumferential direction of the driving motors 182 and 184, and a plurality of rotation preventing ribs 173*c* and 173*d* can be received in the rib receiving slot 183*a*.

At this time, the maximum width of the plurality of rotation preventing ribs 173*c* and 173*d* in the circumferential direction of the driving motors 182 and 184 may be equal to or slightly smaller than the width of the rib receiving slot 183*a*.

The power transmission unit may include a driving gear 185 connected to the shaft of each of the driving motors 182 and 184 and a plurality of transmission gears 186, 187, 188, and 189 for transmitting the rotational force of the driving gear 185.

The axis of the driving motors 182 and 184 (see A3 and A4 in FIG. 20) substantially extends in the horizontal direction while the centerline of the rotation plates 420 and 440 extends in the vertical direction. Therefore, the driving gear 185 may be a spiral bevel gear, for example.

The plurality of transmission gears 186, 187, 188, and 189 may include a first transmission gear 186 that engages with the driving gear 185. The first transmission gear 186 may have a rotation center extending in a vertical direction.

The first transmission gear 186 may include a spiral bevel gear so that the first transmission gear 186 can engage with the driving gear 185.

The first transmission gear 186 may further include a helical gear disposed at a lower side of the spiral bevel gear as a second gear.

The plurality of transmission gears 186, 187, 188 and 189 may further include a second transmission gear 187 engaged with the first transmission gear 186.

The second transmission gear 187 may be a two-stage helical gear. In other words, the second transmission gear 187 includes two helical gears arranged vertically, and the upper helical gear can be connected to the helical gear of the first transmission gear 186.

The second transmission gear 187 may be a two-stage helical gear. In other words, the second transmission gear 187 includes two helical gears arranged vertically, and the upper helical gear can be connected to the helical gear of the first transmission gear 186.

The plurality of transmission gears 186, 187, 188 and 189 may further include a third transmission gear 188 engaged with the second transmission gear 187.

The third transmission gear 188 may also be a two-stage helical gear. In other words, the third transmission gear 188 includes two helical gears arranged vertically, and the upper helical gear may be connected to the lower helical gear of the second transmission gear 187.

The plurality of transmission gears 186, 187, 188 and 189 may further include a fourth transmission gear 189 engaged with the lower helical gear of the third transmission gear 188. The fourth transmission gear 189 may be a helical gear.

The transmission shaft 190 may be coupled to the fourth transmission gear 189. In other words, the fourth transmission gear 189 is an output end of the power transmitting portion. The transmission shaft 190 may be coupled to penetrate the fourth transmission gear 189. The transmission shaft 190 may be rotated together with the fourth transmission gear 189.

Accordingly, an upper bearing 191 is coupled to the upper end of the transmission shaft 190 passing through the fourth transmission gear 189 and a lower bearing 191*a* is coupled to the transmission shaft 190 at the lower side of the fourth transmission gear 189.

Figure 28:
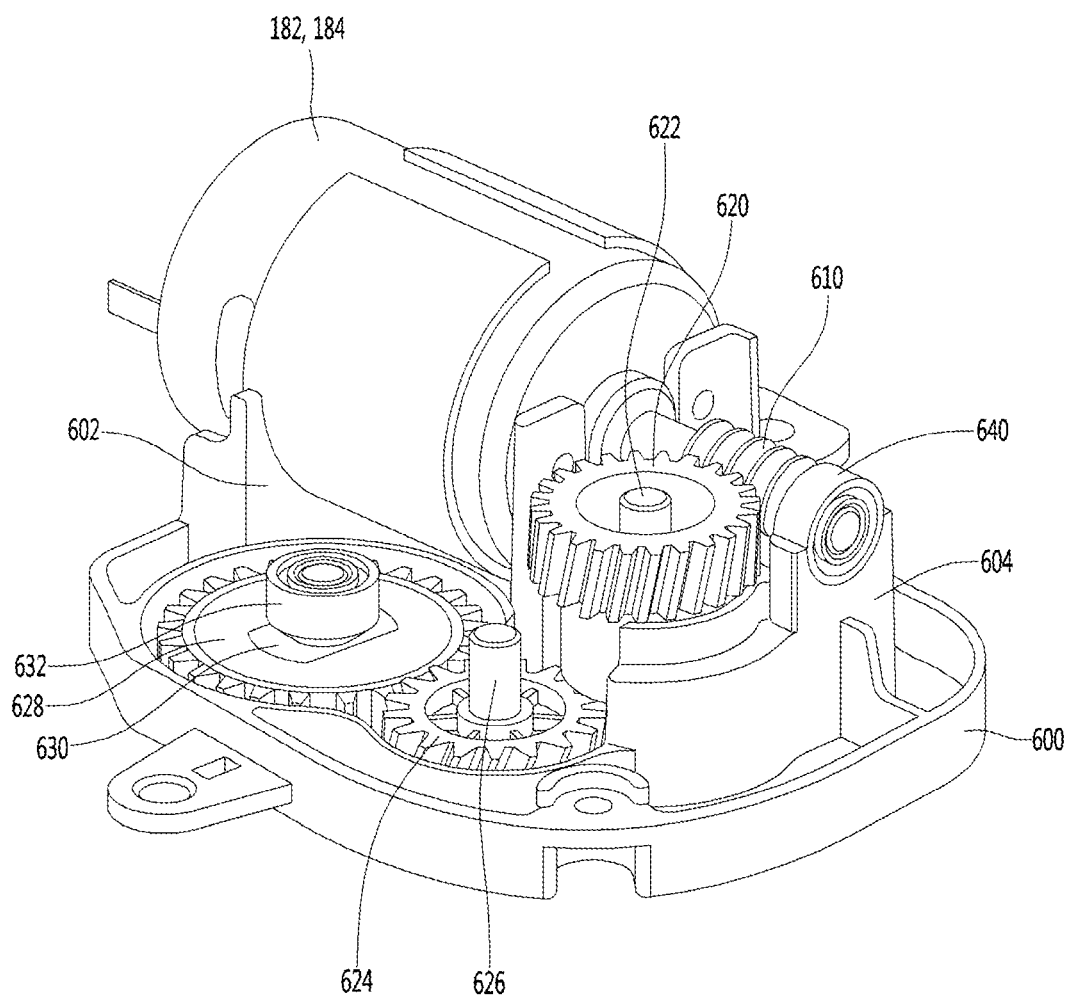
FIG. 28 is a view illustrating a state where a power transmitting unit is coupled to a driving motor according to another embodiment of the present invention.

FIG. 28 is a view illustrating a state where a power transmitting unit is coupled to a driving motor according to another embodiment of the present invention.

The present embodiment is the same as the previous embodiment in other portions but differs in the configuration of the power transmitting portion. Therefore, only the characteristic parts of the present embodiment will be described below.

Referring to FIG. 28, the power transmitting unit of the present embodiment may include a driving gear 610 connected to the shafts of the driving motors 182 and 184.

The driving gear 610 may be a worm gear. The rotational shaft of the driving gear 610 may extend in the horizontal direction. Since the driving gear 610 is rotated together with the rotating shaft of the driving gear 610, a bearing 640 may be connected to the driving gear 610 for smooth rotation.

The first housing 600 may include a motor support portion 602 for supporting the driving motors 182 and 184 and a bearing support portion 604 for supporting the bearings 640.

The power transmission unit may further include a plurality of transmission gears 620, 624 and 628 for transmitting the rotational force of the driving gear 610 to the rotation plates 420 and 440.

The plurality of transmission gears 620, 624 and 628 may include a first transmission gear 620 engaged with the driving gear 610. The first transmission gear 620 may include an upper worm gear to engage with the driving gear 610.

Since the driving gear 610 and the second transmission gear 620 mesh with each other in the form of a worm gear, there is an advantage that noise is reduced by friction in a process in which the rotational force of the driving gear 610 is transmitted to the second transmission gear 620.

The first transmission gear 620 may include a helical gear disposed at the lower side of the upper worm gear as a second gear.

The first transmission gear 620 may be rotatably connected to a first shaft 622 extending in the vertical direction. The first shaft 622 may be fixed to the first housing 600.

Accordingly, the first transmission gear 620 can be rotated with respect to the fixed first shaft 622. According to the present embodiment, since the first transmission gear 620 is configured to rotate with respect to the first shaft 622, there is an advantage that a bearing is unnecessary.

The plurality of transmission gears 620, 624, and 628 may further include a second transmission gear 624 engaged with the first transmission gear 620. The second transmission gear 624 is, for example, a helical gear.

The second transmission gear 624 may be rotatably connected to a second shaft 626 extending in the vertical direction. The second shaft 626 may be fixed to the first housing 600.

Accordingly, the second transmission gear 624 can be rotated with respect to the fixed second shaft 626. According to the present embodiment, since the second transmission gear 624 is configured to rotate with respect to the second shaft 626, there is an advantage that no bearing is required.

The plurality of transmission gears 620, 624, and 628 may further include a third transmission gear 628 engaged with the second transmission gear 624. The third transmission gear 628 is, for example, a helical gear.

The third transmission gear 628 may be connected to a transmission shaft 630 connected to the rotation plates 420 and 440. The transmission shaft 630 may be connected to the third transmission gear 628 and rotated together with the third transmission gear 628.

A bearing 632 may be coupled to the transmission shaft 630 for smooth rotation of the transmission shaft 630.

<Disposition of Driving Device in Nozzle Base>

Figure 29:
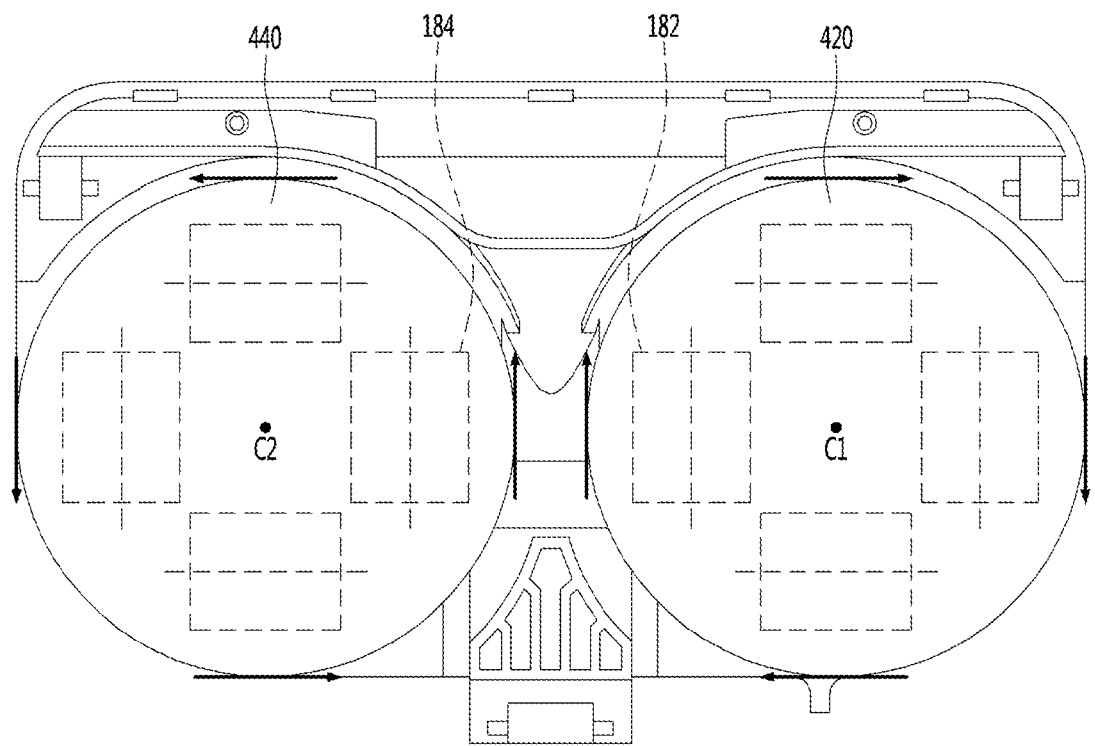
FIG. 29 is a view illustrating a relationship between a rotating direction of a rotation plate and an extending direction of an axis of the driving motor according to an embodiment of the present invention.
Figure 30:
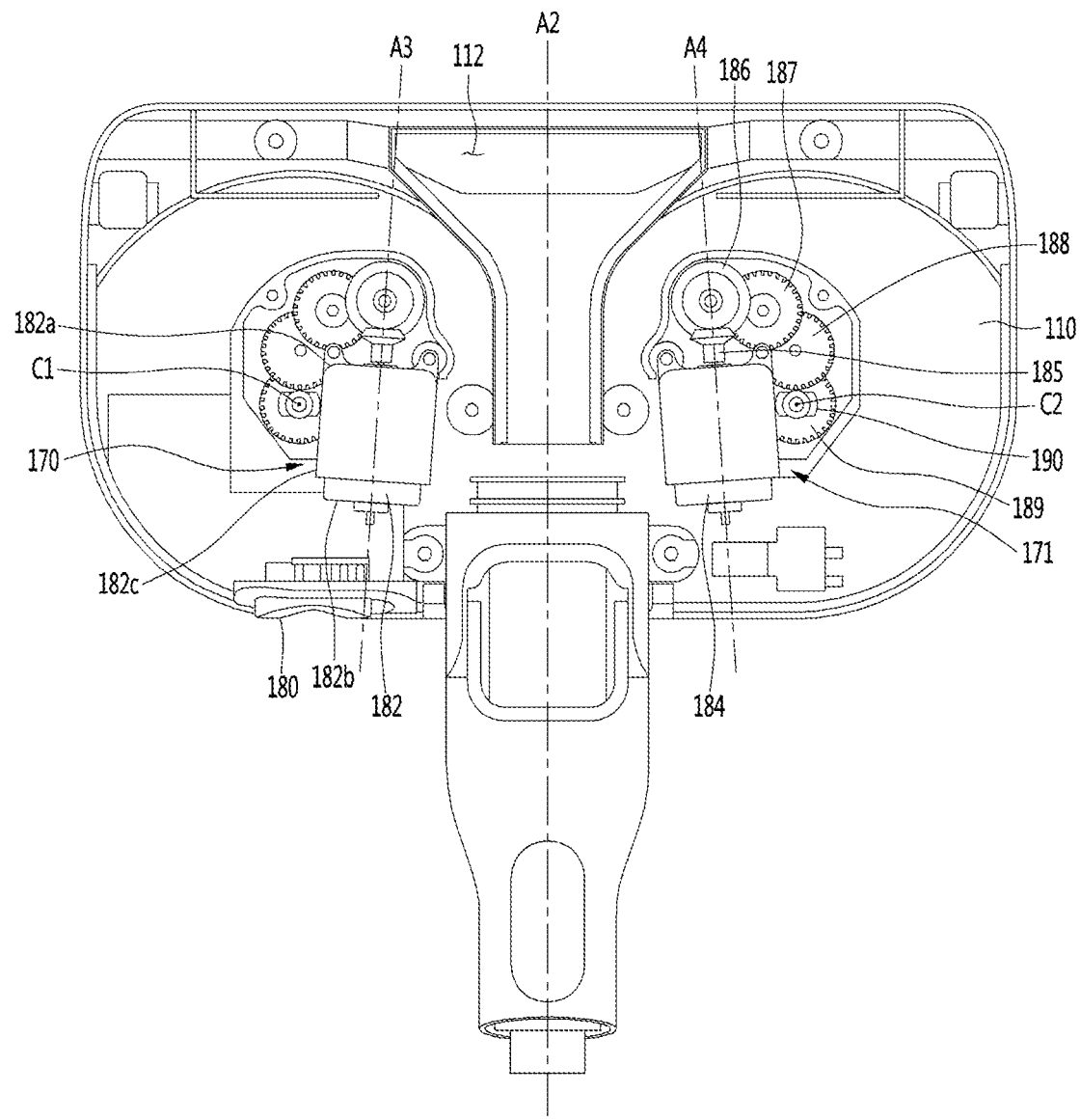
FIG. 30 is a plan view illustrating a state where a driving device is installed on a nozzle base according to an embodiment of the present invention.
Figure 31:
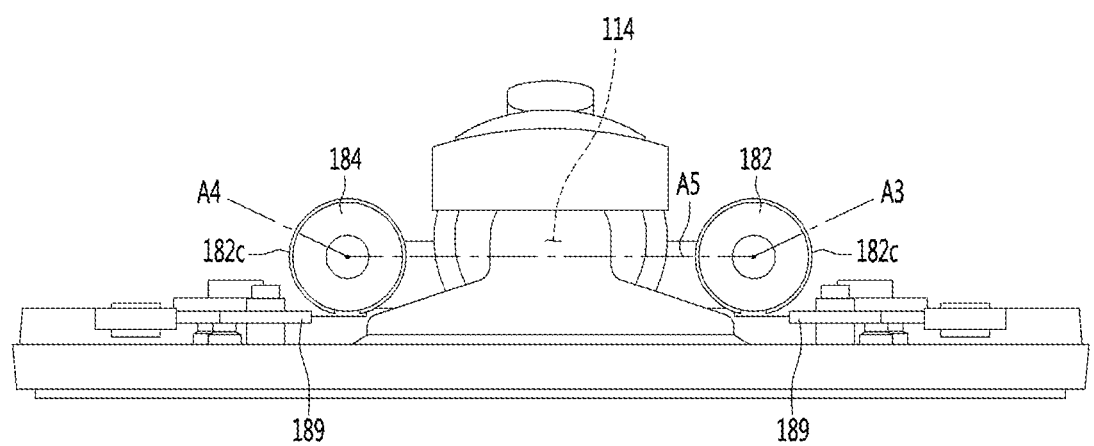
FIG. 31 is a front view illustrating a state where a driving device is installed on a nozzle base according to an embodiment of the present invention.

FIG. 29 is a view illustrating a relationship between a rotating direction of a rotation plate and an extending direction of an axis of the driving motor according to an embodiment of the present invention, and FIG. 30 is a plan view illustrating a state where a driving device is installed on a nozzle base according to an embodiment of the present invention, and FIG. 31 is a front view illustrating a state where a driving device is installed on a nozzle base according to an embodiment of the present invention.

Particularly, FIG. 30 illustrates a state where the second housing of the motor housing is removed.

Referring to FIG. 29 to FIG. 31, the first rotation plate 420 and the second rotation plate 440 arranged in the nozzle 1 in the lateral direction may be rotated in opposite directions to each other.

For example, a portion closest to the centerline A2 of the second flow path 114 in each of the rotation plates 420 and 440 may be rotated away from the first flow path 112 toward a side of the first flow path 112.

The axes A3 and A3 of the driving motors 182 and 184 may be disposed substantially parallel to the tangents of the rotation plates 420 and 440.

In the present embodiment, the term "substantially parallel" means that the angle formed between the two lines is within 5 degrees even if it is not parallel.

When considering the vibration due to the driving force generated in each of the driving motors 182 and 184 and the vibration due to friction with the floor generated by the rotation of the rotation cleaning units 40 and 41, the driving motors 182 and 184 may be disposed to be symmetrical with respect to the centerline A2 of the second flow path 114.

Each of the driving motors 182 and 184 may be disposed so as to be vertically overlapped with the rotation plates 420 and 440.

At least a portion of each of the driving motors 182 and 184 may be positioned in a region between the rotation centers C1 and C2 of the rotation plates 420 and 440 and the outer peripheral surfaces of the rotation plates 420 and 440. For example, all of the driving motors 182 and 184 may be disposed so as to overlap with the rotation plates 420 and 440 in the vertical direction.

Preferably, each of the driving motors 182 and 184 may be positioned as close as possible to the centerline A2 of the second flow path 114 from the nozzle 1 such that the vibration balance is maximized in the entire nozzle 1.

For example, as illustrated in FIG. 30, the axes A3 and A4 of the driving motors 182 and 184 may be disposed to extend in the front and rear direction. At this time, the axes A3 and A4 of the driving motors 182 and 184 may be substantially parallel to the centerline A2 of the second flow path 114.

The driving motors 182 and 184 may include a front end portion 182a and a rear end portion 182b spaced apart from each other in the extending direction of the axes A3 and A4.

The front end portion 182a may be positioned closer to the first flow path 112 than the rear end portion 182b.

The rotation center of the fourth transmission gear 189 (which is substantially rotation center of rotation cleaning unit) may be positioned in a region corresponding to a region between the front end portion 182a and the rear end portion 182b.

At least a portion of the fourth transmission gear 189 may be disposed so as to overlap with the driving motors 182 and 184 in the vertical direction.

The driving motor 182 and 184 include a connection surface for connecting between the front end portion 182a and the rear end portion 182b and an outermost line 182c of the connection surface can overlap with the fourth transmission gear 189 in the vertical direction.

The axes A3 and A4 of each of the driving motors 182 and 184 may be positioned higher than the locus of rotation of the transmission gears.

By this disposition of the driving devices 170 and 171, the weight of each of the driving devices 170 and 171 can be evenly distributed to the right and left of the nozzle 1.

In addition, as the axis A3 of the first driving motor 182 and the axis A4 of the second driving motor 184 extend in the front and rear direction, by each of the driving motors 182 and 184, the height of the nozzle 1 can be prevented from being increased.

The imaginary line A5 connecting the axis A3 of the first driving motor 182 and the axis A4 of the second driving motor 184 passes through the second flow path 114. This is because each of the driving motors 182 and 184 is positioned close to the rear side of the nozzle 1 so that the increase in the height of the nozzle 1 by the driving motors 182 and 184 can be prevented.

In addition, in a state where the driving gears 185 and 185 are connected to the shaft of each of the driving motors 182 and 184, so that the increase in the height of the nozzle 1 is minimized by each of the driving devices 170 and 171, the driving gear 185 may be positioned between the driving motors 182 and 184 and the first flow path 112.

In this case, since the driving motors 182 and 184 having the longest vertical length of the driving devices 170 and 171 are positioned as close as possible to the rear side in the nozzle main body 10, the increase in height of a side of the front end portion of the nozzle 1 can be minimized.

Since the driving devices 170 and 171 are positioned close to the rear side of the nozzle 1 and the water tank 200 is positioned above the driving devices 170 and 171, the center of gravity of the nozzle 1 may be pulled toward the rear side of the nozzle 1 due to the weight of the water in the water tank 200 and the driving devices 170 and 171.

Accordingly, in the present embodiment, the connection chamber (see 226 of FIG. 6) of the water tank 200 is positioned between the first flow path 112 and the driving devices 170 and 170 with respect to the front and rear directions of the nozzle 1.

In the present embodiment, the rotation centers C1 and C2 of the rotation plates 420 and 440 coincide with the rotation center of the transmission shaft 190.

The axes A3 and A4 of the driving motors 182 and 184 can be positioned in the region between the rotation centers C1 and C2 of the rotation plates 420 and 440.

In addition, the driving motors 182 and 184 may be positioned in a region between the rotation centers C1 and C2 of the rotation plates 420 and 440.

In addition, each of the driving motors 182 and 184 may be disposed so as to overlap with the imaginary line connecting the first rotation center C1 and the second rotation center C2 in the vertical direction.

<Driving Unit Cover of Nozzle Cover, and Disposition Relationship Between Rotation Center of Rotation Plate and Motor>

Figure 32:
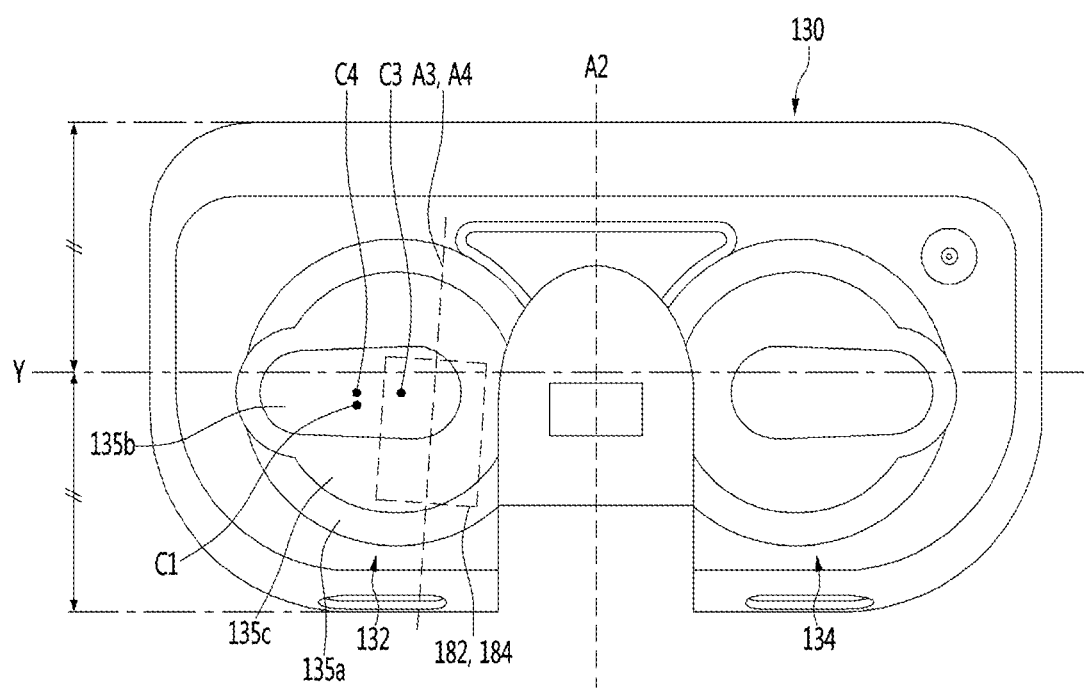
FIG. 32 is a view illustrating a structure of a driving unit cover of a nozzle cover and a disposition relationship between a rotation center of a rotation plate and a driving motor according to an embodiment of the present invention.

FIG. 32 is a view illustrating a structure of a driving unit cover of a nozzle cover and a disposition relationship between a rotation center of a rotation plate and a driving motor according to an embodiment of the present invention.

Referring to FIG. 14 and FIG. 32, a pair of the driving unit covers 132 and 134 of the nozzle cover 130 are disposed to be symmetrical in the lateral direction and have a convex shape upward.

Each of the driving unit covers 132 and 134 may include a first protruding surface 135a extending upward from the bottom wall 130a of the nozzle cover 130 and a second protruding surface 135b positioned higher than the first protruding surface 135a and having a different curvature from the first protruding surface 135a.

The first protruding surface 135a and the second protruding surface 135b may be directly connected or may be connected by a third protruding surface 135c.

At this time, the third protruding surface 135c is formed to have a curvature different from that of each of the first protruding surface 135a and the second protruding surface 135b. The third protruding surface 135c is positioned higher than the first protruding surface 135a and lower than the second protruding surface 135b.

In the present embodiment, the second protruding surface 135b may overlap with the second bottom wall 213b of the water tank 200 in the vertical direction. In addition, the second protruding surface 135b may be formed in a shape corresponding to the second bottom wall 213b of the water tank 200.

The second protruding surface 135b may be the surface that is positioned at the highest position in the driving unit covers 132 and 134.

The second protruding surface 135b may be formed to have a longer left and right length (width) than a front and rear length (width), for example. In the present embodiment, the length direction of the second protruding surface 135b is long in the lateral direction.

The length direction of the second protruding surface 135b intersects with the extending direction of the axes A3 and A4 of the driving motors 182 and 184.

The center C3 of the driving unit covers 132 and 134 (for example, center of curvature) may be positioned on the second protruding surface 135b.

The center C4 of the second protruding surface 135b is eccentric with the center C3 of the driving unit cover 132.

For example, the center C4 of the second protruding surface 135b is eccentric in a direction away from the centerline A2 of the second flow path 114 at the center C3 of the driving unit cover 132.

Therefore, the center C3 of the driving unit cover 132, 134 is positioned between the center C4 of the second protruding surface 135b and the centerline A2 of the second flow path 114.

In addition, the rotation centers C1 and C2 of the rotation plates 420 and 440 may be positioned so as to overlap with the second protruding surface 135b in the vertical direction.

The rotation centers C1 and C2 of the rotation plates 420 and 440 are eccentric with the center C3 of the driving unit covers 132 and 134.

For example, the rotation centers C1 and C2 of the rotation plates 420 and 440 may be eccentric in a direction away from the centerline A2 of the second flow path 114 at the center C3 of the driving unit covers 132 and 134.

Accordingly, the centers C3 of the driving unit covers 132 and 134 are positioned between the rotation centers C1 and C2 of the rotation plates 420 and 440 and the centerline A2 of the second flow path 114.

At this time, the rotation centers C1 and C2 of the rotation plates 420 and 440 are aligned with the center C4 of the second protruding surface 135b or are spaced apart from the center C4 of the second protruding surface 135b in the front and rear direction.

The center C3 of the driving unit covers 132 and 134 may be positioned between the axes A3 and A4 of the driving motors 182 and 184 and the center C4 of the second protruding surface 135b.

The center C3 of the driving unit covers 132 and 134 can be positioned between the axes A3 and A4 of the driving motors 182 and 184 and the rotation centers C1 and C2 of the rotation plates 420 and 440.

The central axis Y bisecting the length of the nozzle cover 130 (or nozzle main body or nozzle housing) in the front and rear direction may be disposed to overlap with the second protruding surface 135b in the vertical direction.

The central axis Y bisecting the length of the nozzle cover 130 in the front and rear direction may be positioned closer to the front end of the nozzle cover 130 than the center C4 of the second protruding surface 135b.

<Rotation Plate>

Figure 33:
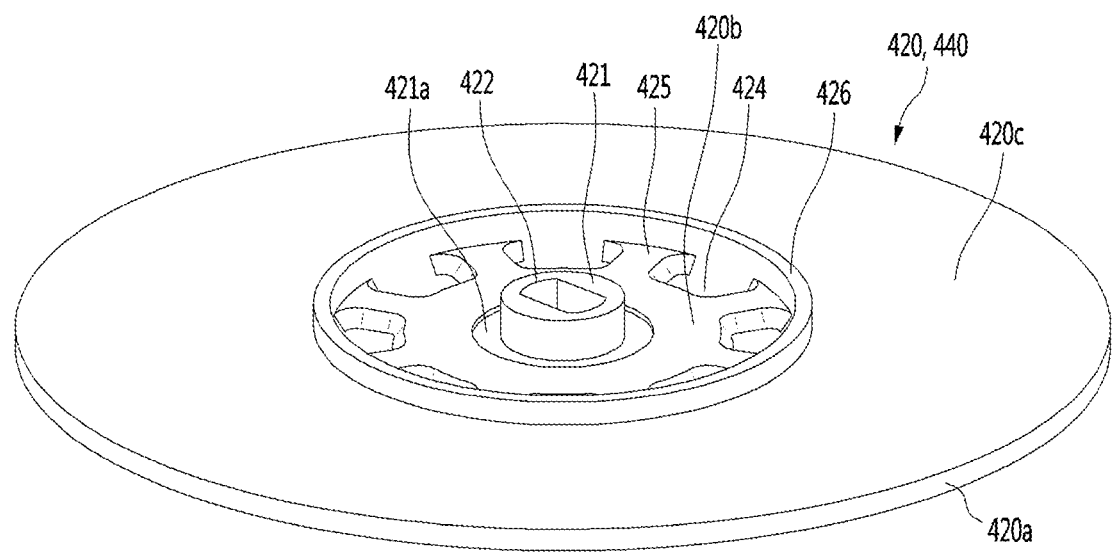
FIG. 33 is a view illustrating a rotation plate according to an embodiment of the present invention as viewed from above.
Figure 34:
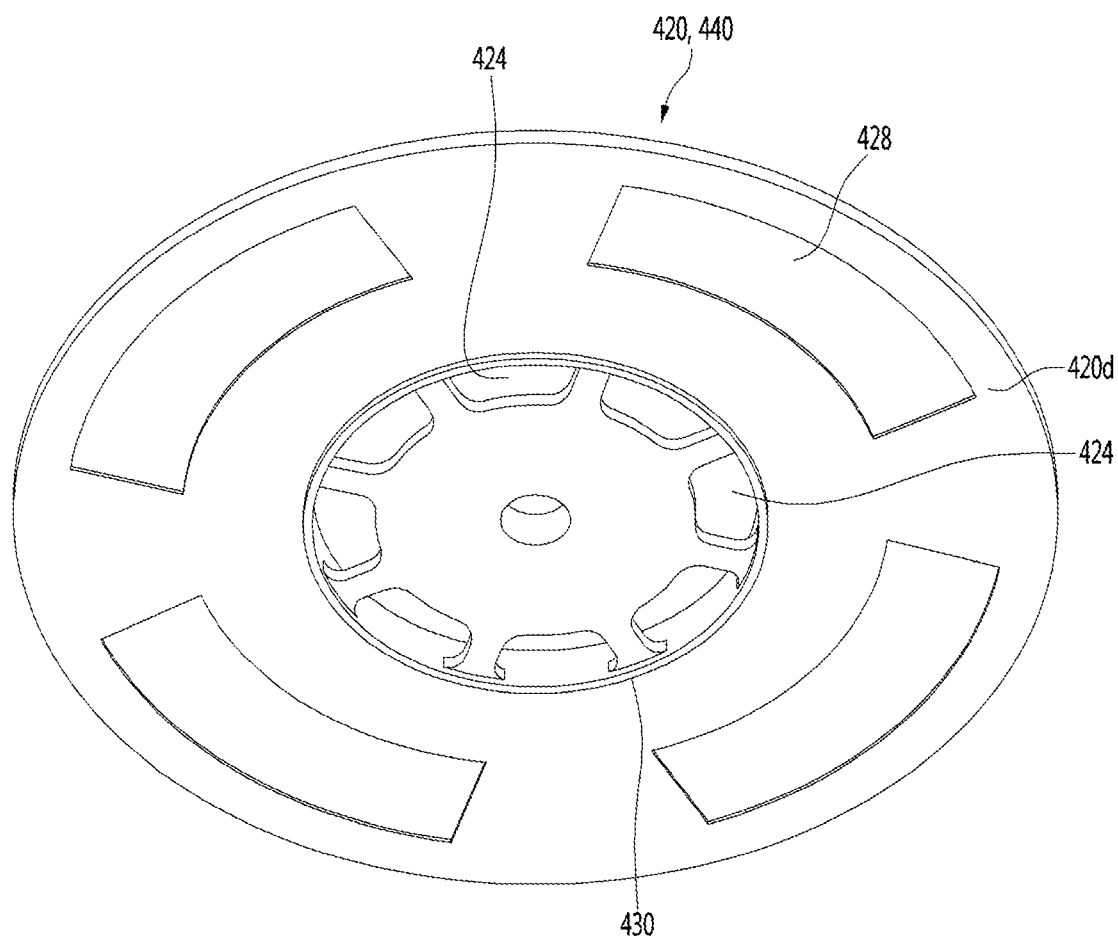
FIG. 34 is a view illustrating a rotation plate according to an embodiment of the present invention as viewed from below.

FIG. 33 is a view illustrating a rotation plate according to an embodiment of the present invention as viewed from above, and FIG. 34 is a view illustrating a rotation plate according to an embodiment of the present invention as viewed from below.

Referring to FIG. 33 and FIG. 34, each of the rotation plates 420 and 440 may be formed in a disc shape so as to prevent mutual interference during the rotation process.

Each of the rotation plates 420 and 440 includes an outer body 420a in the form of a circular ring, an inner body 420b positioned in a central region of the outer body 420a and spaced apart from the inner peripheral surface of the outer body 420a, and a plurality of connection ribs 425 connecting the outer circumferential surface of the inner body 420b and the inner circumferential surface of the outer body 420a.

The height of the inner body 420b may be lower than the height of the outer body 420a. The upper surface of the inner body 420b may be positioned lower than the upper surface 420c of the outer body 420a.

A shaft coupling unit 421 for coupling the transmission shaft 190 may be provided at a central portion of each of the rotation plates 420 and 440.

For example, the shaft coupling unit 421 may be provided at the central portion of the inner body 420b. The shaft coupling unit 421 may protrude upward from the upper surface of the inner body 420b and the upper surface may be positioned higher than the upper surface 420c of the outer body 420a.

For example, the transmission shaft 190 may be inserted into the shaft coupling unit 421. For this purpose, a shaft receiving groove 422 for inserting the transmission shaft 190 may be formed in the shaft coupling unit 421.

A fastening member may be drawn into the shaft coupling unit 421 from below the rotation plates 420 and 440 and be fastened to the transmission shaft 190 in a state where the transmission shaft 190 is coupled to the shaft coupling unit 421.

The rotation plates 420 and 440 may include a plurality of water passage holes 424 disposed outwardly of the shaft coupling unit 421 in the radial direction.

In the present embodiment, since the rotation plates 420 and 440 are rotated in a state where the mops 402 and 404 are attached to the lower sides of the rotation plates 420 and 440, so as to smoothly supply water to the mops 402 and 404 through the rotation plates 420 and 440, the plurality of water passage holes 424 may be spaced circumferentially around the shaft coupling unit 421.

The plurality of water passage holes 424 may be defined by a plurality of connection ribs 425. At this time, each of the connection ribs 425 may be positioned lower than the upper surface 420c of the rotation plates 420 and 440. In other words, each of the connection ribs 425 may be positioned lower than the upper surface 420c of the outer body 420a.

Both sides of the connection ribs 425 may include inclined surfaces that are inclined downward so that the water can flow smoothly into the adjacent water through holes 424 in a case where the water falls into the connection ribs 425. The inclined surface may be planar or rounded.

Therefore, the width of the connection rib 425 is increased from the upper side to the lower side with respect to the vertical section of the connection rib 425.

A portion of the connection rib 425 connected to the inner circumferential surface of the outer body 420a and a portion of the connection rib 425 connected to the outer circumferential surface of the inner body 420b are rounded in the horizontal direction and have the maximum width of the entire length (length of rotation plate in radial direction).

The inner body 420b is provided with a groove portion 421a for providing a space for positioning the protruding sleeve 111b of the nozzle base 110. The protruding sleeve 111b may be seated in the groove portion 421a. Alternatively, the lower surface of the protruding sleeve 111b is spaced apart from the bottom of the groove portion 421a but is lower than the upper surface of the inner body 420b.

The protruding sleeve 111b surrounds the shaft coupling unit 421. Therefore, the water dropped onto the rotation plates 420 and 440 can be prevented from flowing toward a side of the shaft coupling unit 421 by the protruding sleeve 111b.

Since the rotation plates 420 and 440 rotate, centrifugal force acts on the rotation plates 420 and 440. It is necessary to prevent the water sprayed to the rotation plates 420 and 440 from flowing radially outward in a state where the water cannot pass through the water passage holes 424 in the rotation plates 420 and 440 due to the centrifugal force.

Therefore, a water blocking rib 426 may be formed on the upper surface of the rotation plates 420 and 440 at a radially outside of the water passage hole 424.

For example, the water blocking ribs 426 may protrude upward from the upper surface 420c of the outer body 420a. The water blocking ribs 426 may be formed continuously in the circumferential direction.

The plurality of water passage holes 424 may be positioned in the inner region of the water blocking ribs 426. The water blocking ribs 426 may be formed in the form of a circular ring, for example.

The center of the water blocking ribs 426 may coincide with the center of the bottom rib 111a formed in the nozzle base 110.

Figure 39:
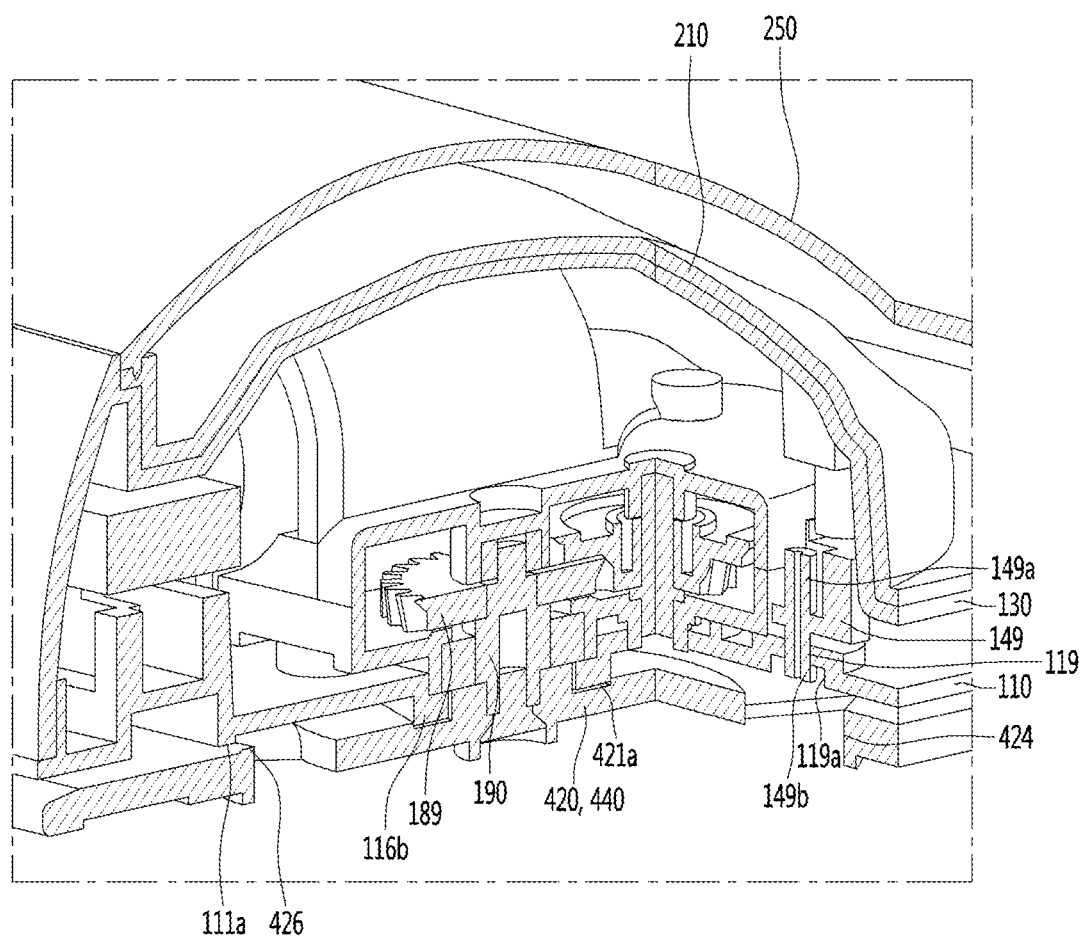
FIG. 39 is a view illustrating a disposition of a water discharge port of a spray nozzle in a nozzle main body according to an embodiment of the present invention.

The diameter of the bottom rib 111a of the nozzle base 110 may be larger than the diameter of the water blocking ribs 426 (see FIG. 39). Therefore, since the two ribs are arranged sequentially outward in the radial direction, the water blocking effect can be improved.

An installation groove 428 may be formed on the lower surface 420d of the rotation plates 420 and 440 to provide attachment means (see 428a of FIG. 38) for attaching the mops 402 and 404. For example, the installation groove 428 may be formed on a lower surface of the outer body 420a.

The attachment means (see 428a of FIG. 38) can be, for example, a velcro.

A plurality of installation grooves 428 may be spaced apart in the circumferential direction with respect to the rotation centers C1 and C2 of the rotation plates 420 and 440. Therefore, a plurality of attachment means (see 428a of FIG. 38) may be provided on the lower surface 420b of the rotation plates 420 and 440.

In the present embodiment, the installation groove 428 may be disposed radially outward of the water passage hole 424 with respect to the rotation centers C1 and C2 of the rotation plates 420 and 440.

For example, the water passage hole 424 and the installation groove 428 may be sequentially arranged radially outward from the rotation centers C1 and C2 of the rotation plates 420 and 440.

The plurality of installation grooves 428 may be formed in an arc shape, for example, and the length of the arcs of the plurality of installation grooves 428 may be formed to be larger than a distance between two adjacent installation grooves.

A through hole among a plurality of water through holes may be positioned in an area between two adjacent installation grooves.

The lower surface 420d of the rotation plates 420 and 440 may be provided with a contact rib 430 which contacts the mop 402 or 404 in a state where the mop 402 or 404 is attached to the attachment means.

The contact ribs 430 may protrude downward from a lower surface 420b of the rotation plates 420 and 440. For example, the contact rib 430 may protrude downward from a lower surface of the outer body 420a.

The contact ribs 430 are disposed radially outward of the water passage holes 424 and may be formed continuously in the circumferential direction. For example, the contact rib 430 may be formed in a circular ring shape.

Since the mops 402 and 404 can be deformed by itself, for example, as a fiber material, gaps can exist between the mops 402 and 404 and the lower surfaces 420d of the rotation plates 420 and 440 in a state where the mops 402 and 404 are attached to the rotation plates 420 and 440 by the attaching means.

When the gap existing between the mops 402 and 404 and the lower surfaces 420d of the rotation plates 420 and 440 is large, there is a fear that water is not absorbed to the mops 402 and 404 in a state of passing through the water passage hole 424 and flows to the outside through the gap between the lower surfaces 420d of the rotation plates 420 and 440 and the upper surface of the mops 402 and 404.

However, according to the present embodiment, when the mops 402 and 404 are coupled to the rotation plates 420 and 440, the contact ribs 430 can be brought into contact with the mops 402 and 404, the nozzle 1 is placed on the floor, the contact rib 430 presses the mops 402, 404 by the load of the nozzle 1.

Accordingly, the contact ribs 430 prevent the formation of the gap between the lower surfaces 420d of the rotation plates 420 and 440 and the upper surfaces of the mops 402 and 404 and thus water to pass through the water passage holes 424 can be smoothly supplied to the mops 402 and 404.

<Water Supply Flow Path>

Figure 35:
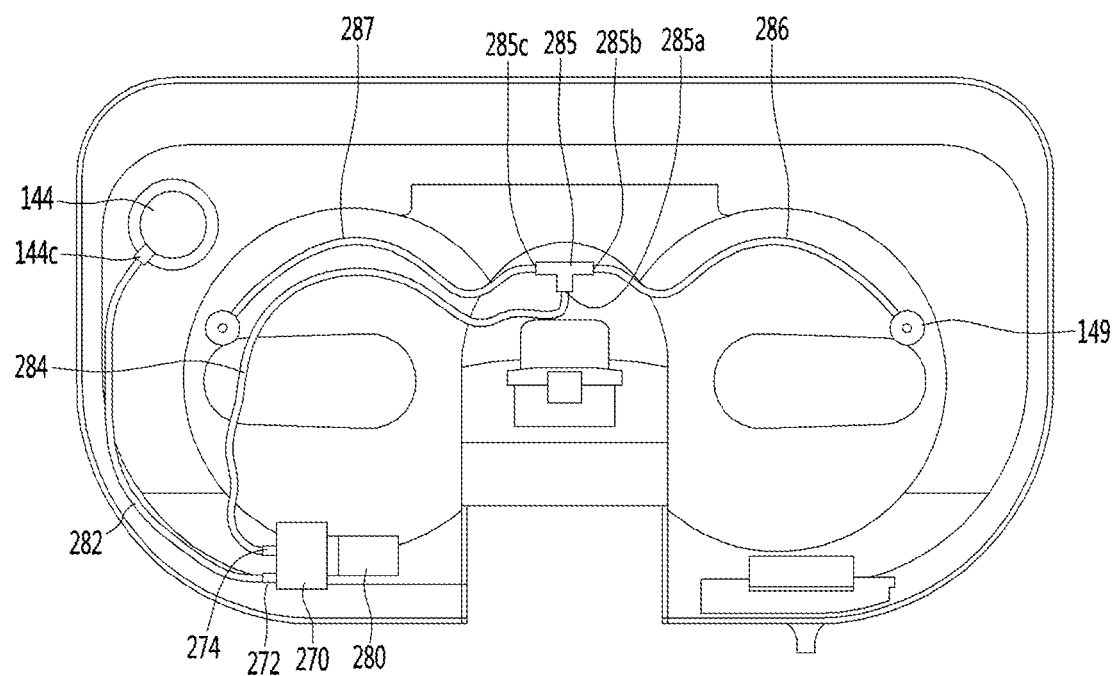
FIG. 35 is a view illustrating a water supply flow path for supplying water of a water tank to the rotation cleaning unit according to an embodiment of the present invention.
Figure 36:
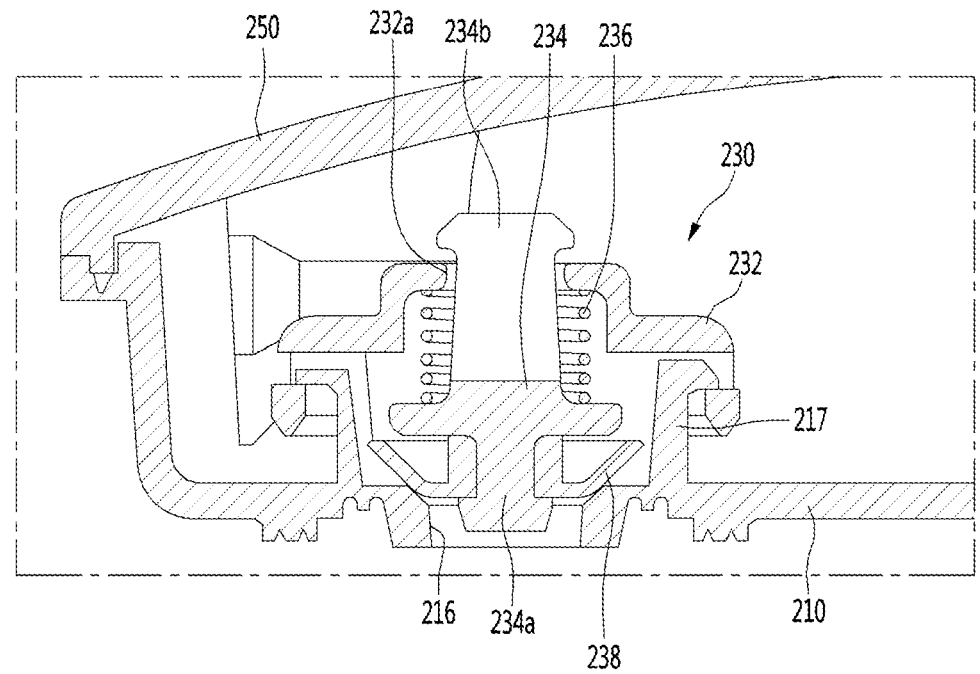
FIG. 36 is a view illustrating a valve in a water tank according to an embodiment of the present invention.
Figure 37:
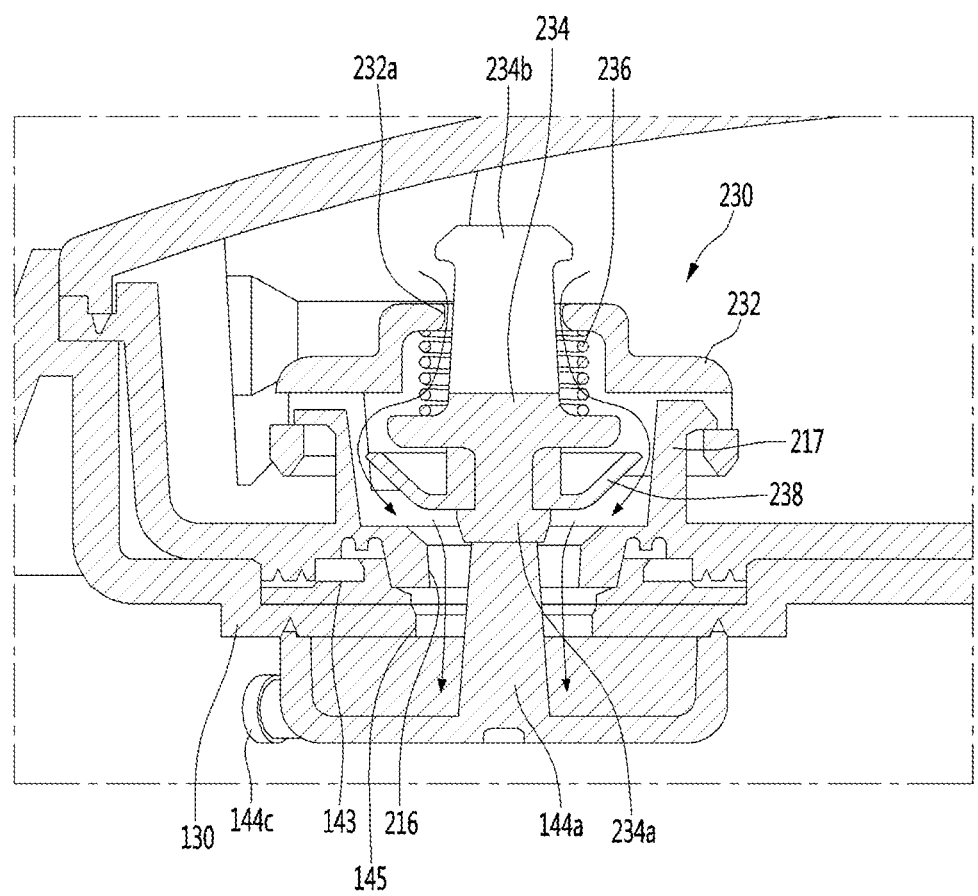
FIG. 37 is a view illustrating a state where the valve opens the discharge port in a state where the water tank is mounted on the nozzle housing.

FIG. 35 is a view illustrating a water supply flow path for supplying water of a water tank to the rotation cleaning unit according to an embodiment of the present invention, FIG. 36 is a view illustrating a valve in a water tank according to an embodiment of the present invention, and FIG. 37 is a view illustrating a state where the valve opens the discharge port in a state where the water tank is mounted on the nozzle housing.

Figure 38:
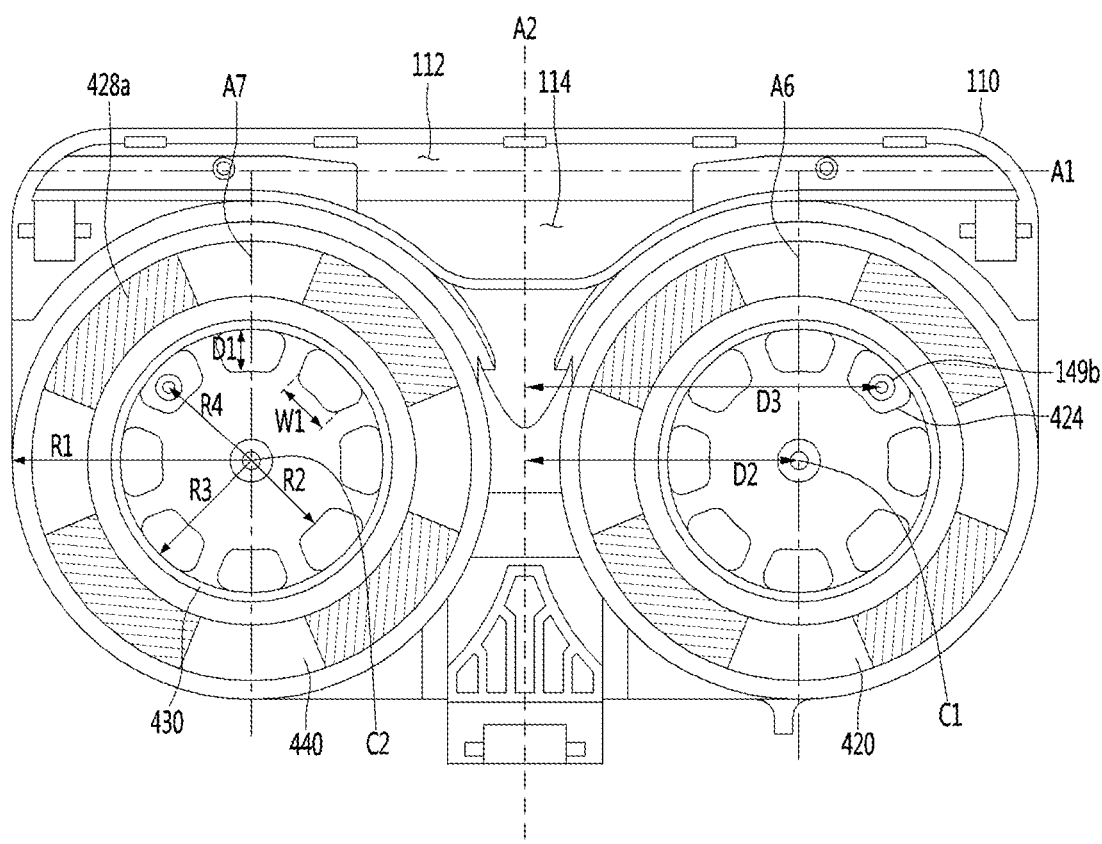
FIG. 38 is a view illustrating a disposition of a rotation plate and a spray nozzle according to an embodiment of the present invention.

FIG. 38 is a view illustrating a disposition of a rotation plate and a spray nozzle according to an embodiment of the present invention and FIG. 39 is a view illustrating a disposition of a water discharge port of a spray nozzle in a nozzle main body according to an embodiment of the present invention.

Figure 40:
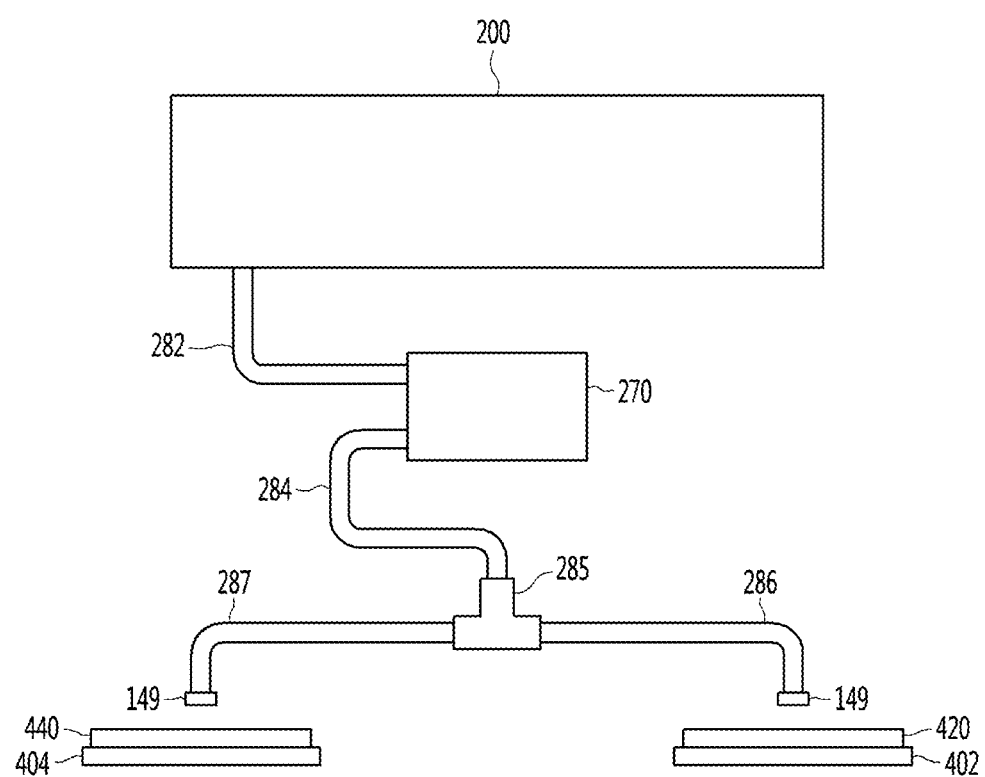
FIG. 40 is a conceptual diagram illustrating a process of supplying water to a rotation cleaning unit in a water tank according to an embodiment of the present invention.

FIG. 40 is a conceptual diagram illustrating a process of supplying water to a rotation cleaning unit in a water tank according to an embodiment of the present invention.

Referring to FIG. 35 to FIG. 40, the water supply flow path of the present embodiment includes a first supply tube 282 connected to the valve operating unit 144, a water pump 270 connected to the first supply tube 282, and a second supply tube 284 connected to the water pump 270.

The water pump 270 may include a first connection port 272 to which the first supply tube 282 is connected and a second connection port 274 to which the second supply tube 284 is connected. On the basis of the water pump 270, the first connection port 272 is an inlet, and the second connection port 274 is a discharge port.

In addition, the water supply flow path may further include a connector 285 to which the second supply tube 284 is connected.

The connector 285 may be formed such that the first connection unit 285a, the second connection unit 285b, and the third connection unit 285c are arranged in a T-shape. The second connection tube 284 may be connected to the first connection unit 285a.

The water supply flow path may further include a first branch tube 286 connected to the second connection unit 285b and a second branch tube 287 connected to the third connection unit 285b.

Accordingly, the water flowing through the first branch tube 286 may be supplied to the first rotation cleaning unit 40 and may be supplied to the second rotation cleaning unit 41 flowing through the second branch tube 287.

The connector 285 may be positioned at the central portion of the nozzle main body 10 such that each of the branch tubes 286 and 287 has the same length.

For example, the connector 285 may be positioned below the flow path cover 136 and above the flow path forming portion 150. In other words, the connector 285 may be positioned directly above the second flow path 114. Thus, substantially the same amount of water can be dispensed from the connector 285 to each of the branch tubes 286 and 287.

In the present embodiment, the water pump 270 may be positioned at one point on the water supply flow path.

At this time, the water pump 270 may be positioned between the valve operating unit 144 and the first connection unit 285a of the connector 285 so that water can be discharged from the water tank 200 using a minimum number of the water pumps 270.

In the present embodiment, the water pump 270 may be installed in the nozzle cover 130 in a state where the water pump 270 is positioned close to the portion where the valve operating unit 144 is installed.

As an example, the valve operating unit 144 and the water pump 270 may be provided on one side of both sides of the nozzle main body 10 with respect to the centerline A2 of the second flow path 114.

Therefore, the length of the first supply tube 282 can be reduced, and accordingly, the length of the water supply flow path can be reduced.

Each of the branch tubes 286 and 287 may be connected to the spray nozzle 149. The spray nozzle 149 can also form the water supply flow path of the present invention.

The spray nozzle 149 may include a connection unit 149a to be connected to each of the branch tubes 186 and 187 as described above.

The spray nozzle 149 may further include a water discharge port 149b. The water discharge port 149b extends downward through the nozzle hole 119. In other words, the water discharge port 149b may be disposed on the outside of the nozzle housing 100.

When the water discharge port 149b is positioned outside the nozzle housing 100, water sprayed through the water discharge port 149b can be prevented from being drawn into the nozzle housing 100.

At this time, so as to prevent the water discharge port 149b exposed to the outside of the nozzle housing 100 from being damaged, grooves 119a recessed upward are formed in the bottom of the nozzle base 110, the water discharge port 149b may be positioned in the groove 119a in a state of passing through the nozzle hole 119. In other words, the nozzle hole 119 may be formed in the groove 119a.

The water discharge port 149b may be disposed to face the rotation plates 420 and 440 in the groove 119a. The lower surface of the water discharge port 149b may be positioned at the same height as the lower surface of the nozzle base 110 or may be positioned higher. The lower surface of the water discharge port 149b may be positioned higher than the upper surface 420c of the outer body 420a.

The water sprayed from the water discharge port 149b can pass through the water passage hole 424 of the rotation plates 420 and 440.

The minimum radius of the water passage hole 424 at the center of the rotation plates 420 and 440 is R2 and the maximum radius of the water passage hole 424 at the center of the rotation plates 420 and 440 is R3.

The radius from the center of the rotation plates 420 and 440 to the center of the water discharge port 149b is R4. At this time, R4 is larger than R2 and smaller than R3.

D1, which is a difference between R3 and R2, is larger than the diameter of the water discharge port 149b.

In addition, D1, which is a difference between R3 and R2, is formed to be smaller than a minimum width W1 of the water passage hole 424.

When the outer diameter of the rotation plates 420 and 440 is R1, the R3 may be larger than half of R1.

A line perpendicularly connecting the first rotation center C1 and the centerline A1 of the first flow path 112 may be referred to as a first connection line A6, and a line perpendicularly connecting the second rotation center C2 and an axis A1 of the first flow path 112 may be referred to as a second connecting line A7.

At this time, the first connection line A6 and the second connection line A7 may be positioned in a region between a pair of water discharge port 149b for supplying water to each of the rotation cleaning units 40 and 41.

In other words, the horizontal distance D3 from the water discharge port 149b to the centerline A2 of the second flow path 114 is longer than the horizontal distance D2 to the rotation center C1 and C2 of each of the rotation plates 420 and 440 and centerline A2 of the second flow path 114.

This is because the second flow path 114 extends in the front and rear direction at the central portion of the nozzle 1 so that water is prevented from being suctioned into the nozzle 1 through the second flow path 114 during the rotation of the rotating plates 420.

The horizontal distance between water discharge port 149b and the centerline A1 of the first flow path 112 is shorter than the horizontal distance between each of the rotation centers C1 and C2 and the centerline A1 of the first flow path 112.

The water discharge port 149b is positioned opposite to the axes A3 and A4 of the driving motors 182 and 184 with respect to the connection lines A6 and A7.

Meanwhile, the valve 230 may include a movable unit 234, an opening and closing unit 238, and a fixing unit 232.

The fixing unit 232 may be fixed to a fixing rib 217 protruding upward from the first body 210 of the water tank 200.

The fixing unit 232 may have an opening 232a through which the movable unit 234 passes.

The fixing unit 232 restricts the movable unit 234 from moving upward at a predetermined height from the fixing unit 232 in a state where the fixing unit 232 is coupled with the fixing rib 217.

The movable unit 234 can be moved in the vertical direction in a state where a portion of the movable unit 234 passes through the opening 232a. In a state where the movable unit 234 is moved upward, water can pass through the opening 232a.

The movable unit 234 may include a first extension portion 234a extending downward and coupled with the opening and closing unit 238 and a second extension portion 234b extending upwardly and passing through the opening 232a.

The movable unit 234 may be elastically supported by an elastic member 236. One end of the elastic member 263, as a coil spring, for example, may be supported by the fixed portion 232 and the other end may be supported by the movable unit 234.

The elastic member 236 provides a force to the movable unit 234 to move the movable unit 234 downward.

The opening/closing unit 238 can selectively open the discharge port 216 by moving the movable unit 234 up and down.

At least a portion of the opening/closing unit 238 may have a diameter larger than the diameter of the discharge port 216 so that the opening/closing unit 238 may block the discharge port 216.

The opening/closing unit 238 may be formed of, for example, a rubber material so that the leakage of water is prevented in a state where the opening/closing unit 238 blocks the discharge port 216.

The elastic force of the elastic member 236 is applied to the movable unit 234 so that a state where the opening and closing unit 238 blocks the discharge port 216 can be maintained unless an external force is applied to the movable unit 234.

The movable unit 234 can be moved by the valve operating unit 144 in the process of mounting the water tank 200 to the nozzle main body 10.

The valve operating unit 144 is coupled to the nozzle cover 130 from below the nozzle cover 130 as described above.

The valve operating unit 144 may include a pressing portion 144a passing through the water passage opening 145. The pressing portion 144a may protrude upward from the bottom of the nozzle cover 130 in a state of passing through the water passage opening 145 of the nozzle cover 130.

The valve operating unit 144 may form a water supply flow path together with the bottom of the nozzle cover 130. A connection tube 144c for connecting the first supply tube 282 may be provided at one side of the valve operating unit 144.

The diameter of the water passage opening 145 may be larger than the outer diameter of the pressing portion 144a so that water flows smoothly in a state where the pressing portion 144a passes through the water passage opening 145.

When the water tank 200 is mounted on the nozzle main body 10, the pressing portion 144a is drawn into the discharge port 216 of the water tank 200. The pressing portion 144a presses the movable unit 234 in a process in which the pressing portion 144a is being drawn into the discharge port 216 of the water tank 200.

The movable unit 234 is lifted and the opening and closing unit 238 coupled to the movable unit 234 moves upward together with the movable unit 234 to be separated from the discharge port 216 to open the discharge port 216.

The water in the water tank 200 is discharged through the discharge port 216 and absorbed into the absorption member 147 in the valve operating unit 144 through the water passage opening 145. The water absorbed by the absorption member 147 is supplied to the first supply tube 282 connected to the connection tube 144c.

The water supplied to the first supply tube 282 flows into the second supply tube 284 after being drawn into the water pump 270. The water flowing into the second supply tube 284 flows to the first branch tube 286 and the second branch tube 287 by the connector 285. The water flowing into each of the branch tubes 286 and 287 is sprayed from the spray nozzle 149 toward the rotation cleaning units 40 and 41.

The water sprayed from the spray nozzle 149 is supplied to the mops 402 and 404 after passing through the water passage holes 424 of the rotation plates 420 and 440. The mops 402 and 404 are rotated while absorbing the supplied water to wipe the floor.

In the present embodiment, since the water discharged from the water tank 200 passes through the first supply tube 282 after passing through the absorption member 147 and the absorption member 147 absorbs the pressure generated by the pumping force of the water pump 270, it is prevented the water from suddenly flowing into the connector 285.

In this case, the water pressure is concentrated on one of the first branch tube 286 and the second branch tube 287, and concentration of water into a branch tube can be prevented.

Figure 41:
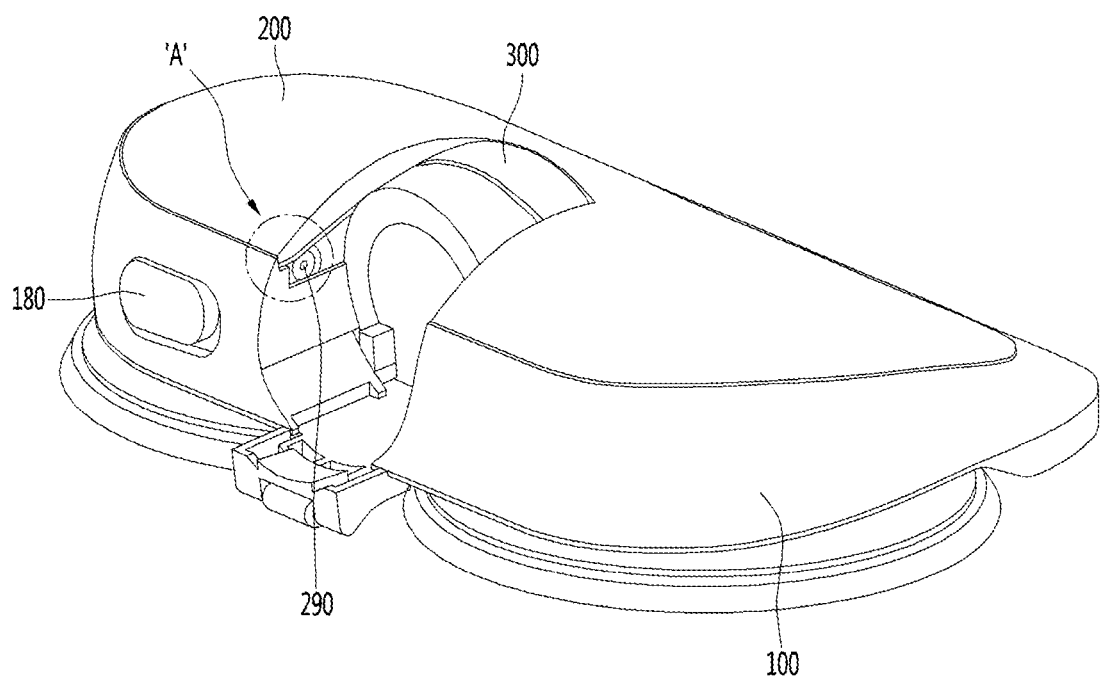
FIG. 41 is a perspective view illustrating the nozzle for the cleaner from which a connection tube is separated according to an embodiment of the present invention as viewed from the rear side.
Figure 42:
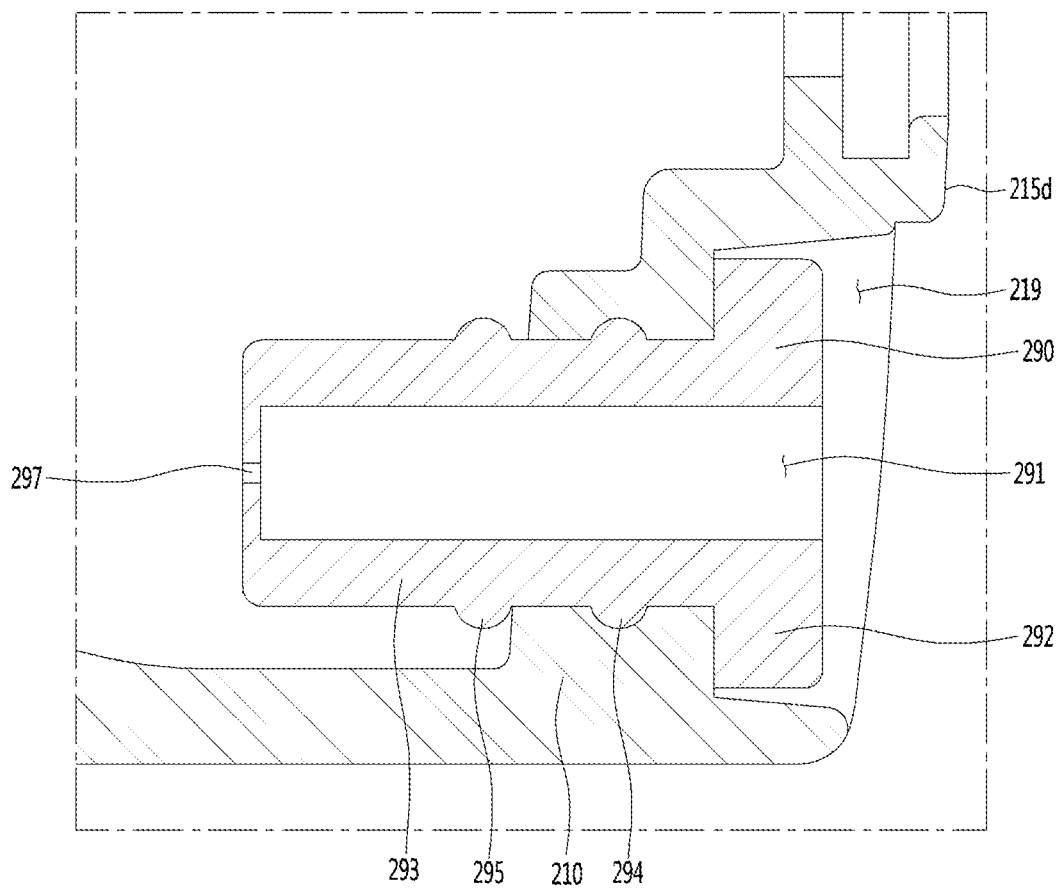
FIG. 42 is a sectional view illustrating area 'A' in FIG. 41.
Figure 43:
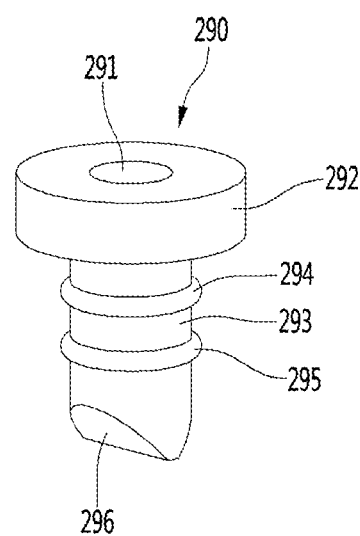
FIG. 43 is a perspective view illustrating the gasket of FIG. 42.

FIG. 41 is a perspective view illustrating the nozzle for the cleaner from which a connection tube is separated according to an embodiment of the present invention as viewed from the rear side, FIG. 42 is a sectional view illustrating area 'A' in FIG. 41, and FIG. 43 is a perspective view illustrating the gasket of FIG. 42.

Referring to FIG. 41 to FIG. 43, at least one air hole 219 for introducing outside air may be formed in the water tank 200. Hereinafter, as an example, one air hole 219 is formed in the water tank 200, but a plurality of the air holes 219 may be provided.

The air holes 219 may be formed on one side of the water tank 200. For example, the air holes 219 may be formed in any one of a pair of the front and rear extending walls 215b facing each other in the water tank 200.

Although the pair of the front and rear extending walls 215b are spaced apart from each other to define a space and the connection tube 50 is positioned in the space, a portion of the front and rear extending walls 215b formed with the air holes 219 is spaced apart so that the air can be smoothly supplied to the air holes 219.

In detail, the gasket 290 may be press-fitted into the air hole 219.

The gasket 290 can guide the outside air into the interior space of the water tank 200.

The gasket 290 may be referred to as a check valve in that the outside air flows into the water tank 200 while the water in the water tank 200 is interrupted so as not to be discharged to the outside.

The gasket 290 may be formed of a material deformed in shape by an external force. For example, the gasket 290 may be formed of polyethylene material but is not limited thereto.

The gasket 290 may include a cylindrical body 293, for example.

An end portion of one side of the body 293 may be received inside the water tank 200 through the air hole 219. The other end portion of the body 293 may be exposed to the outside of the water tank 200.

At least one sealing protrusion 294 and 295 may be formed on the outside of the body 293. The outer diameter of the sealing protrusions 294 and 295 may be larger than the inner diameter of the air hole 219. When the sealing protrusions 294 and 295 are formed as described above, leakage between the body 293 and the air holes 219 can be prevented.

In a case where a plurality of the sealing protrusions 294 and 295 are formed, a portion of the sealing protrusions 294 and 295 may be positioned inside the water tank 200.

A flange 292 having an outer diameter larger than that of the body 293 and the sealing protrusions 294 and 295 may be formed at the other end portion of the body 293. The flange 292 has a larger diameter than the air hole 219. The entirety of the gasket 290 is prevented from entering the inside of the water tank 200 by the flange 292.

In addition, the gasket 290 may be formed with an air flow path 291 through which air flows in the central portion thereof and a slit 297 may be formed at the other end portion thereof. At this time, the other end portion of the gasket 290 may contact water in the water tank 200.

In addition, so that the slit 297 formed at the other end portion of the gasket 290 is blocked by the pressure of water, the gasket 290 is formed such that the sectional area of the gasket 290 decreases from one point to the other end portion, and thus inclined surfaces 296 can be formed on the outer side.

In detail, the inclined surfaces 296 may be formed on both sides of the slit 297.

According to an embodiment, the water pressure is applied to the inclined surface 296 formed at the other end portion of the gasket 290 and thus the other end portion of the gasket 290 inwardly shrinks, and in this process, the slit 297 is blocked in a state where the inner pressure of the water tank 200 is not lowered (a state where water is not discharged).

Therefore, water in the water tank 200 is prevented from leaking to the outside through the slit 297.

In addition, the slit 297 is blocked by the water pressure of the water tank 200 so that the air is not supplied to the inner portion of the water tank 200 through the slit 297 in a state where no external force is applied to the gasket 290.

Meanwhile, outside air can be supplied to the water tank 200 through the gasket 290 in a state where the internal pressure of the water tank 200 is lowered (a state where water is discharged).

Specifically, when the pump motor 280 operates, the water in the water tank 200 is discharged through the discharge port 216 by the water pump 270. The internal pressure of the water tank 200 is instantaneously lowered.

While the pressure applied to the inclined surface 296 of the gasket 290 is also lowered, the other end portion of the gasket 290 is restored to an original state thereof, and the slit 297 can be opened.

As described above, when the slit 297 is opened, the outside air can be supplied to the water tank 200 through the slit 297.

In a state where the slit 297 is opened, the surface tension of the water around the slit 297 and the force with which the external air flows are greater than the water pressure in the water tank 200, and water is not discharged to the outside of the water tank 200 through the slit 297.

According to the present embodiment, water in the water tank 200 can be prevented from being discharged to the outside through the gasket 290 when the water pump 270 is not operated.

In addition, in a state where the water pump 270 is operated, since air can be introduced into the water tank 200 through the slits 297 of the gasket 290, the water in the water tank 200 can be stably supplied to the mops 402 and 404.

According to the proposed embodiment, since foreign matters on the floor can be suctioned, the floor can be wiped by rotating the mop, and water can be supplied to the mop, there is an advantage that cleaning performance is improved.

In addition, according to the present embodiment, even when a structure capable of wiping the floor using the mop is applied, since the driving devices are disposed on both sides of the flow path extending in the front and rear direction, the length of the air flow path is prevented from increasing, and thus flow path loss can be reduced.

In addition, according to the present embodiment, since each of the driving devices are disposed symmetrically on both left and right sides with respect to the front and rear centerlines of the suction flow path, there is an advantage that the weight of the plurality of driving devices is uniformly distributed to the left and right.

In addition, according to the present embodiment, since each of the driving motors is disposed so as to overlap with each of the rotation plates in the vertical direction and is positioned in the area between the rotation center and the outer peripheral surface of each of the rotation plates, the power transmission path for transmitting the power of the driving motor to the rotating plate is reduced and the vibration generated in the power transmission process is reduced.

In addition, according to the present embodiment, since each of the driving devices is positioned as close as possible to the front and rear centerline of the suction flow path, there is an advantage that the nozzle can be rotated by applying less force when the direction of the nozzle is changed in the process of cleaning while using the nozzle.

In addition, according to the present embodiment, since each driving device is positioned as close as possible to the front and rear centerline of the suction flow path, a heavyweight configuration can be concentrated in the center portion of the nozzle. Thus, the distance between the vibration generating points is reduced, so that the vibration of the nozzle can be minimized.

What is claimed is:
1. A nozzle for a cleaner comprising:
   a nozzle housing including:
      a suction flow path through which air including dust flows;
      a nozzle base on which a driving motor is seated on an upper surface of the nozzle base; and
      a nozzle cover coupled to the upper surface of the nozzle base to cover the driving motor from above, and
   a rotation plate disposed below the nozzle base and provided to attach a mop;
   wherein the driving motor is disposed spaced apart from the suction flow path inside the nozzle housing to rotate the rotation plate, and
   wherein a lower surface of the nozzle base includes:
      an inlet of the suction flow path formed as an open surface; and
      a plate receiving portion that is recessed upward to be disposed higher than the inlet of the suction flow path and covers the rotation plate.
2. The nozzle of claim 1, wherein the plate receiving portion is disposed rearward of the inlet of the suction flow path.
3. The nozzle of claim 2, wherein the inlet of the suction flow path includes:
   an inlet of a first flow path extending in a lateral direction of the nozzle housing; and an inlet of a second flow path extending from the inlet of the first flow path toward the plate receiving portion.

4. The nozzle of claim 3, wherein the rotation plate includes a first rotation plate and a second rotation plate rotated by the driving motor, and wherein the plate receiving portion includes:
- a first plate receiving portion recessed to cover the first rotation plate from above; and
- a second plate receiving portion recessed to cover the second rotation plate from above.

5. The nozzle of claim 4, wherein the inlet of the second flow path extends to protrude between the first rotation plate and the second rotation plate.

6. The nozzle of claim 4, wherein the inlet of the second flow path extends between the first plate receiving portion and the second plate receiving portion.

7. The nozzle of claim 4, wherein, when the first rotation plate and the second rotation plate are positioned below the plate receiving portion, the inlet of the suction flow path is positioned lower than an upper surface of the first rotation plate and an upper surface of the second rotation plate.

8. The nozzle of claim 4, wherein the bottom of the nozzle housing has a protrusion part that protrudes downward toward a floor, and wherein the protrusion part extends between the first and second plate receiving portions to define the inlet of the second flow path.

9. The nozzle of claim 4, wherein the lower surface of the nozzle base is provided with a roller disposed ahead of the plate receiving portion and configured to contact a floor.

10. The nozzle of claim 9, wherein the roller includes:
- a first roller disposed between the first rotation plate and the inlet of the first flow path; and
- a second roller disposed between the second rotation plate and the inlet of the first flow path.

11. The nozzle of claim 10, wherein at least a portion of the plate receiving portion is disposed between the first roller and the second roller.

12. The nozzle of claim 4, wherein the inlet of the second flow path extends rearward from the inlet of the first flow path to have a smaller left and right width than the inlet of the first flow path.

13. The nozzle of claim 4, wherein the driving motor includes:
- a first driving motor disposed to a left side of the second suction flow path extending in a front-rear direction of the nozzle housing to drive the first rotation plate; and
- a second driving motor disposed to a right side of the second flow path extending in the front-rear direction to drive the second rotation plate, wherein the first driving motor is connected to the first rotation plate to supply rotation force, and the second driving motor is connected to the second rotation plate to supply rotation force.

14. The nozzle of claim 1, wherein the plate receiving portion includes:
- a shaft through hole through which a shaft of the driving motor passes; and
- a bottom rib protruding toward a floor from a bottom of the nozzle housing to surround the shaft through hole.

15. The nozzle of claim 1, wherein the lower surface of the nozzle base is formed so that the inlet of the suction flow path is closer to a floor than the plate receiving portion.

16. The nozzle of claim 1, wherein the nozzle base has a protrusion part extending along a rear end of the inlet of the suction flow path to partition the plate receiving portion and the inlet of the suction flow path.

17. The nozzle of claim 16, wherein the protrusion part is formed to be disposed forward of a front end of the plate receiving portion on the lower surface of the nozzle base.

18. The nozzle of claim 16, wherein the protrusion part is formed to protrude closer to a floor than the plate receiving portion.

19. The nozzle of claim 16, wherein at least a portion of the protrusion part extends to have a curve along a circumferential direction of the rotation plate.

20. The nozzle of claim 1, wherein the plate receiving portion is disposed to overlap with the driving motor in a vertical direction.

* * * * *